United States Patent
Tsai et al.

(10) Patent No.: US 11,792,874 B2
(45) Date of Patent: Oct. 17, 2023

(54) MULTIPLE TRPS AND PANELS TRANSMISSION WITH DYNAMIC BANDWIDTH FOR NR

(71) Applicant: InterDigital Patent Holdings, Inc., Wilmington, DE (US)

(72) Inventors: Allan Y. Tsai, Boonton, NJ (US); Guodong Zhang, Woodbury, NY (US); Qing Li, Princeton Junction, NJ (US); Lakshmi R. Iyer, King of Prussia, PA (US); Yifan Li, Conshohocken, PA (US); Joseph M. Murray, Schwenksville, PA (US); Pascal M. Adjakple, Great Neck, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 16/644,352

(22) PCT Filed: Sep. 7, 2018

(86) PCT No.: PCT/US2018/049879
§ 371 (c)(1),
(2) Date: Mar. 4, 2020

(87) PCT Pub. No.: WO2019/051177
PCT Pub. Date: Mar. 14, 2019

(65) Prior Publication Data
US 2021/0076445 A1 Mar. 11, 2021

Related U.S. Application Data

(60) Provisional application No. 62/556,005, filed on Sep. 8, 2017, provisional application No. 62/564,897, filed
(Continued)

(51) Int. Cl.
*H04W 76/27* (2018.01)
*H04W 74/08* (2009.01)

(52) U.S. Cl.
CPC ....... *H04W 76/27* (2018.02); *H04W 74/0833* (2013.01)

(58) Field of Classification Search
CPC . H04W 76/27; H04W 74/0833; H04W 16/28; H04W 72/0453; H04W 76/19; H04B 7/0602; H04L 5/003
See application file for complete search history.

(56) References Cited

U.S. PATENT DOCUMENTS 9,019,823 B1 * 4/2015 Raparthy .......... H04W 28/0247
370/230
2011/0085513 A1    4/2011 Chen et al.
(Continued)

FOREIGN PATENT DOCUMENTS

CN    103348621 A    10/2013
CN    107113842 A     8/2017
(Continued)

OTHER PUBLICATIONS

U.S. Appl. No. 62/541,796,Specification, filed Aug. 7, 2017 (Year: 217).*
(Continued)

*Primary Examiner* — Chi H Pham
*Assistant Examiner* — Ji-Hae Yea
(74) *Attorney, Agent, or Firm* — BakerHostetler

(57) ABSTRACT

The present application is at least directed to an apparatus on a network including a non-transitory memory including instructions stored thereon for re-establishing a remote radio control (RRC) connection with a base station. The apparatus also includes a processor, operably coupled to the non-transitory memory, capable of executing an instruction of
(Continued)

determining a radio link failure has occurred between a first bandwidth part (BWP) of the apparatus tuned to a base station. The processor also executes the instruction of initiating a random access (RA) procedure. The processor also executes the instruction of determining whether a configured contention-based physical random access channel (PRACH) resource overlaps with the first BWP. The process further executes the instruction of transmitting a RA preamble including the configured contention-based PRACH resource to the base station. The processor even further executes the instruction of receiving a RA response from the base station.

12 Claims, 77 Drawing Sheets

Related U.S. Application Data on Sep. 28, 2017, provisional application No. 62/587,248, filed on Nov. 16, 2017, provisional application No. 62/616,009, filed on Jan. 11, 2018.

(56) References Cited

U.S. PATENT DOCUMENTS

| | | | |
|---|---|---|---|
| 2014/0119335 | A1 | 5/2014 | Wang et al. |
| 2014/0307622 | A1 | 10/2014 | Horn et al. |
| 2015/0162966 | A1 | 6/2015 | Kim et al. |
| 2015/0208386 | A1 | 7/2015 | Yang et al. |
| 2016/0100430 | A1 | 4/2016 | Dabeer et al. |
| 2016/0192399 | A1 | 6/2016 | Zhu et al. |
| 2016/0212737 | A1 | 7/2016 | Jang et al. |
| 2017/0135134 | A1* | 5/2017 | Rune ................. H04W 74/0833 |
| 2017/0250787 | A1 | 8/2017 | Geirhofer et al. |
| 2017/0367046 | A1* | 12/2017 | Papasakellariou ........................... H04W 72/0453 |
| 2018/0034610 | A1 | 2/2018 | He et al. |
| 2018/0124796 | A1 | 5/2018 | Noh et al. |
| 2018/0263060 | A1* | 9/2018 | Tirronen ........... H04W 74/0833 |
| 2018/0279274 | A1 | 9/2018 | Sun et al. |
| 2018/0302191 | A1 | 10/2018 | Park et al. |
| 2018/0310333 | A1 | 10/2018 | Akkarakaran et al. |
| 2019/0014598 | A1* | 1/2019 | Yoshimura .......... H04W 74/006 |
| 2019/0045571 | A1* | 2/2019 | Wu ....................... H04W 76/15 |
| 2019/0059112 | A1* | 2/2019 | Ou ....................... H04W 74/008 |
| 2019/0208505 | A1 | 7/2019 | Park et al. |
| 2019/0349904 | A1 | 11/2019 | Kwak et al. |

FOREIGN PATENT DOCUMENTS

| | | |
|---|---|---|
| JP | 2011-040851 A | 2/2011 |
| JP | 2019-036955 A | 3/2019 |
| WO | 2011/082822 A1 | 7/2011 |
| WO | 2016/164739 A1 | 10/2016 |
| WO | 2017/074230 A1 | 5/2017 |

OTHER PUBLICATIONS

U.S. Appl. No. 62/541,796,Drawings-other_than_black_and_white_line_drawings, filed Aug. 7, 2017 (Year: 2017).*
U.S. Appl. No. 62/472,088,Specification, filed Mar. 16, 2017 (Year: 2017).*
U.S. Appl. No. 62/472,088,Drawings-only_black_and_white_line_drawings, filed Mar. 16, 2017 (Year: 2017).*
U.S. Appl. No. 62/547,373,Specification, filed Aug. 18, 2017 (Year: 2017).*
3GPP TR 38.913 V0.2.0, "3rd Generation Partnership Project; Technical Specification Group Radio Access Network; Study on Scenarios and Requirements for Next Generation Access Technologies; (Release 14)", Feb. 2016, 19 pages.
3GPP TS 36.212 V14.3.0, "3rd Generation Partnership Project; Technical Specification group Radio Access network; Evolved Universal Terrestrial Radio Access (E-UTRA); Multiplexing and Channel Coding ( Release 14)", Jun. 2017 198 pages.
3GPP TS 36.213 V14.3.0 "3rd Generation Partnership Project; Technical Specification Group Radio Access Network; Evolved Universal Terrestrial Radio Access (E-UTRA); Physical Layer Procedures (Release 14)", Jun. 2017, 460 pages.
3GPP TSG RAN Wg1 #89 R1-1708047, Samsung, "Early Termination of Polar Decoding", May 2017, 9 pages.
3GPP TSG RAN WG1 Meeting #88bis R1-1705069, Huawei, HiSilicon, "Resource Allocation and Indication for Data Channel", Apr. 2017, 8 pages.
3GPP TSG RAN WG1 Meeting #90 R1-1713885, NTT Docomo, Inc., "Reducing the Maximum Time Between Packet Arrival and Selected Resource for Data Transmission", Aug. 2017, 2 pages.
3GPP TSG-RAN WG1#90 R1-1712953, Ericsson, "On Bandwidth Parts", Aug. 2017, 4 pages.
AT&T: "Single and Multi DCI NC-JT Framework for Multi TRP Transmission in NR", 3GPP Draft; R1-1702259, Feb. 12, 2017.
Interdigital Inc: "DCI Design for Multi-TRP/Panel Transmission for DL", 3GPP Draft; R1-1714138, XP051316927.
NTT Docomo: "Discussion on Codeword Mapping", 3GPP Draft; R1-1705715, Apr. 2017.
Intel Corporation, "Beam failure and radio link failure handlings", 3GPP TSG-RAN WG2 Meeting #99 R2-1708813, 5 Pages, 2017.
Panasonic, "On default bandwidth part", 3GPP TSG-RAN WG1 NR Ad-Hoc#2, R1-1710787, Jun. 2017, 5 Pages.
AT&T, "SS block transmissions in a wideband CC", 3GPP TSG RAN WG1 Meeting #90, R1-1712696, Aug. 2017, 2 Pages.

* cited by examiner

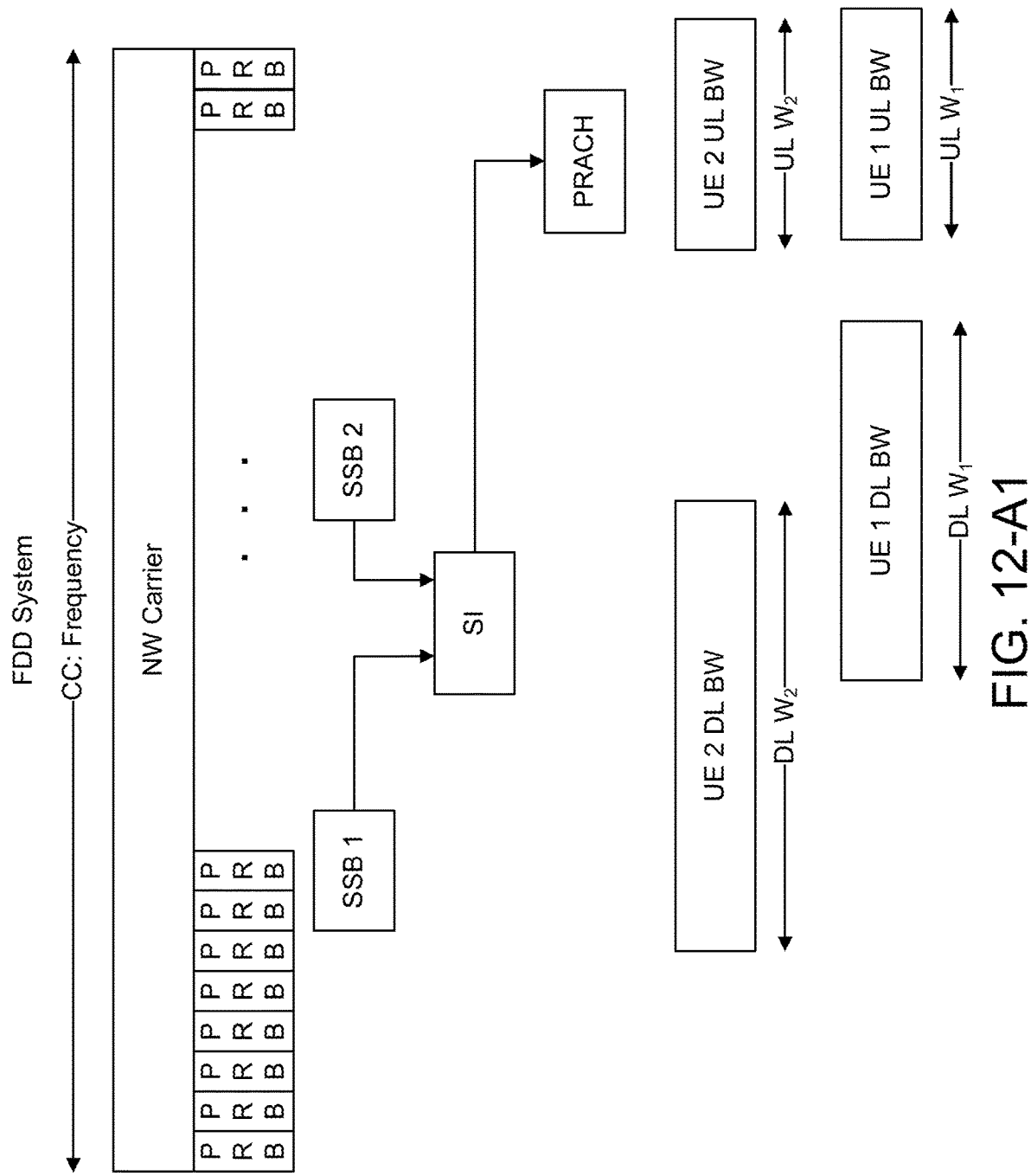
FIG. 12-A1

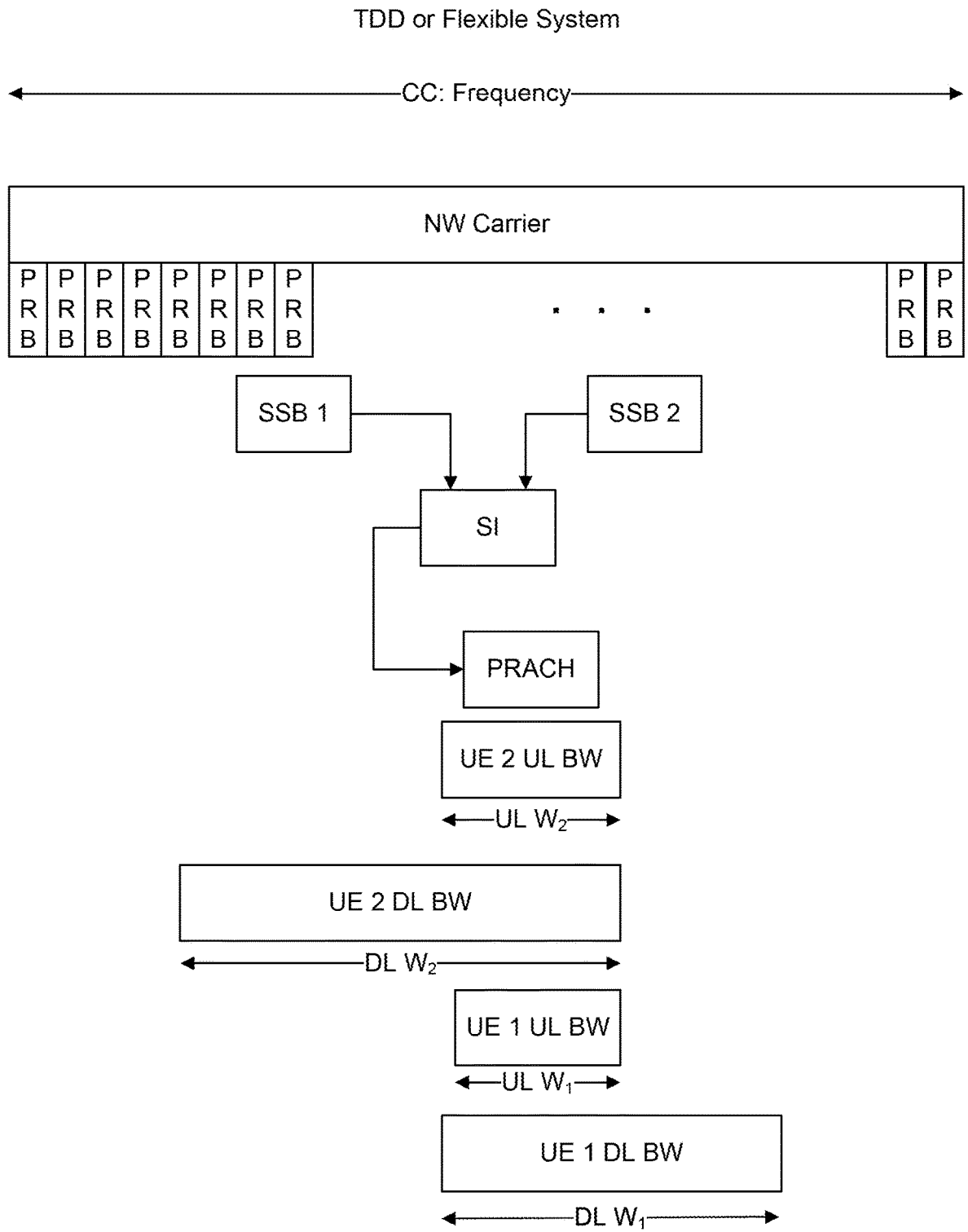
FIG. 12-A2

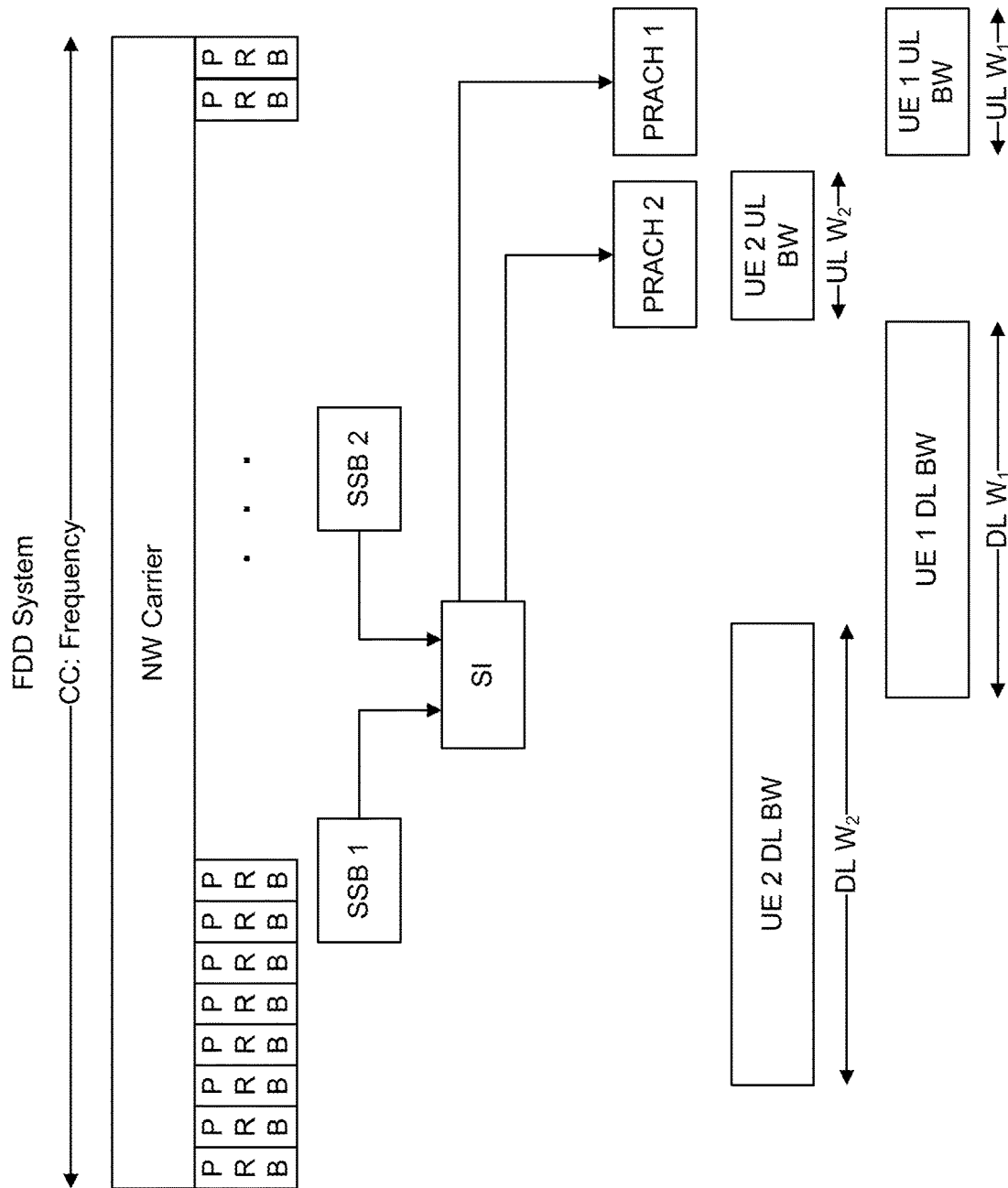
FIG. 12-B1

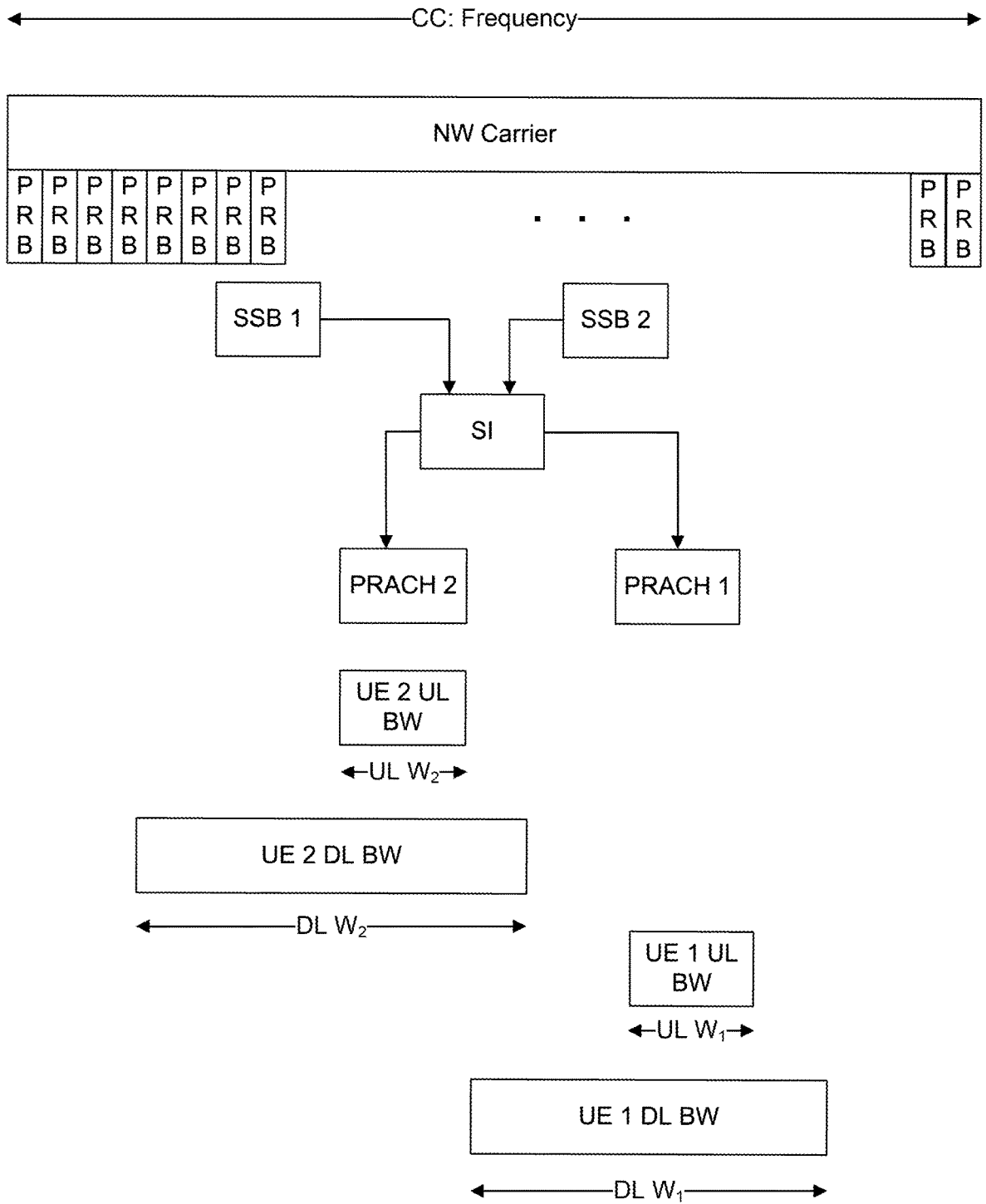
FIG. 12-B2

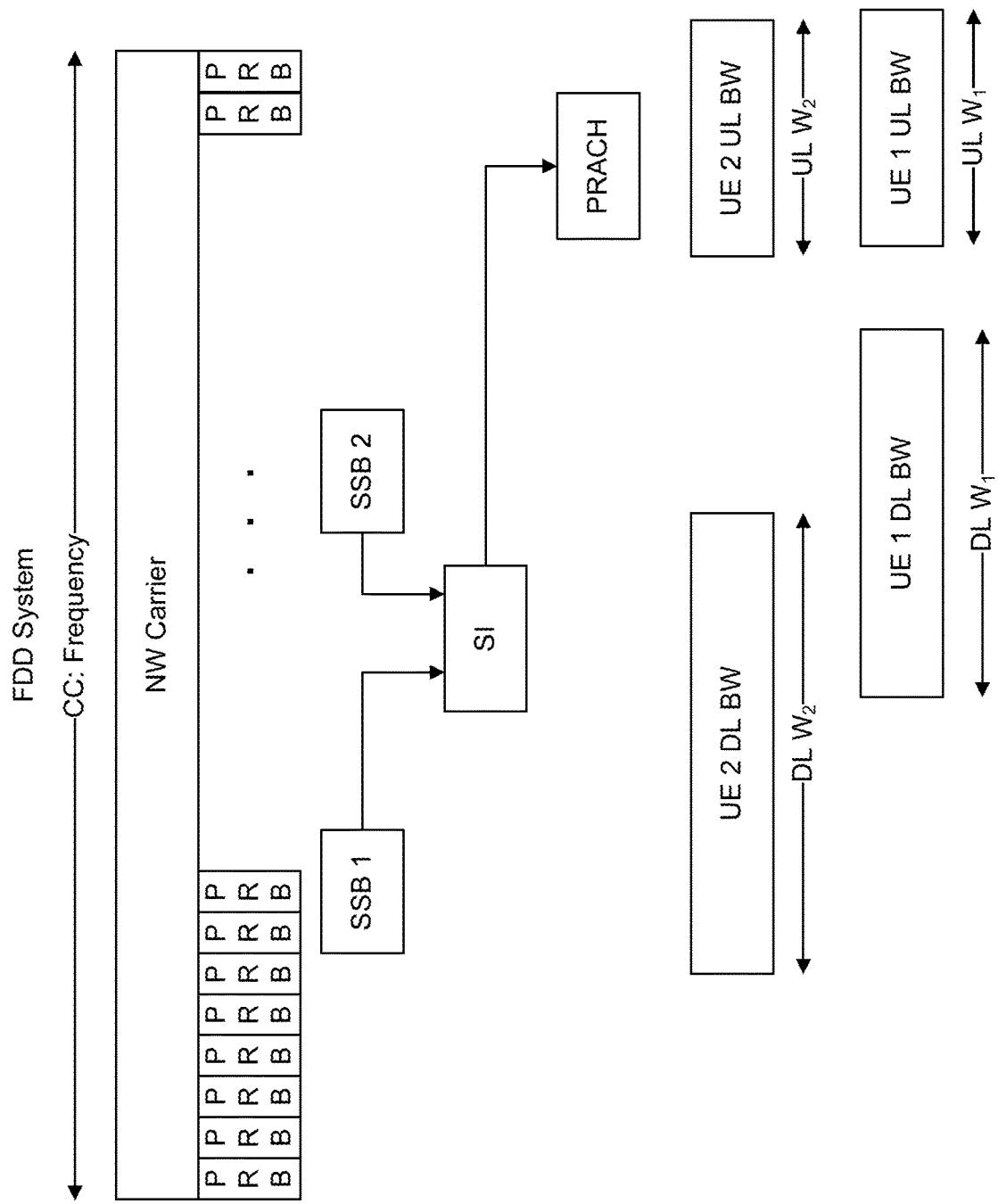
FIG. 16-A1

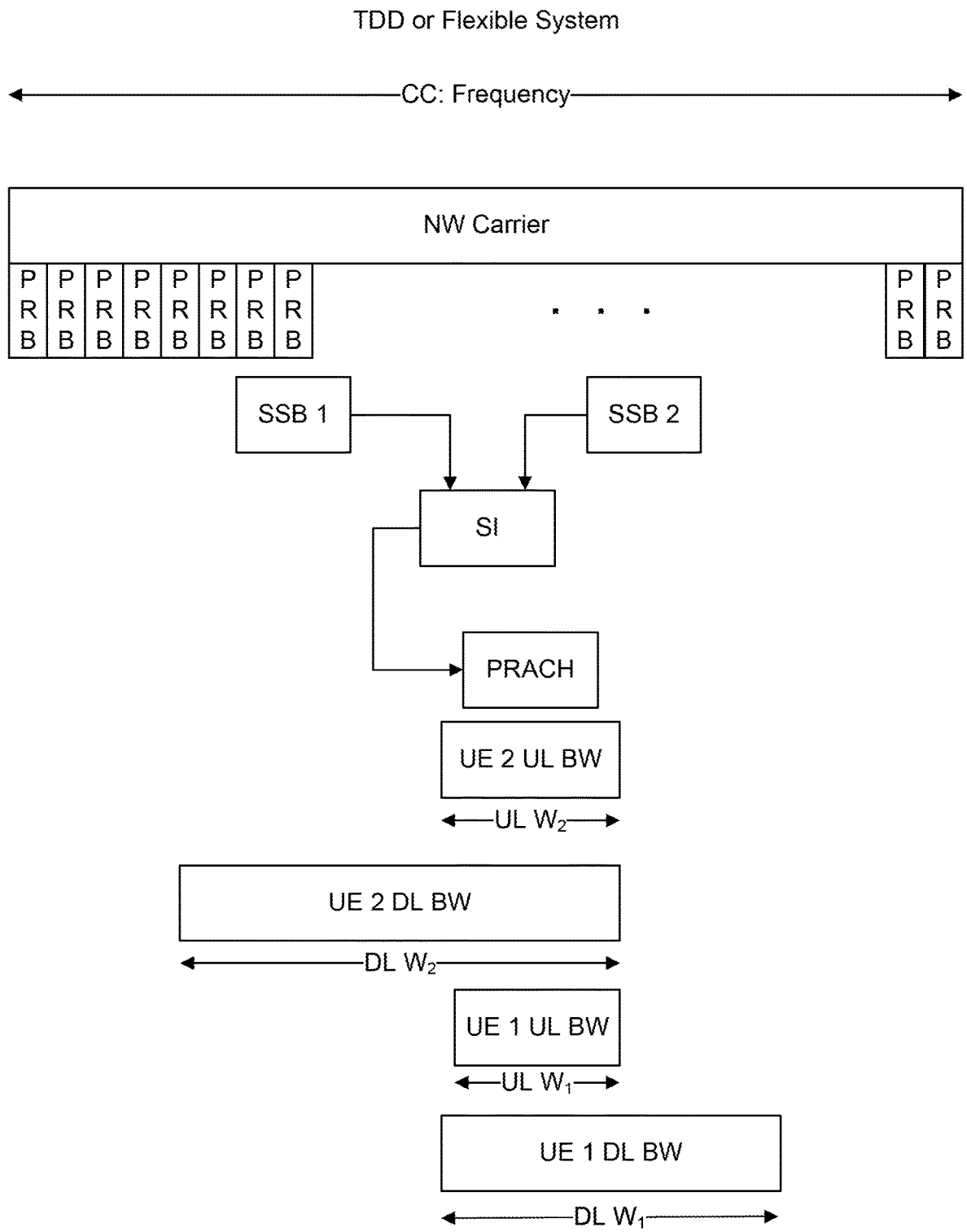
FIG. 16-A2

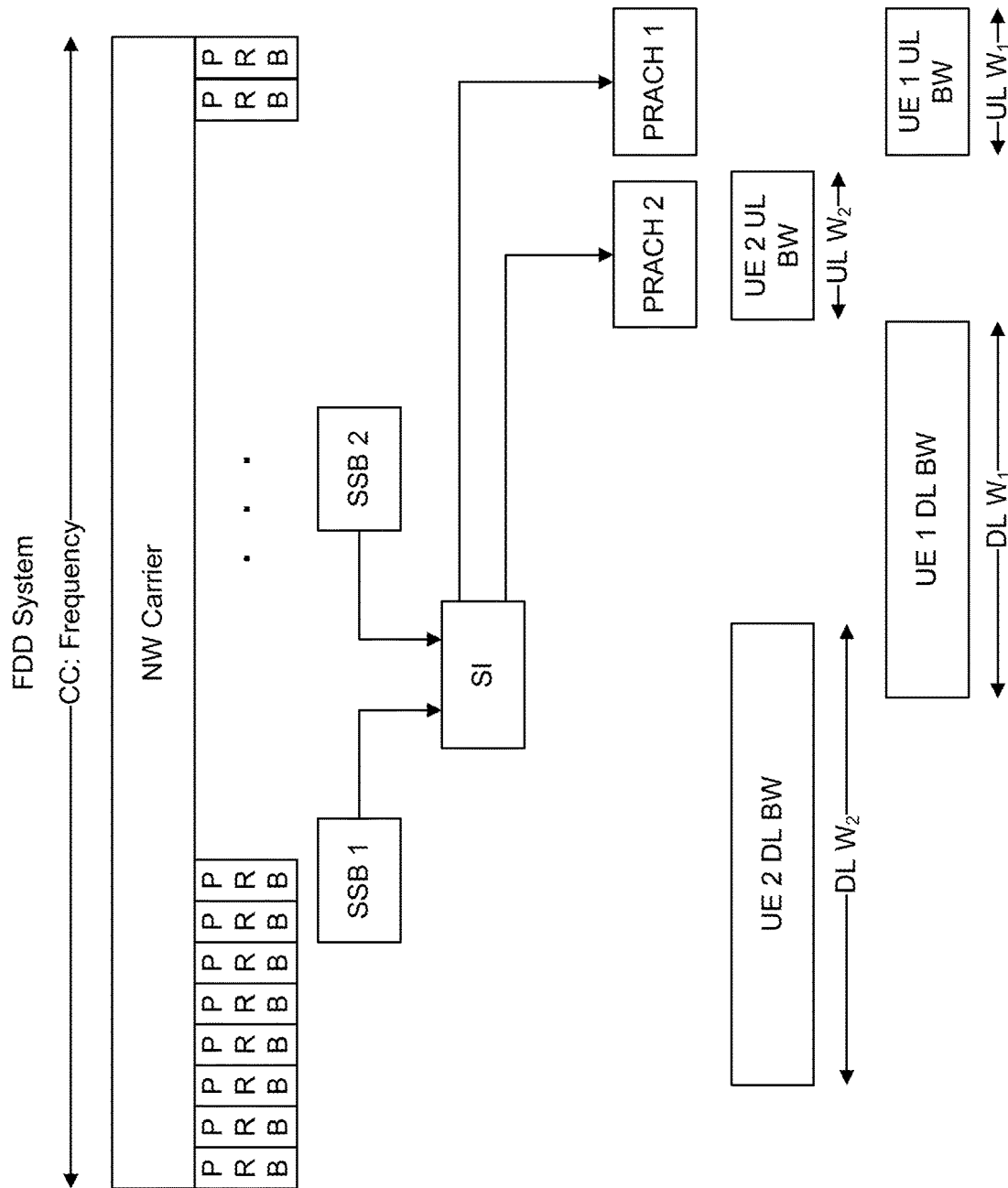
FIG. 16-B1

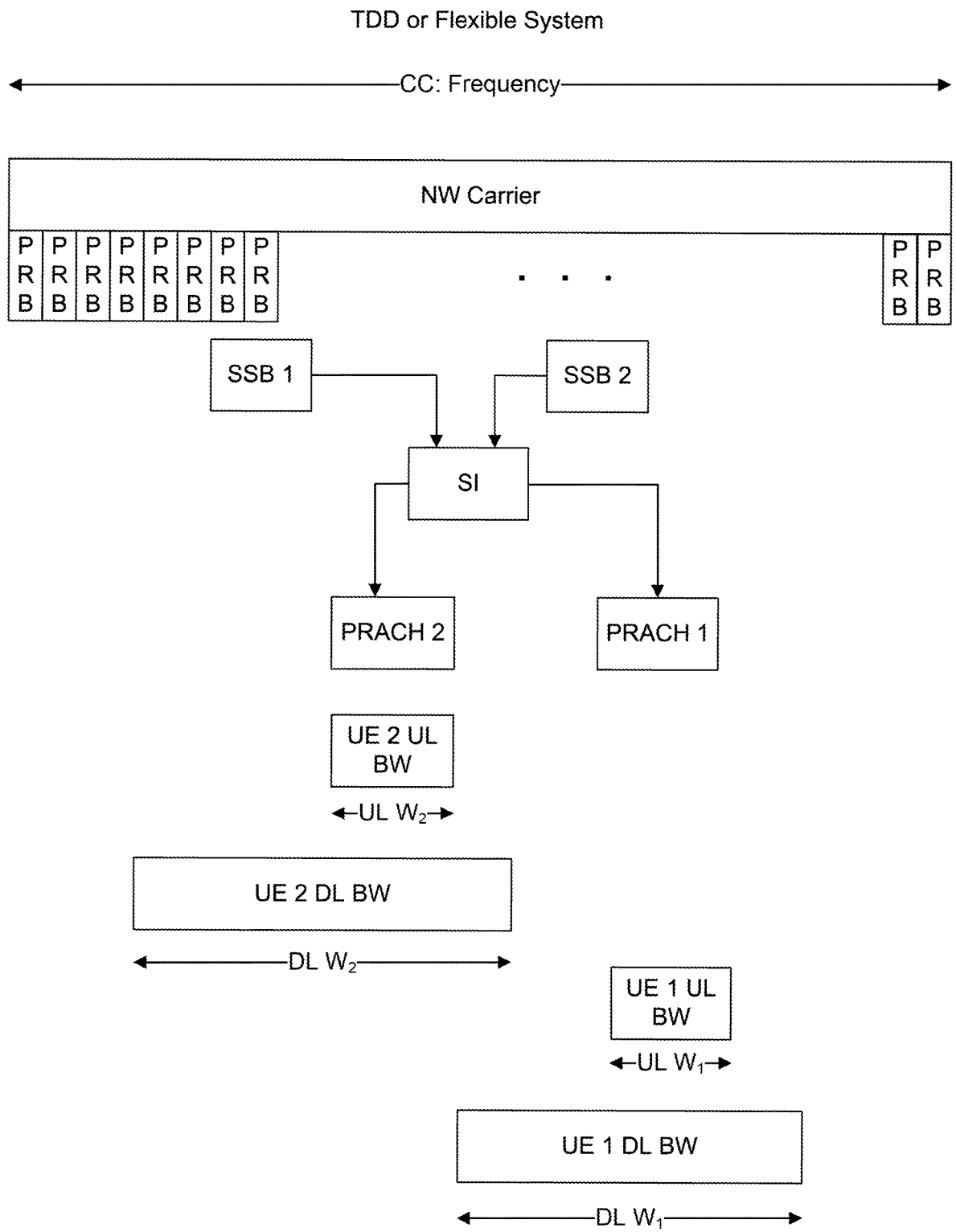
FIG. 16-B2

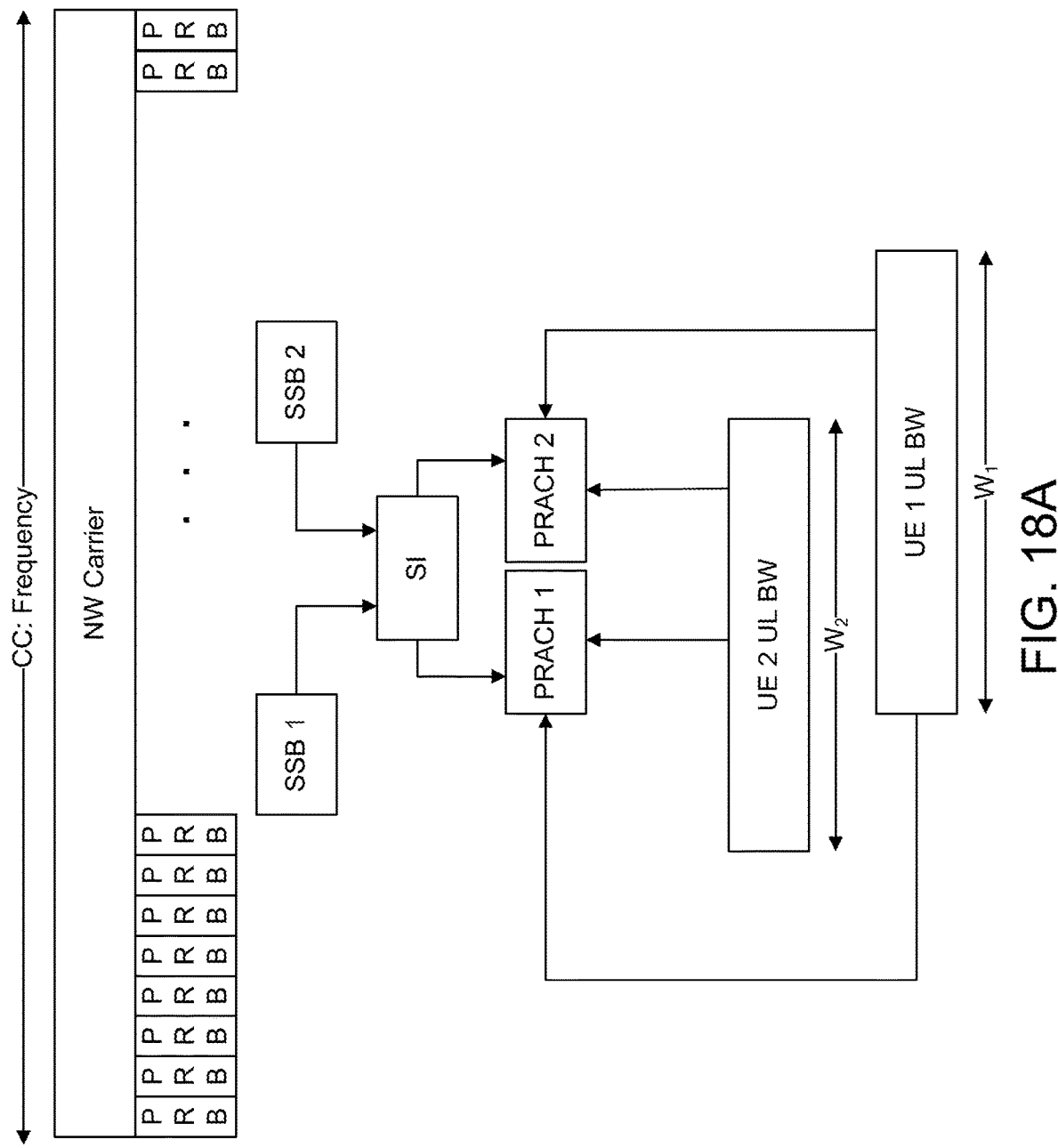

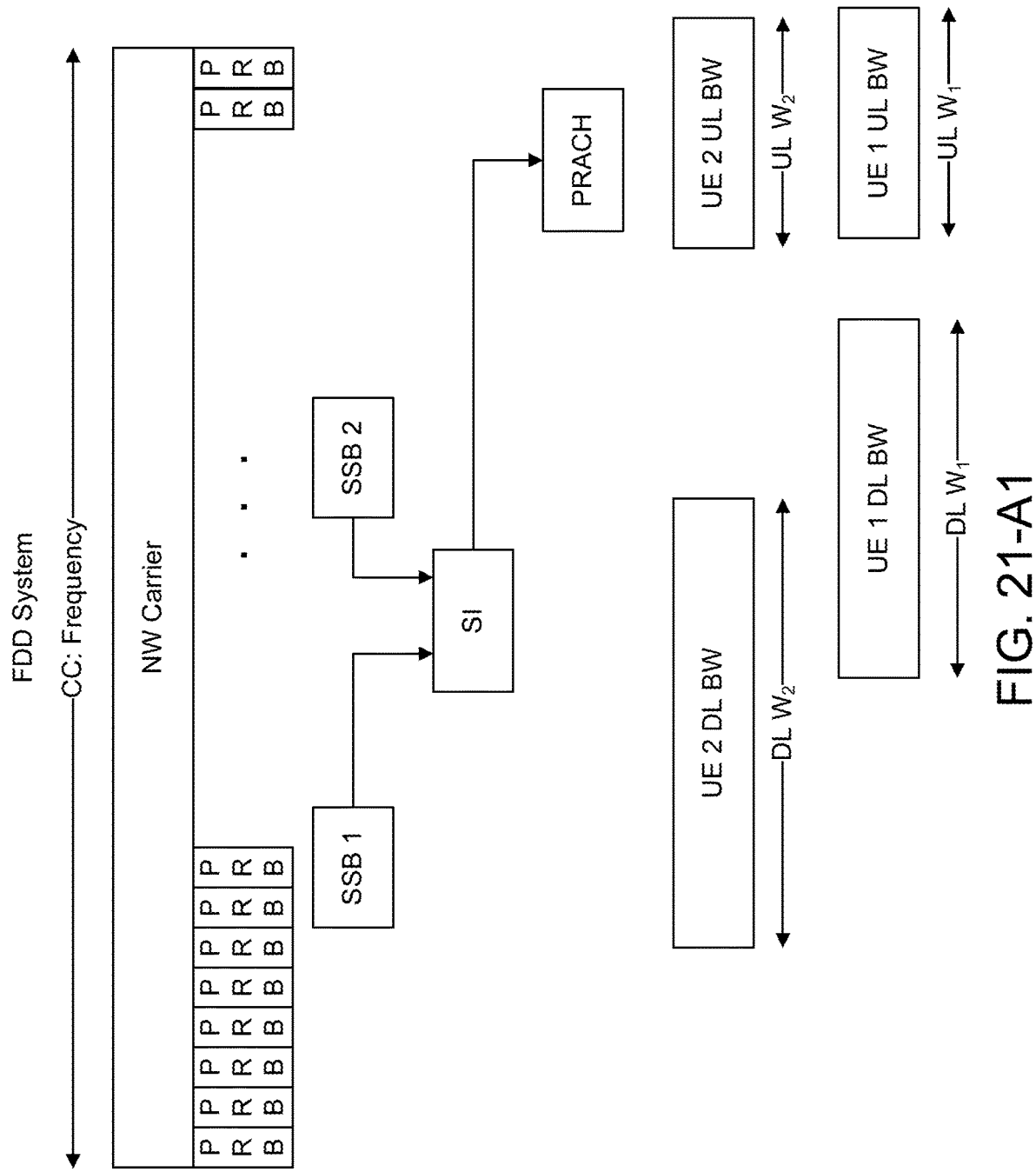
FIG. 21-A1

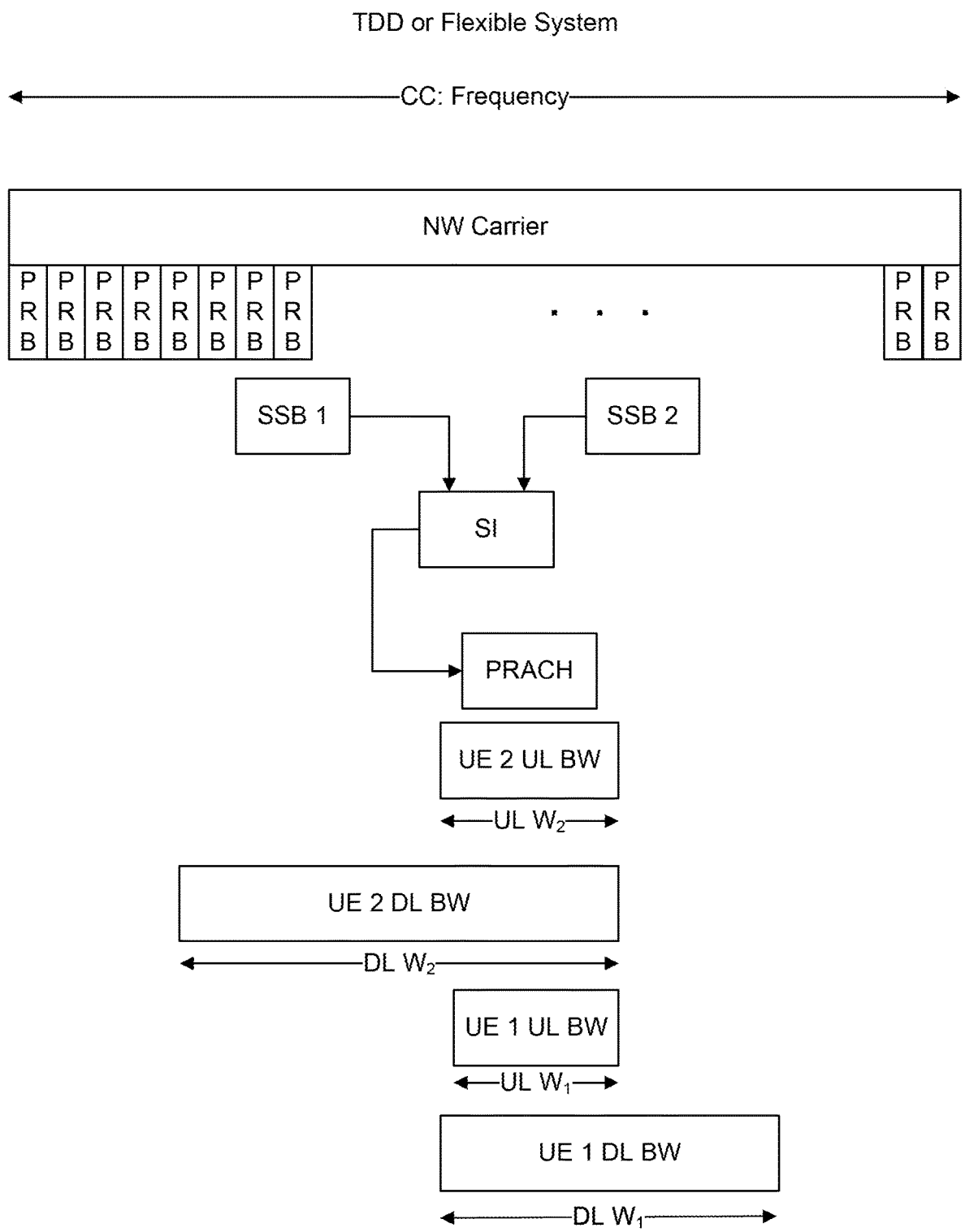
FIG. 21-A2

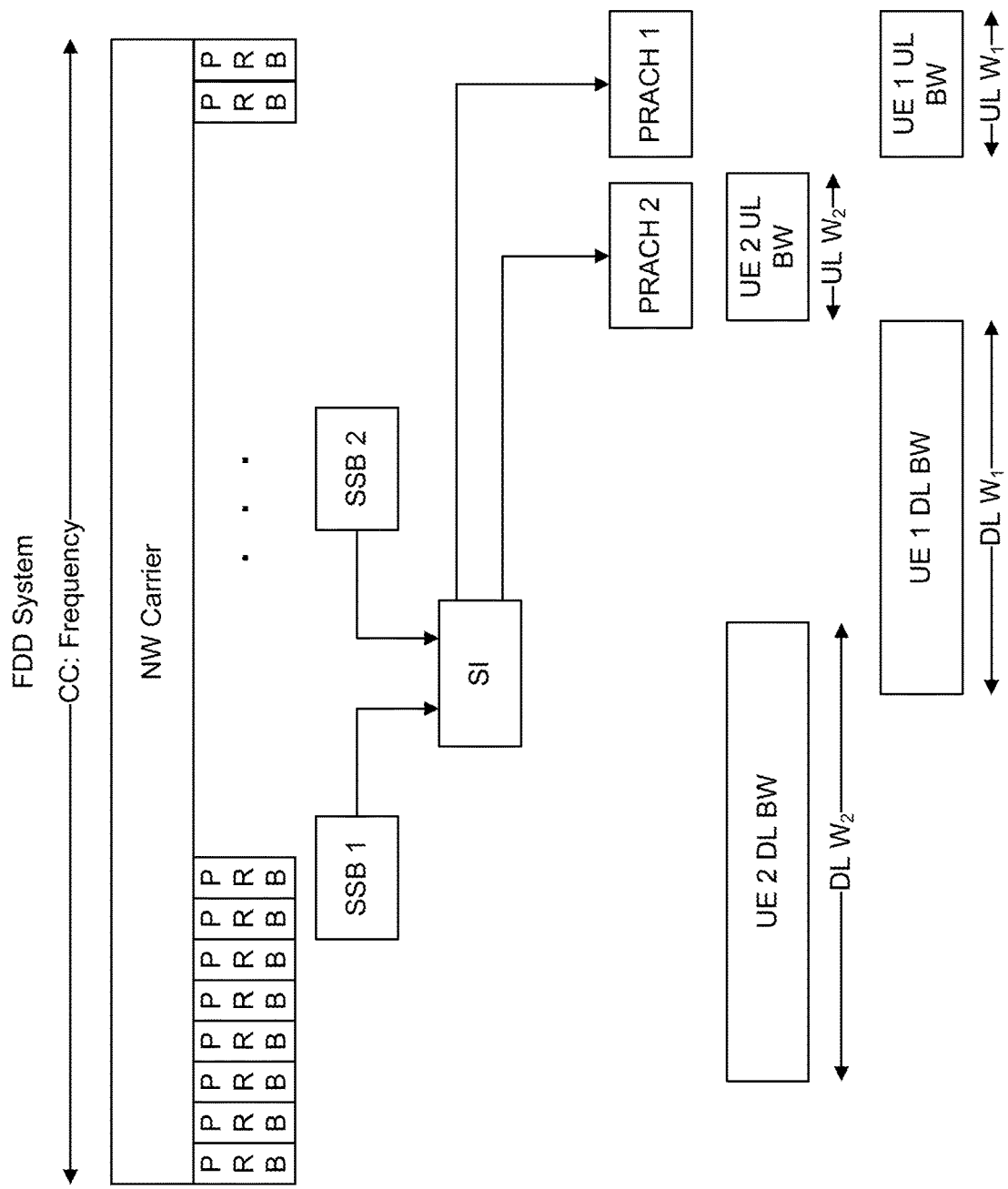
FIG. 21-B1

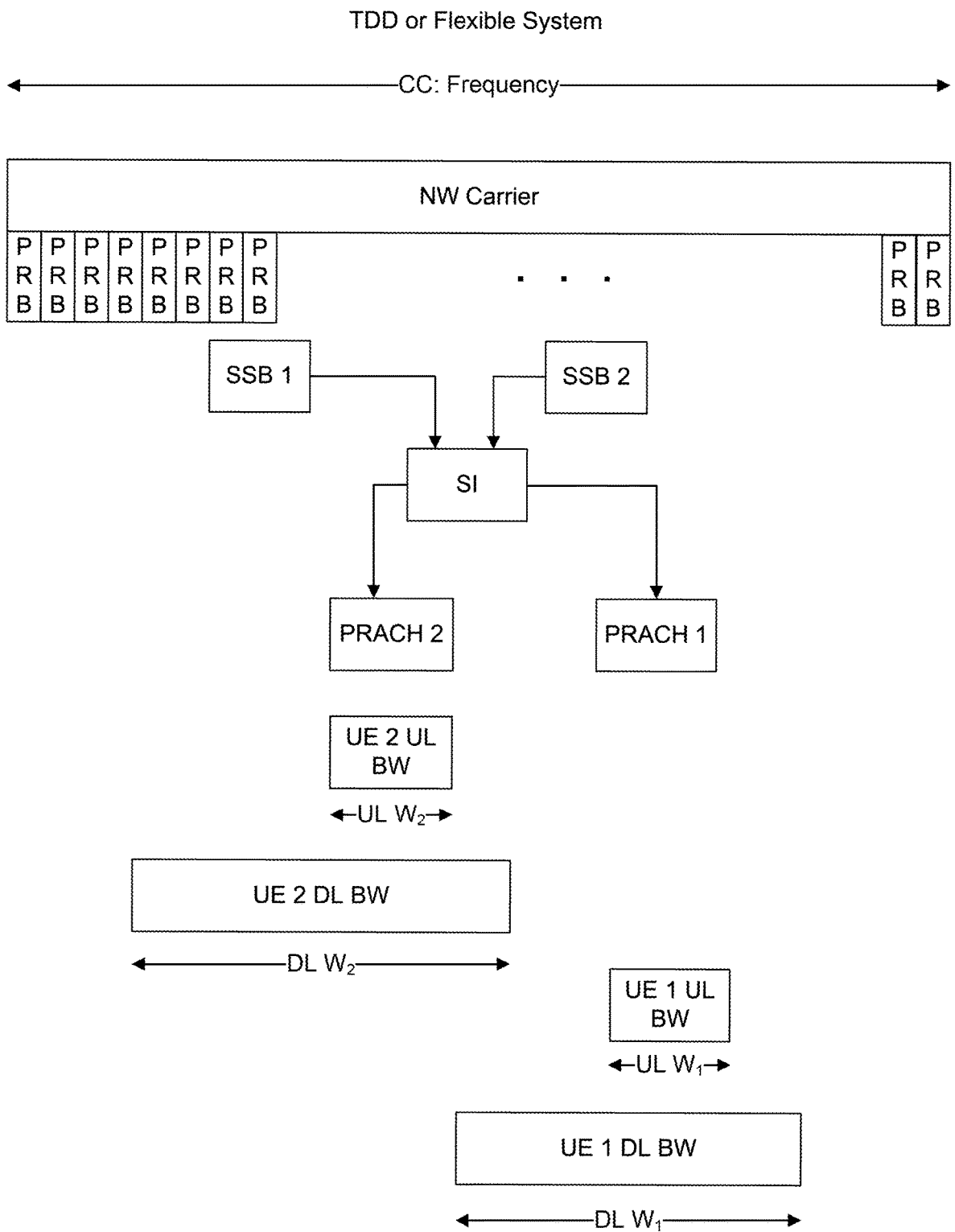
FIG. 21-B2

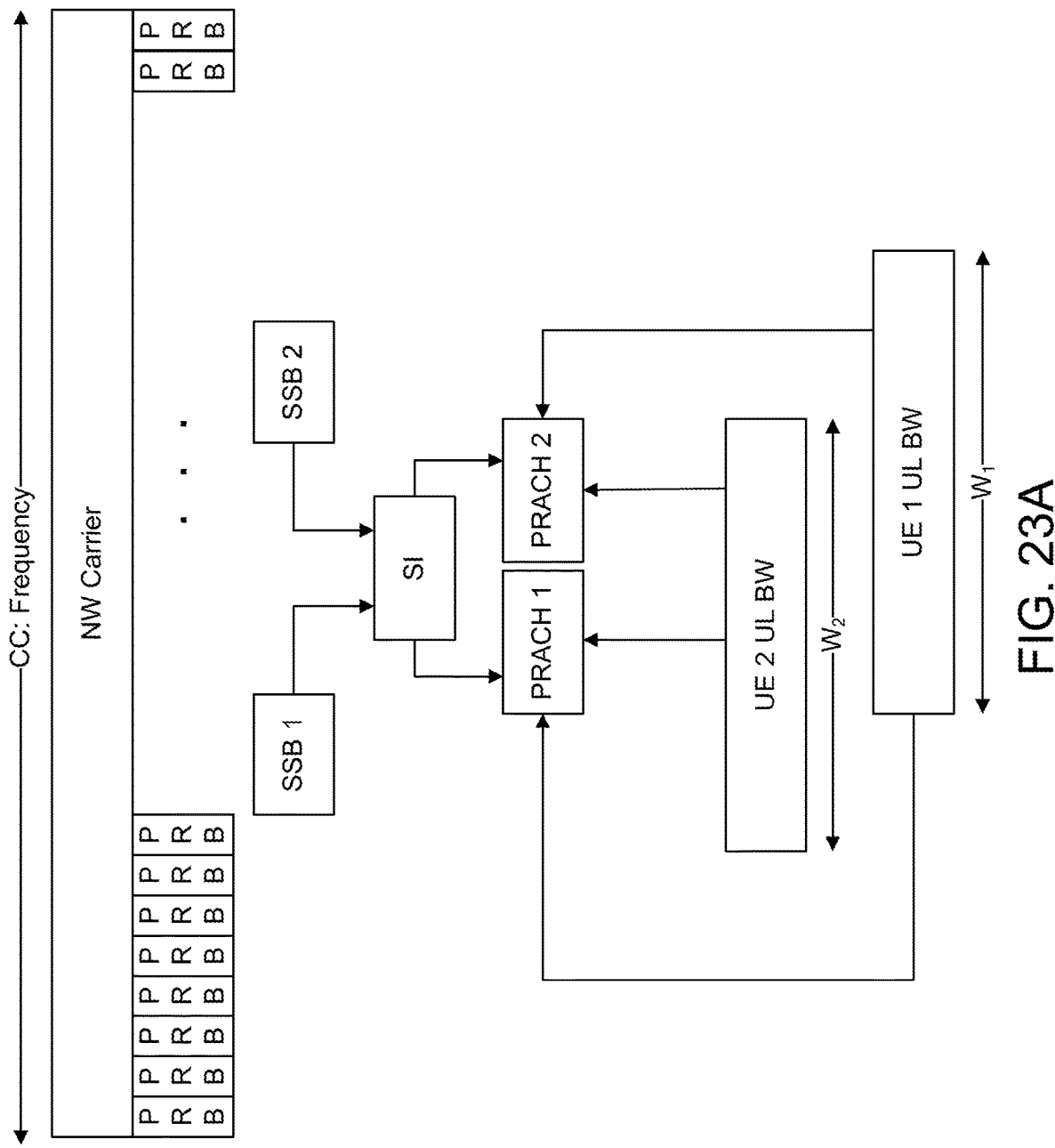

MULTIPLE TRPS AND PANELS TRANSMISSION WITH DYNAMIC BANDWIDTH FOR NR

CROSS-REFERENCE TO RELATED APPLICATIONS

This application is the National Stage Application of International Patent Application no. PCT/US2018/049879 filed Sep. 7, 2018, which claims the benefit of priority of U.S. Provisional Application No. 62/556,005 filed Sep. 8, 2017 entitled, "Multiple TRPs And Panels Transmission With Dynamic Bandwidth For NR," U.S. Provisional Application No. 62/564,897 filed Sep. 28, 2017 entitled, "Multiple TRPS And Panels Transmission With Dynamic Bandwidth For NR," U.S. Provisional Application No. 62/587,248 filed Nov. 16, 2017 entitled, "Multiple TRPs And Panels Transmission With Dynamic Bandwidth For NR," and U.S. Provisional Application No. 62/616,009 filed Jan. 11, 2018 entitled, "Multiple TRPS And Panels Transmission With Dynamic Bandwidth For NR," all of which are incorporated by reference in their entirety.

FIELD

The present application is directed to methods and systems employing multiple transmission points (TRP)s and panels for transmission with dynamic bandwidth in new radio (NR).

BACKGROUND

Existing architectures do not support signaling and configuration methods when a NR user equipment (UE) needs to monitor multiple physical downlink control channels (PDCCH)s or a co-scheduled PDCCH from primary TRP.

Existing architectures may include bandwidth parts (BWPs) supported for a wideband component carrier (CC) and a user equipment (UE) configured with multiple links. However, there are no protocols describing how the active bands work with multiple TRPs/panels. Protocols also do not exist for transmitting independent or joint PDCCHs from plural TRPs/panels.

For a physical uplink control channel (PUCCH) transmission, semi-static PUCCH resource configurations can be shared by TRPs over a non-ideal backhaul. However, there are no collision resolution protocols that prevent plural TRPs from scheduling physical uplink shared data channel (PUSCH) on the same resource.

In some instances, a bandwidth part is set with zero resources on a PCell or Scell. However, there are no protocols for the UE to handle zero resources for the BWP.

SUMMARY

This summary is provided to introduce a selection of concepts in a simplified form that are further described below in the Detailed Description. This Summary is not intended to limit the scope of the claimed subject matter. The foregoing needs are met, to a great extent, by the present application.

One aspect of the present application is directed to an apparatus on a network including a non-transitory memory including instructions stored thereon for re-establishing a remote radio control (RRC) connection with a base station. The apparatus also includes a processor, operably coupled to the non-transitory memory, capable of executing an instruction of determining a radio link failure has occurred between a first bandwidth part (BWP) of the apparatus tuned to a base station. The processor also executes the instruction of initiating a random access (RA) procedure. The processor also executes the instruction of determining whether a configured contention-based physical random access channel (PRACH) resource overlaps with the first BWP. The process further executes the instruction of transmitting a RA preamble including the configured contention-based PRACH resource to the base station. The processor even further executes the instruction of receiving a RA response from the base station.

Another aspect of the present application is directed to an apparatus on a network including a non-transitory memory including instructions stored thereon for performing beam recovery. The apparatus also includes a processor, operably coupled to the non-transitory memory, capable of executing an instruction of determining a beam quality associated with an active bandwidth part (BWP) is below a predetermined threshold. The processor also executes the instruction of initiating a random access (RA) procedure. The processor further executes the instruction of transmitting a beam recovery request (BRR). The processor even further executes the instruction of listening for a random access response (RAR) from a base station.

Yet another aspect of the present application is directed to an apparatus on a network including a non-transitory memory including instructions stored thereon for operating the apparatus in a zero bandwidth part (BWP) mode. The apparatus also includes a processor, operably coupled to the non-transitory memory, capable of executing an instruction of configuring the apparatus to monitor select functionality during the zero BWP operation. The apparatus also executes an instruction of monitoring an active or default BWP for received control signals. The apparatus further executes an instruction of evaluating a periodicity of the received control signals. The apparatus further executes an instruction of determining a timer for zero BWP operation has expired. The apparatus even further executes an instruction of returning to the active or default BWP via radio resource control (RRC) after the timer has expired.

There has thus been outlined, rather broadly, certain embodiments of the invention in order that the detailed description thereof may be better understood, and in order that the present contribution to the art may be better appreciated.

BRIEF DESCRIPTION OF THE DRAWINGS

In order to facilitate a more robust understanding of the application, reference is now made to the accompanying drawings, in which like elements are referenced with like numerals. These drawings should not be construed to limit the application and are intended only to be illustrative.

FIGS. 12A1 and 12A2 illustrate an example of a single allocated PRACH frequency resource.

FIGS. 12B1 and 12B2 illustrate an example of multiple allocated PRACH frequency resource where $SI_i \neq SI_j$ for $i \neq j$ for PRACH transmission.

FIGS. 16A1 and 16A2 illustrate an example of single allocated PRACH frequency resource.

FIGS. 16B1 and 16B2 illustrates an example of multiple allocated PRACH frequency resource.

FIG. 18A illustrates an example PRACH resource(s) associated with $SI_1$ and $SI_2$.

FIGS. 21A1 and 21A2 illustrate an example of a single allocated PRACH frequency resource.

FIGS. 21B1 and 21B2 illustrate an example of multiple allocated PRACH frequency resource.

FIG. 23A illustrates an example of PRACH resource(s) associate with $SI_1$ and $SI_2$ where $SI_i = SI_j$ for $i \neq j$.

DETAILED DESCRIPTION OF THE ILLUSTRATIVE EMBODIMENTS

Figure 1A:
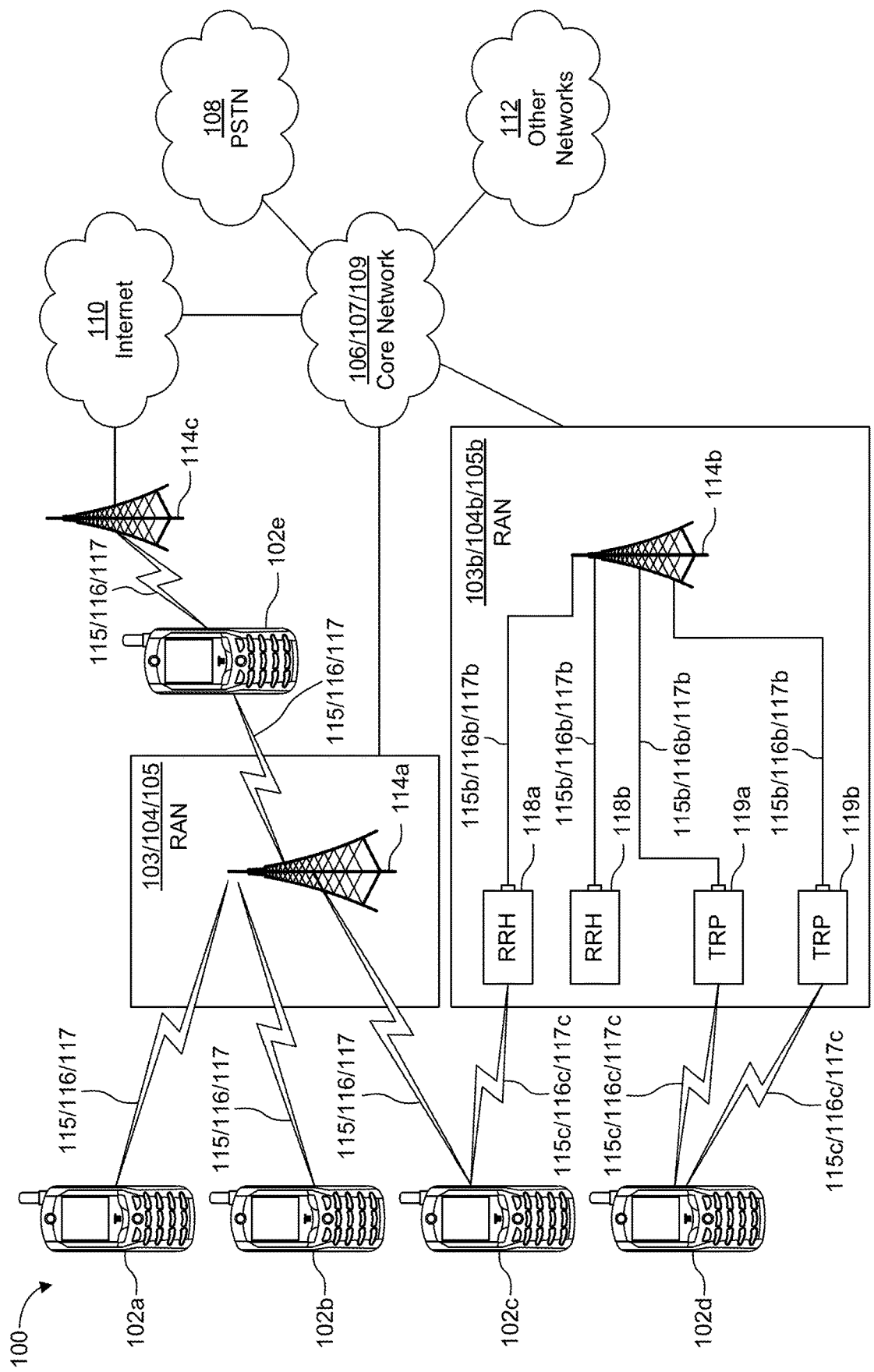
FIG. 1A illustrates an exemplary communications system according to an embodiment.

A detailed description of the illustrative embodiment will be discussed in reference to various figures, embodiments and aspects herein. Although this description provides detailed examples of possible implementations, it should be understood that the details are intended to be examples and thus do not limit the scope of the application.

Generally, the application is directed to methods and systems for monitoring multiple PDCCHs. The application is also directed to methods and system for configuring BWPs. The application is also directed to methods and systems for PUCCH resource allocation.

Acronyms

Provided below are acronyms for terms and phrases commonly used in this application in Table 1.

TABLE 1

| Acronyms | Term or Phrase |
| --- | --- |
| A/N | Ack/Nack |
| BWP | Bandwidth Part |
| BRS | Beam Reference Signal |
| CC | Component Carrier |
| CE | Control Element |
| CoMP | Coordinate Multipoint |
| CORESET | Control Resource Set |
| DL | Downlink |
| DRX | Discontinuous Reception |
| DPS | Dynamic Point Switching |
| eMBB | enhanced Mobile Broadband |
| ETWS | Earthquake and Tsunami Warning System |
| HARQ | Hybrid Automatic Repeat Request |
| KPI | Key Performance Indicators |
| LTE | Long term Evolution |
| MAC | Medium Access Control |
| MIB | Master Information Block |
| mMTC | massive Machine Type Communication |
| NACK | Non-ACKnowledgement |
| NCJT | Non-coherent Joint Transmission |
| NR | New Radio |
| PBCH | Physical Broadcast Channel |
| PDCCH | Physical Downlink Control Channel |
| PDSCH | Physical Downlink Shared Data Channel |
| PUCCH | Physical Uplink Control Channel |
| PUSCH | Physical Uplink Shared Data Channel |
| PQI | PDSCH Rate Matching and Quasi-Co-Location Indicator |
| PRACH | Physical Random Access Channel |

TABLE 1-continued

| Acronyms | Term or Phrase |
| --- | --- |
| PRB | Physical Resource Block |
| RAN | Radio Access Network |
| RBG | Resource Block Group |
| RNTI | Radio Network Temporary Identifier |
| RRC | Radio Resource Control |
| SI | System Information |
| SIB | System Information Block |
| SP | Semi-persistent |
| TDD | Time Division Duplex |
| TRP | Transmission Point |
| UE | User Equipment |
| UL | Uplink |
| URLLC | Ultra-Reliable and Low Latency Communications |

General Architecture

The $3^{rd}$ Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called NR, which is also referred to as "5G". 3GPP NR standards development is expected to include the definition of next generation radio access technology (new RAT), which is expected to include the provision of new flexible radio access below 6 GHz, and the provision of new ultra-mobile broadband radio access above 6 GHz. The flexible radio access is expected to consist of a new, non-backwards compatible radio access in new spectrum below 6 GHz, and it is expected to include different operating modes that can be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 6 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (e.g., broadband access in dense areas, indoor ultra-high broadband access, broadband access in a crowd, 50+ Mbps everywhere, ultra-low cost broadband access, mobile broadband in vehicles), critical communications, massive machine type communications, network operation (e.g., network slicing, routing, migration and interworking, energy savings), and enhanced vehicle-to-everything (eV2X) communications. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, and virtual reality to name a few. All of these use cases and others are contemplated herein.

FIG. 1A illustrates one embodiment of an example communications system 100 in which the methods and apparatuses described and claimed herein may be embodied. As shown, the example communications system 100 may include wireless transmit/receive units (WTRUs) 102a, 102b, 102c, and/or 102d (which generally or collectively may be referred to as WTRU 102), a radio access network (RAN) 103/104/105/103b/104b/105b, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d, 102e may be any type of apparatus or device configured to operate and/or communicate in a wireless environment. Although each WTRU 102a, 102b, 102c, 102d, 102e is depicted in FIGS. 1A-1E as a hand-held wireless communications apparatus, it is understood that with the wide variety of use cases contemplated for 5G wireless communications, each WTRU may comprise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 100 may also include a base station 114a and a base station 114b. Base stations 114a may be any type of device configured to wirelessly interface with at least one of the WTRUs 102a, 102b, 102c to facilitate access to one or more communication networks, such as the core network 106/107/109, the Internet 110, and/or the other networks 112. Base stations 114b may be any type of device configured to wiredly and/or wirelessly interface with at least one of the RRHs (Remote Radio Heads) 118a, 118b and/or TRPs (Transmission and Reception Points) 119a, 119b to facilitate access to one or more communication networks, such as the core network 106/107/109, the Internet 110, and/or the other networks 112. RRHs 118a, 118b may be any type of device configured to wirelessly interface with at least one of the WTRU 102c, to facilitate access to one or more communication networks, such as the core network 106/107/109, the Internet 110, and/or the other networks 112. TRPs 119a, 119b may be any type of device configured to wirelessly interface with at least one of the WTRU 102d, to facilitate access to one or more communication networks, such as the core network 106/107/109, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114b may be part of the RAN 103b/104b/105b, which may also include other base stations and/or network elements (not shown), such as a base station controller (BSC), a radio network controller (RNC), relay nodes, etc. The base station 114a may be configured to transmit and/or receive wireless signals within a particular geographic region, which may be referred to as a cell (not shown). The base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, e.g., one for each sector of the cell. In an embodiment, the base station 114a may employ multiple-input multiple output (MIMO) technology and, therefore, may utilize multiple transceivers for each sector of the cell.

The base stations 114a may communicate with one or more of the WTRUs 102a, 102b, 102c over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b and/or TRPs 119a, 119b over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b and/or TRPs 119a, 119b may communicate with one or more of the WTRUs 102c, 102d over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b and TRPs 119a, 119b in the RAN 103b/104b/105b and the WTRUs 102c, 102d, may implement a radio technology such as Universal Mobile Telecommunications System (UMTS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c, or RRHs 118a, 118b and TRPS 119a, 119b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) and/or LTE-Advanced (LTE-A). In the future, the air interface 115/116/117 may implement 3GPP NR technology.

In an embodiment, the base station 114a in the RAN 103/104/105 and the WTRUs 102a, 102b, 102c, or RRHs

118a, 118b and TRPS 119a, 119b in the RAN 103b/104b/ 105b and the WTRUs 102c, 102d, may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114c and the WTRUs 102e, may implement a radio technology such as IEEE 802.11 to establish a wireless local area network (WLAN). In an embodiment, the base station 114c and the WTRUs 102d, may implement a radio technology such as IEEE 802.15 to establish a wireless personal area network (WPAN). In yet another embodiment, the base station 114c and the WTRUs 102e, may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication.

Although not shown in FIG. 1A, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d, 102e to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 and/or RAN 103b/104b/105b or a different RAT.

Some or all of the WTRUs 102a, 102b, 102c, 102d in the communications system 100 may include multi-mode capabilities, e.g., the WTRUs 102a, 102b, 102c, 102d, and 102e may include multiple transceivers for communicating with different wireless networks over different wireless links. For example, the WTRU 102e shown in FIG. 1A may be configured to communicate with the base station 114a, which may employ a cellular-based radio technology, and with the base station 114c, which may employ an IEEE 802 radio technology.

Figure 1B:
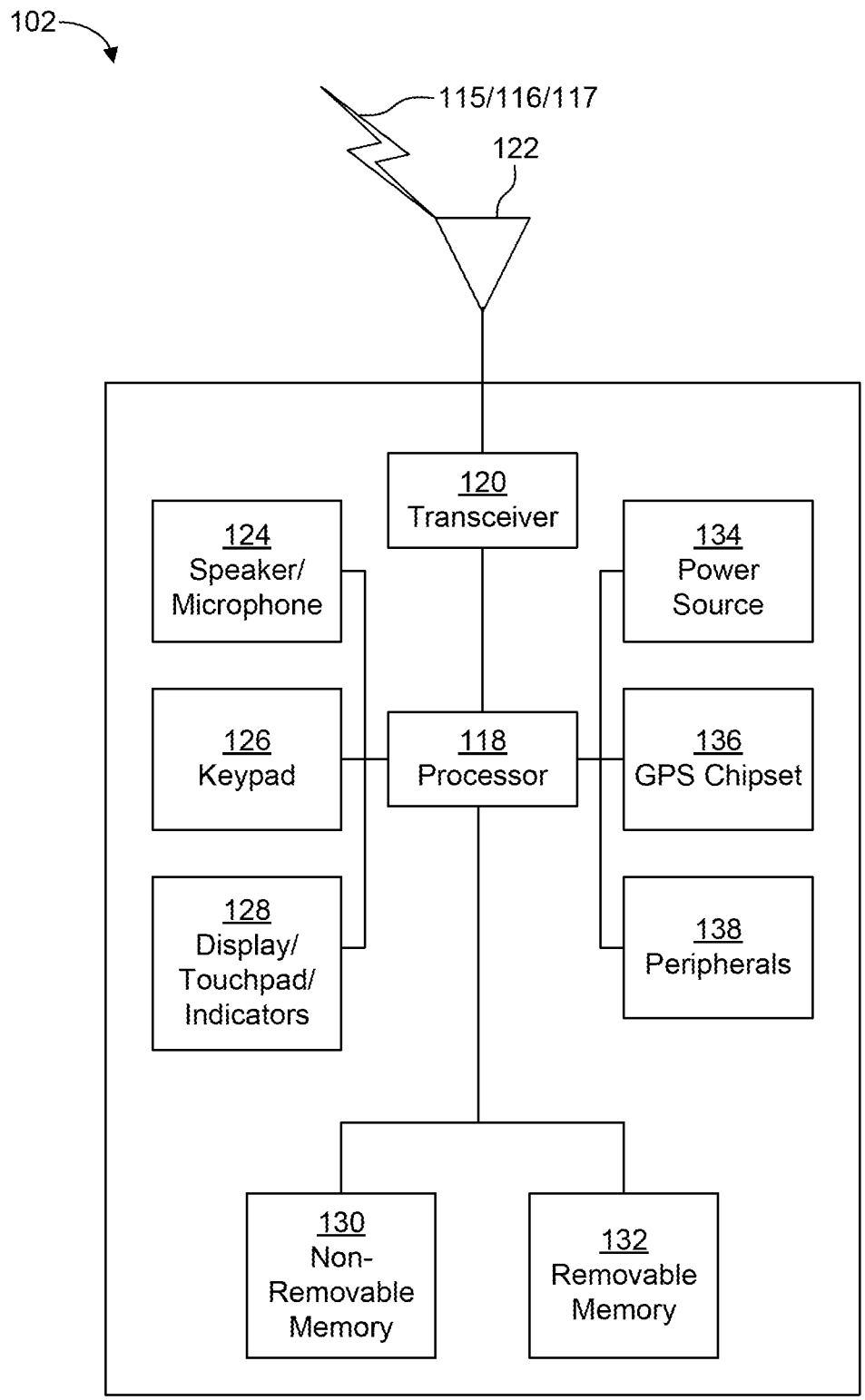
FIG. 1B illustrates an exemplary apparatus configured for wireless communication according to an embodiment.

FIG. 1B is a block diagram of an example apparatus or device configured for wireless communications in accordance with the embodiments illustrated herein, such as for example, a WTRU 102. As shown in FIG. 1B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to, transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/ 117. For example, in an embodiment, the transmit/receive element 122 may be an antenna configured to transmit and/or receive RF signals. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, e.g., the WTRUs 102a, 102b, 102c, and 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

FIG. 1B is a block diagram of an example apparatus or device configured for wireless communications in accordance with the embodiments illustrated herein, such as for example, a WTRU 102. As shown in FIG. 1B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit). The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may comprise one of the peripherals 138.

Figure 1C:
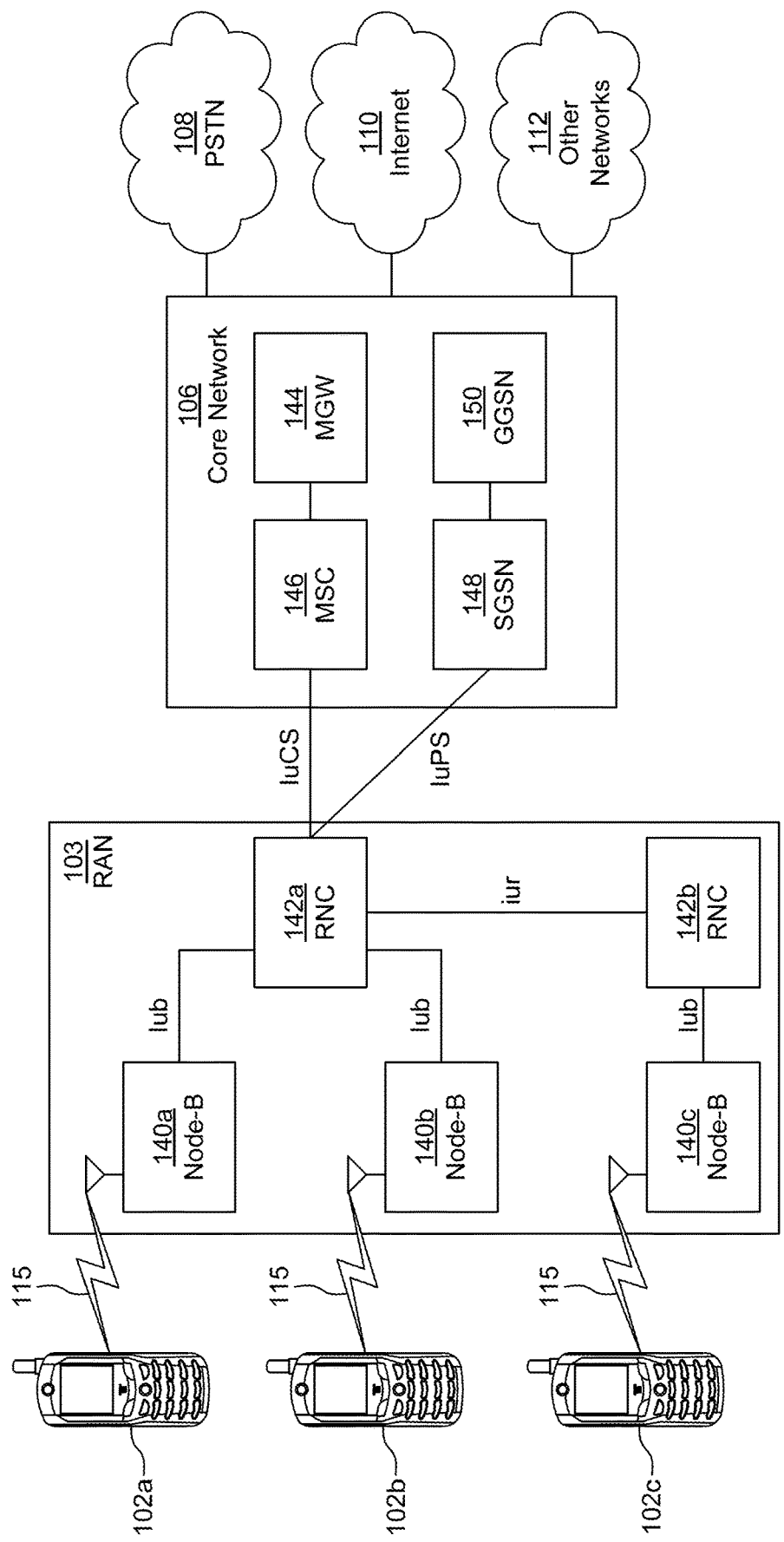
FIG. 1C illustrates a system diagram of a radio access network and a core network according to an embodiment.

FIG. 1C is a system diagram of the RAN 103 and the core network 106 according to an embodiment. As noted above, the RAN 103 may employ a UTRA radio technology to communicate with the WTRUs 102a, 102b, and 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro-diversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
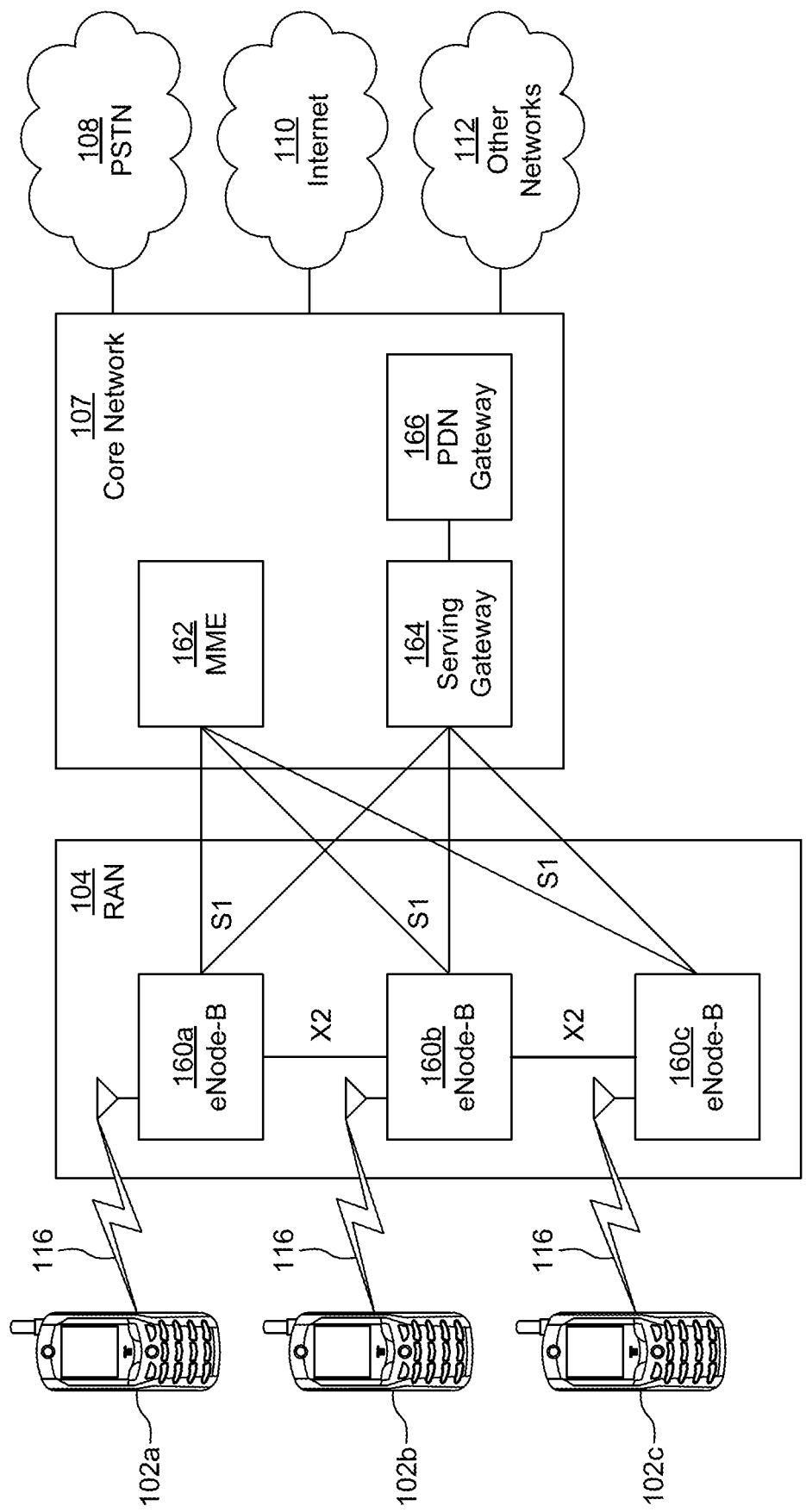
FIG. 1D illustrates a system diagram of a radio access network and a core network according to another embodiment.

FIG. 1D is a system diagram of the RAN 104 and the core network 107 according to an embodiment. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
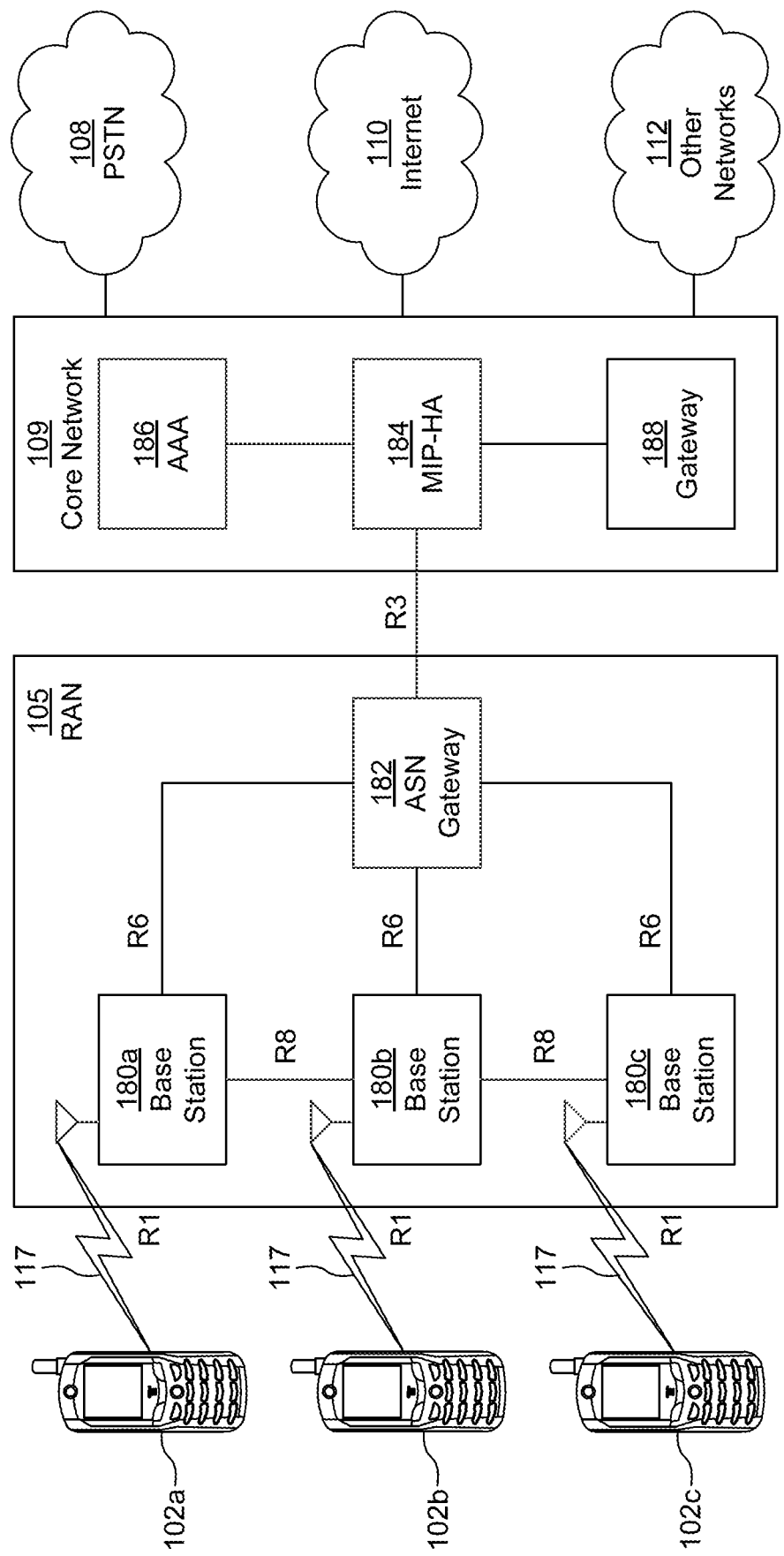
FIG. 1E illustrates a system diagram of a radio access network and a core network according to yet another embodiment.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, and 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell in the RAN 105 and may include one or more transceivers for communicating with the WTRUs 102a, 102b, 102c over the air interface 117. In an embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, and 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, and 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

The core network entities described herein and illustrated in FIGS. 1A, 1C, 1D, and 1E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 1A, 1B, 1C, 1D, and 1E are provided by way of example only, and it is understood that the subject matter disclosed and claimed herein may be embodied or implemented in any similar communication system, whether presently defined or defined in the future.

Figure 1F:
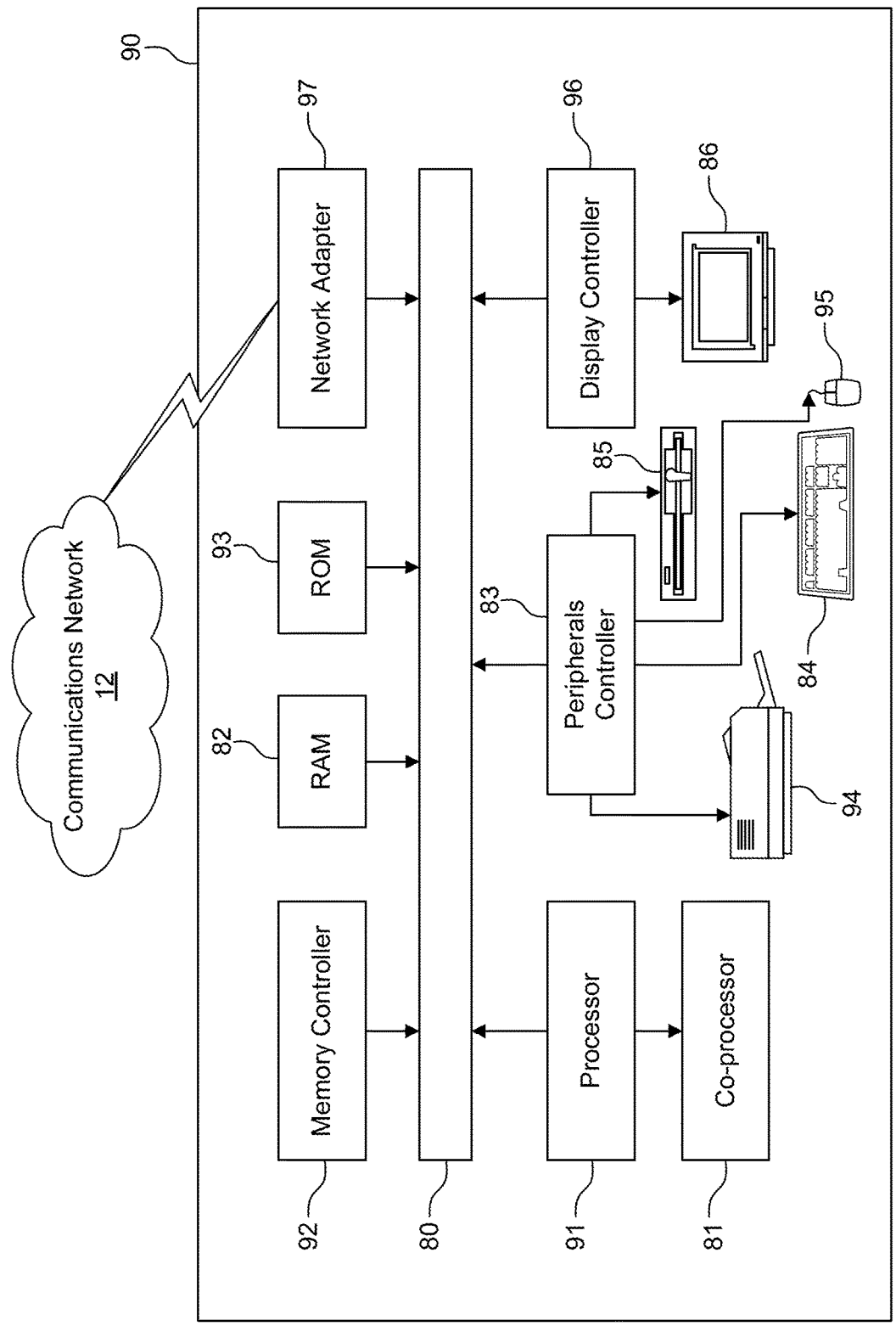
FIG. 1F illustrates a block diagram of an exemplary computing system in communication with one or more networks previously shown in FIGS. 1A, 1C, 1D and 1E according to an embodiment.

FIG. 1F is a block diagram of an exemplary computing system 90 in which one or more apparatuses of the communications networks illustrated in FIGS. 1A, 1C, 1D and 1E may be embodied, such as certain nodes or functional entities in the RAN 103/104/105, Core Network 106/107/109, PSTN 108, Internet 110, or Other Networks 112. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adapter 97, that may be used to connect computing system 90 to an external communications network, such as the RAN 103/104/105, Core Network 106/107/109, PSTN 108, Internet 110, or Other Networks 112 of FIGS. 1A, 1B, 1C, 1D, and 1E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations or functions described herein may be implemented in the form of such computer executable instructions, executing on the processor of an apparatus or computing system configured for wireless and/or wired network communications. Computer readable storage media include volatile and nonvolatile, removable and non-removable media implemented in any non-transitory (e.g., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computing system.

Reference Signals in LTE

3GPP TR 38.913 defines scenarios and requirements for NR technologies. Descriptions and requirements of the Key Performance Indicators (KPIs) for eMBB, URLLC and mMTC devices are summarized in Table 2 below.

TABLE 2

| Device | KPI | Description | Requirement |
|---|---|---|---|
| eMBB | Peak data rate | Peak data rate is the highest theoretical data rate corresponding to the received data bits assuming error-free conditions assignable to a single mobile station, when all assignable radio resources for the corresponding link direction are utilized (i.e., excluding radio resources that are used for physical layer synchronization, reference signals or pilots, guard bands and guard times). | 20 Gbps for downlink and 10 Gbps for uplink |
| | Mobility interruption time | Mobility interruption time means the shortest time duration supported by the system during which a user terminal cannot exchange user plane packets with any base station during transitions. | 0 ms for intra-system mobility |
| | Data Plane Latency | For eMBB value, the evaluation needs to consider all typical delays associated with the transfer of the data packets in an efficient way (e.g., applicable procedural delay when resources are not pre-allocated, averaged HARQ retransmission delay, impacts of network architecture). | 4 ms for UL, and 4 ms for DL |

TABLE 2-continued

| Device | KPI | Description | Requirement |
|---|---|---|---|
| URLLC | Control Plane Latency | Control plane latency refers to the time to move from a battery efficient state (e.g., IDLE) to start of continuous data transfer (e.g., ACTIVE). | 10 ms |
| | Data Plane Latency | For URLLC the target for user plane latency for UL and DL. Furthermore, if possible, the latency should also be low enough to support the use of the next generation access technologies as a wireless transport technology that can be used within the next generation access architecture. | 0.5 ms |
| | Reliability | Reliability can be evaluated by the success probability of transmitting X bytes (1) within 1 ms, which is the time it takes to deliver a small data packet from the radio protocol layer 2/3 SDU ingress point to the radio protocol layer 2/3 SDU point of the radio interface, at a certain channel quality (e.g., coverage-edge). NOTE1: Specific value for X is FFS. | 1-10-5 within 1 ms |
| mMTC | Coverage | "Maximum coupling loss" (MCL) in uplink and downlink between device and Base Station site (antenna connector(s)) for a data rate of [X bps], where the data rate is observed at the egress/ingress point of the radio protocol stack in uplink and downlink. | 164 dB |
| | UE Battery Life | User Equipment (UE) battery life can be evaluated by the battery life of the UE without recharge. For mMTC, UE battery life in extreme coverage shall be based on the activity of mobile originated data transfer consisting of [200 bytes] Uplink (UL) per day followed by [20 bytes] Downlink (DL) from Maximum Coupling Loss (MCL), assuming a stored energy capacity of [5 Wh]. | 15 years |
| | Connection Density | Connection density refers to total number of devices fulfilling specific Quality of Service (QoS) per unit area (per km$^2$). QoS definition should take into account the amount of data or access request generated within a time t_gen that can be sent or received within a given time, t_sendrx, with x % probability. | 106 devices/km$^2$ |

LTE TM10

TM10 is defined in 3GPP Rel-11 and includes the following functionality: (i) enables DL CoMP operation and is configurable per serving cell; (ii) TM10 offers serving cell to configure UE to evaluate and report multiple sets of CSI-RS; thereby, allowing evaluation of multiple transmission points in CoMP measurement set; (iii) TM-10 also supports use of UE specific DMRS (2 UE DMRS scrambling IDs) for DL transmission; and (iv) supports use of DCI-1A & new DCI format 2D, used for CS/CB or to allow PDSCH resource element mapping when using JP.

Configuration Methods for Multiple TRPs/Panels

According to an aspect of the application, a UE can monitor multiple PDCCHs or co-schedule multiple PDSCHs. Monitoring occurs if a UE is configured with two (or multiple), non-zero power NZP-CSI (CSI-RS) processes. Monitoring may also occur if the PDSCH and Quasi-Co-Location Indicator (or PQI) field in DCI, where the configured parameter set 'n,' indicates multiple CORESETs.

In an embodiment, a CSI process is a time series of subframes where the CSI-RS and IMR corresponding to a given transmission hypothesis. The time series of subframes is where the CSI is fed back. For example, in the subframes of the first CSI process, the TRP 1 configures and transmits CSI-RS with initialization parameter $Y_1$. In the subframes of the second process, the TRP 2 configures and transmits CSI-RS with initialization parameter $Y_2$. The values of parameters $Y_1$ and $Y_2$ are configured for the UE by RRC or MAC-CE signalings. The NZP-CSI-RS process can be triggered by periodic or aperiodic settings of a CSI request. The CSI triggering for multiple TRPs can use a M-bit CSI request field. An example of M=2 bits is shown in Table 3 below.

TABLE 3

| Value of CSI request field | Description |
|---|---|
| 00 | No CSI is triggered |
| 01 | A report is triggered for a set of CSI process(es) configured by RRC/MAC-CE for serving cell |
| 10 | A report is triggered for a first set of CSI process(es) configured by RRC/MAC-CE |
| 11 | A report is triggered for a second set of CSI process(es) configured by RRC/MAC-CE |

Here, a CSI process is defined by a CSI-RS resource, a CSI-IM resource and a reporting mode. A CSI process is RRC/MAC-CE configured to the UE by the association of: (i) numerology, slot and subframe configuration; (ii) one non-zero-power CSI-RS resource from the CoMP measurement set; (iii) one interference measurement resource (IMR); (iv) one CSI reporting mode (PUCCH or PUSCH); and (v) other feedback-related parameters such as codebook subset restriction.

For example, to support 2 TRP transmissions, a unique CSI-RS is transmitted by each cooperating TRPs. The UE is configured with two CSI-RS resources to provide channel quality estimates. Each of the CSI-RS resources is transmitted from one of the transmission points. For example, CSI-RS #0 is transmitted from TRP 1 and CSI-RS #1 is transmitted from TRP 2. In particular, four transmission hypotheses can be implemented by four CSI processes. Employing the CSI-RS and CSI-IM resources. Table 4 below illustrates this embodiment.

TABLE 4

|  | TRP1 Hypothesis | TRP2 Hypothesis | CSI-RS | CSI-IM |
| --- | --- | --- | --- | --- |
| Process #0 | Transmitting PDSCH | Muting | CSI-RS #0 | CSI-IM #0 |
| Process #1 | Muting | Transmitting PDSCH | CSI-RS #1 | CSI-IM #0 |
| Process #2 | Transmitting PDSCH | Interfering | CSI-RS #0 | CSI-IM #1 |
| Process #3 | Interfering | Transmitting PDSCH | CSI-RS #1 | CSI-IM #2 |

As shown above in Table 4, the CSI-IM #0 resource is used for both TRP 1 and TRP 2 to measure interference. There are two options for CSI reporting. In the first option, separate TRP reporting is performed. Specifically, if a UE is configured with a separate CSI reporting setting for each TRP, the UE reports the PMI/RI, codebook and CQI for reporting TRP. In the second option, joint TRP reporting is performed. Specifically, if a UE is configured with a single CSI reporting setting, the UE jointly reports the PMI/RI, codebook and CQI for each TRP.

According to an exemplary embodiment in narrow band (NB), the UE camps on a wideband CC and is triggered with multiple CSI processes based on the following scenarios. For example, one option for CSI reporting is based on determining if any configured (NZP) CSI-RS and/or CSI-IM resource is not in the active bands though triggered by a CSI request. If so, the UE can ignore the corresponding CSI reporting and terminate select CSI processes not in the active band. Meanwhile, if multiple TRPs' CSIs are jointly reported, and not in the active band, then the reporting CSI is zeroed out. Alternatively, the reporting CSI is truncated if not in the active bands. If multiple TRPs' CSIs are separately reported, there is no corresponding CSI reporting activity. Further, if a CSI-RS resource is not in the active bands and QCLed with a DMRS-group, then the associated DMRS-group cannot be used for PDSCH demodulation if gap CSI measurement is supported.

If a CSI-RS resource is not in the active bands and out of active bands (or gap), CSI measurement is allowed. Accordingly, one or more of the corresponding CSI processes can be performed. In one CSI process, gap CSI measurement configured via higher layer signaling is performed. To support active bands, if higher layer signaling RRC or the MAC-CE updates the CSI-RS and/or CSI-IM resource configuration parameters, then the UE can reactive the corresponding CSI processes when new CSI request is re-issued.

Figure 2:
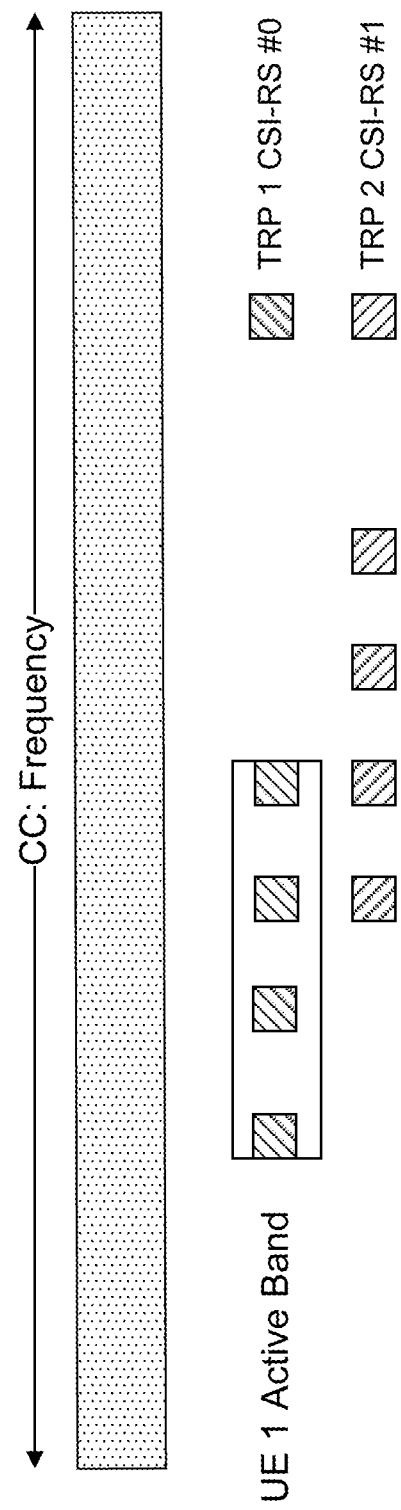
FIG. 2 illustrates a channel state information (CSI) resource not in an UE active band with gap CSI measurement not being supported.

An embodiment is exemplarily illustrated in FIG. 2 whereby the configured CSI-RS resource #1 from TRP 2 is not in the active bands and the gap CSI measurement is not allowed/supported. If so, the CSI process #0, process #1 and process #3, as referred to in Table 3, can be terminated. Here, there are two CSI-RS resources #0 (from TRP 1) and #1 (from TRP 2) configured for multiple TRPs. The CSI-RS #0 resource is in the active band. CSI-RS #1 resource is not in the active band. Gap measurement is not allowed because the UE either does not support or enable the gap measurement due to a power saving or UE capability limitation. Accordingly, the corresponding CSI processes (or hypotheses) related to CSI-RS resource #1 are process #0, process #1 and process #3 can be stopped.

Figure 3:
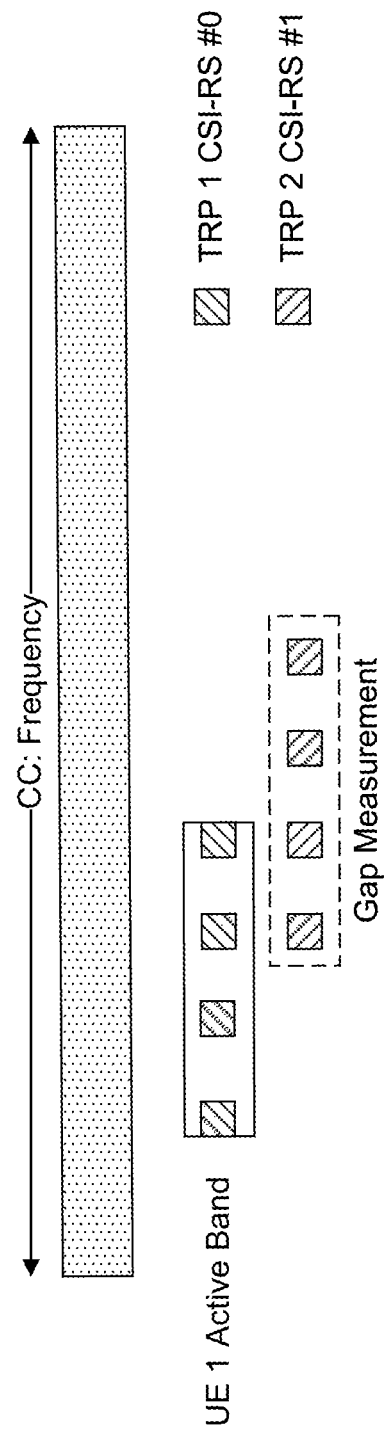
FIG. 3 illustrates a CSI-RS resource not in a UE active band with gap CSI measurements being supported.

According to yet another embodiment as exemplarily shown in FIG. 3, if the configured CSI-RS resource #1 from TRP 2 is not in the active bands and gap CSI measurement is supported, then the CSI process #0, process #1 and process #3, as referred to in Table 4 above, can be processed when the CSI request is triggered. Here, there are two CSI-RS resources #0 (from TRP 1) and #1 (from TRP 2) configured for multiple TRPs. However, only the CSI-RS #0 resource is in the active band. CSI-RS #1 resource is not in the active band. Since gap measurement is supported, and the corresponding CSI processes (or hypotheses) related to CSI-RS resource #1 in Table 4 can be reported.

PDSCH Rate Matching and Quasi-Colocation Indicator Configuration

According to yet another embodiment, a UE can be configured up to 'N' parameter set lists by RRC and/or MAC-CE signaling to decode multiple PDSCHs by a detected PDCCH with the DCI intended for the UE and the given serving cell. The UE shall use the parameter set list per the value of the PDSCH and Quasi-Co-Location Indicator field (i.e., mapping defined in Table 5 below) in the detected PDCCH with DCI for determining PDSCH antenna port quasi co-location. The configured parameter set list may include one or two RS sets. The UE may infer the antenna ports of one or two DM-RS port groups of PDSCH of a serving cell are quasi co-located with the corresponding one or two RS sets given by the indicated parameter set list. Each RS set is configured with one or more RS(s) which are QCLed with DM-RS ports within corresponding DM-RS group.

TABLE 5

| Value of 'PDSCH and Quasi-CoLocation Indicator' field | Description |
| --- | --- |
| 00 . . . 0 | Parameter set 1 configured by RRC and/or MAC-CE |
| . . . | Parameter set n configured by RRC and/or MAC-CE |
| . . . | Parameter set n + 1 configured by RRC and/or MAC-CE |
| . | . |
| . | . |
| . | . |
| 11 . . . 1 | Parameter set N configured by RRC and/or MAC-CE |

Parameter set 'n' configured by RRC and/or MAC-CE can include the following parameter settings: (i) a cell/TRP's TRS position (number of ports and frequency shift); (ii) a cell/TRP's numerology, slot and subframe configuration; (iii) a zero-power CSI-RS (CSI-IM) configuration; (iv) a value of PDSCH starting symbol; (v) a CSI-RS resource index for DMRS quasi-co-location; (vi) a cell/TRP's SS burst set location; and (vii) CORESET locations for monitoring single PDCCH or multiple PDCCHs.

For clarity, parameter set 'n' configured for multiple TRPs/Panels by RRC and/or MAC-CE can cause the UE to perform signaling of the capability of two NR-PDCCHs/PDSCHs at one time while configuring the plural PDCCHs at separate times.

When a UE is configured to monitor multiple (or two) PDCCHs, and assuming the UE receives PDCCH transmissions from both the primary PDCCH (primary TRP) and secondary PDCCH (second TRP), the primary PDCCH and secondary PDCCH can simultaneously be received. Active bands can be dynamically configured by the primary cell or TRP. Primary PDCCH and secondary PDCCH can be received in different timeslots.

Figure 4A:
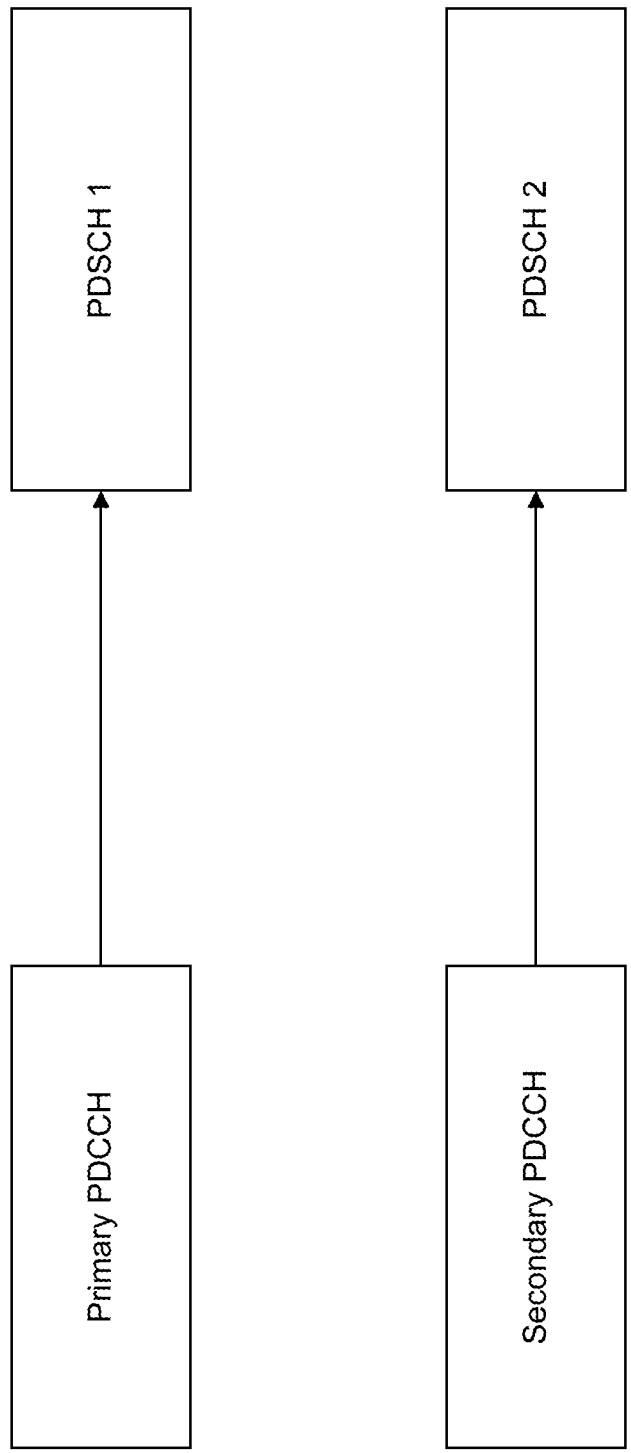
FIG. 4A illustrates a UE monitoring plural PDCCHs with independent active bands.
Figure 4B:
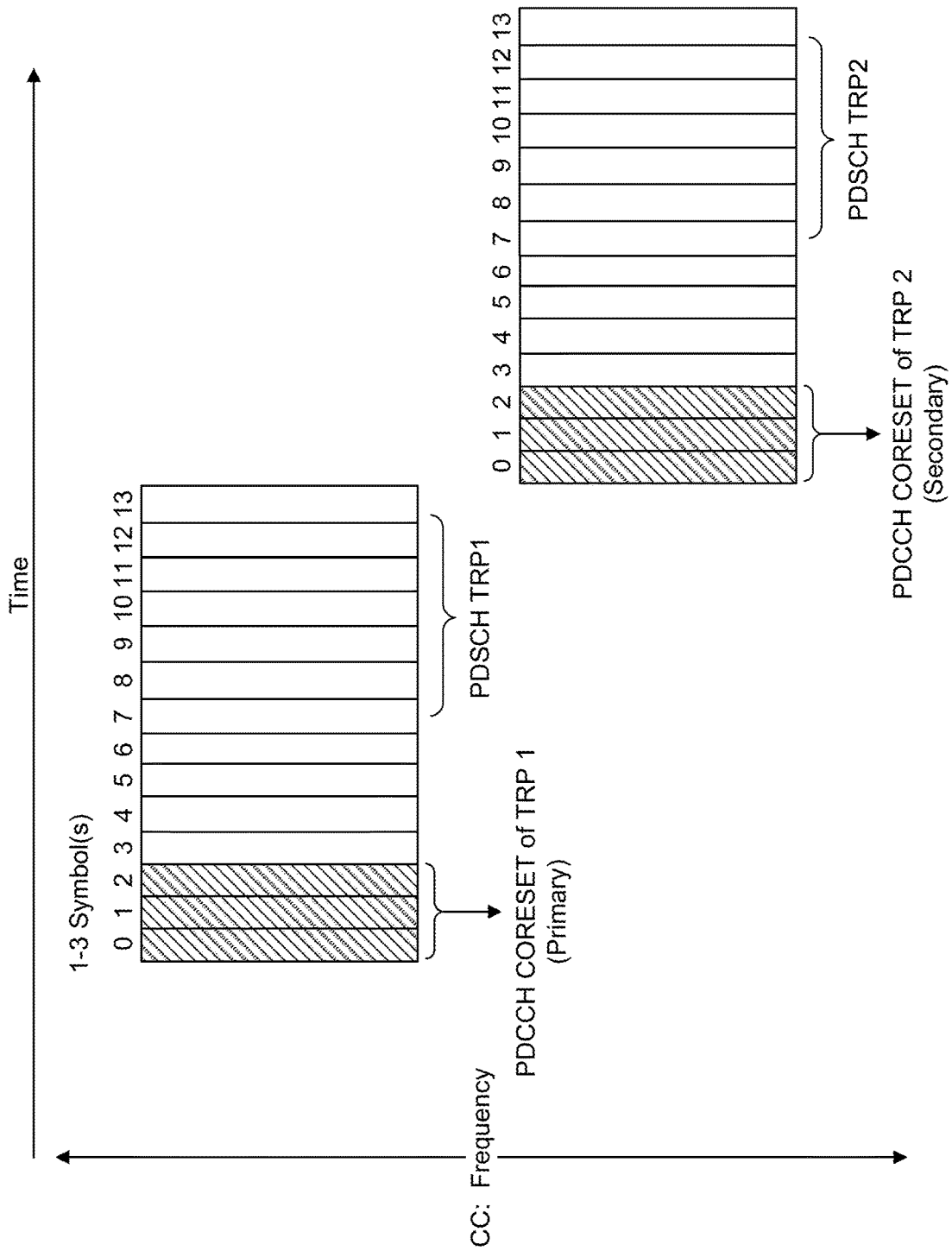
FIG. 4B illustrates a UE monitoring plural PDCCHs with a BWP being independently and dynamically configured by primary and secondary TRPs at different times.
Figure 4C:
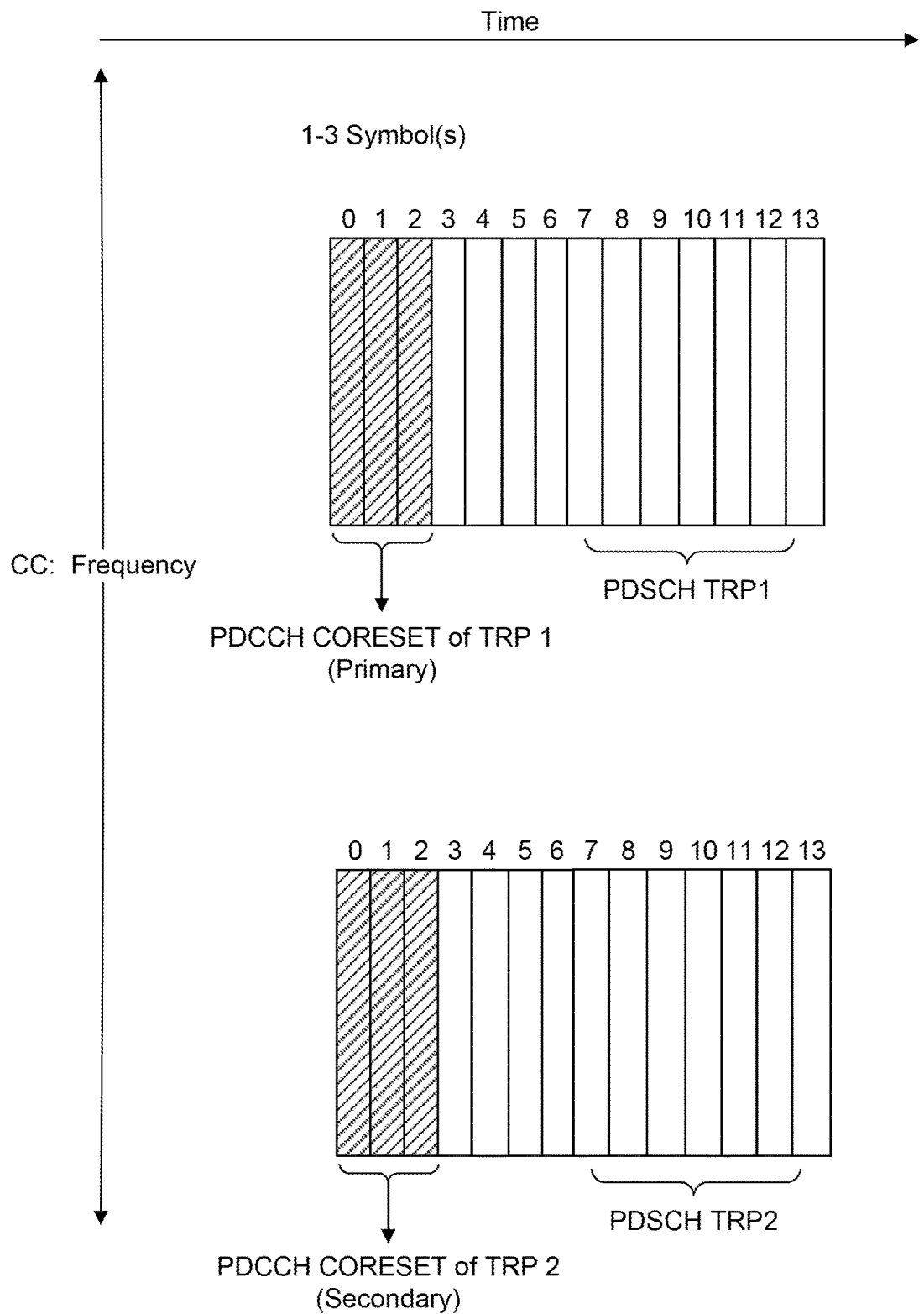
FIG. 4C illustrates a UE monitoring plural PDCCHs with a BWP being independently and dynamically configured by primary and secondary TRPs at the same time.

Active bands can be independently configured by primary PDCCH and secondary PDCCH and DCI. When supporting DPS/DCS with BWP, e.g., UE monitors multiple PDCCHs either from primary TRP or secondary TRP at different or same timeslots, each TRP can dynamically set up active bands independently. This is exemplarily shown in FIGS. 4A-C.

Figure 5A:
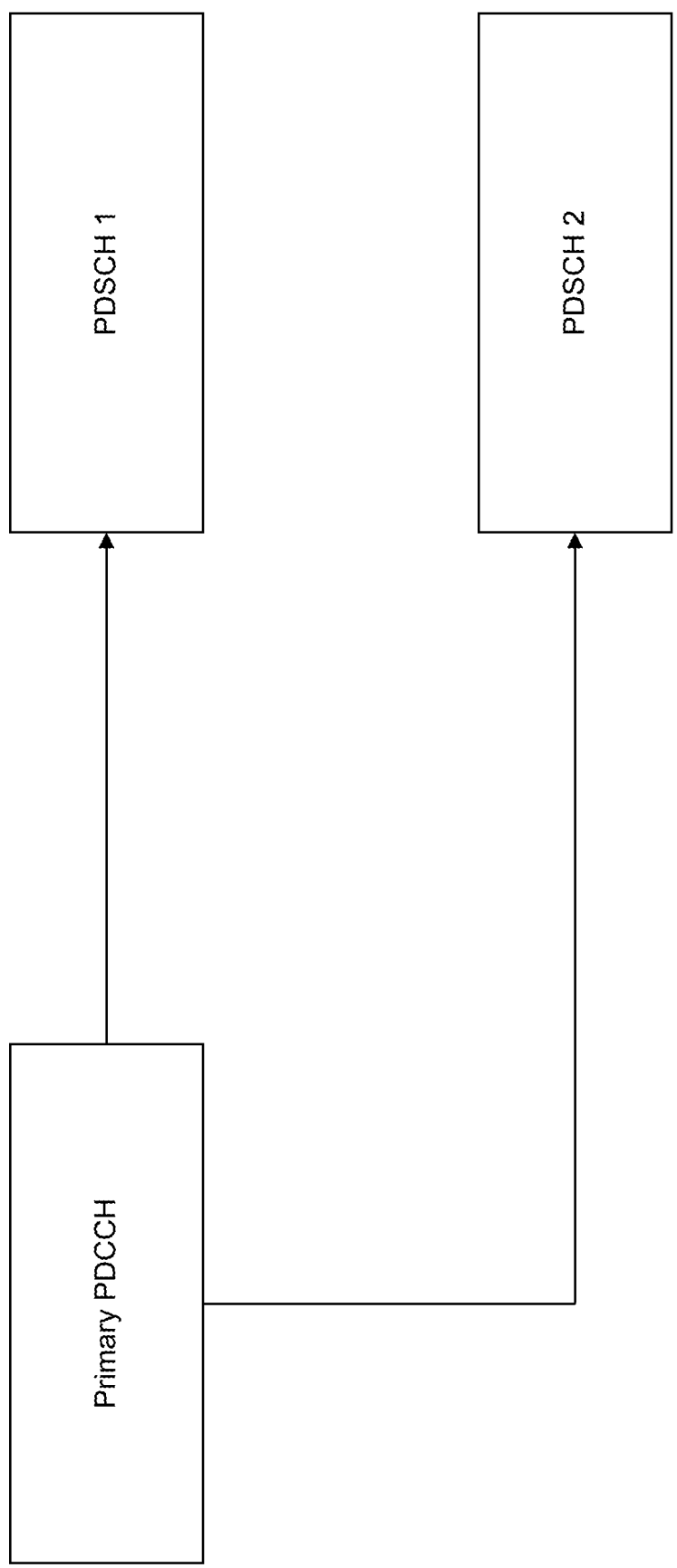
FIG. 5A illustrates a UE monitoring a single PDCCH with a co-scheduling secondary PDCCH.
Figure 5B:
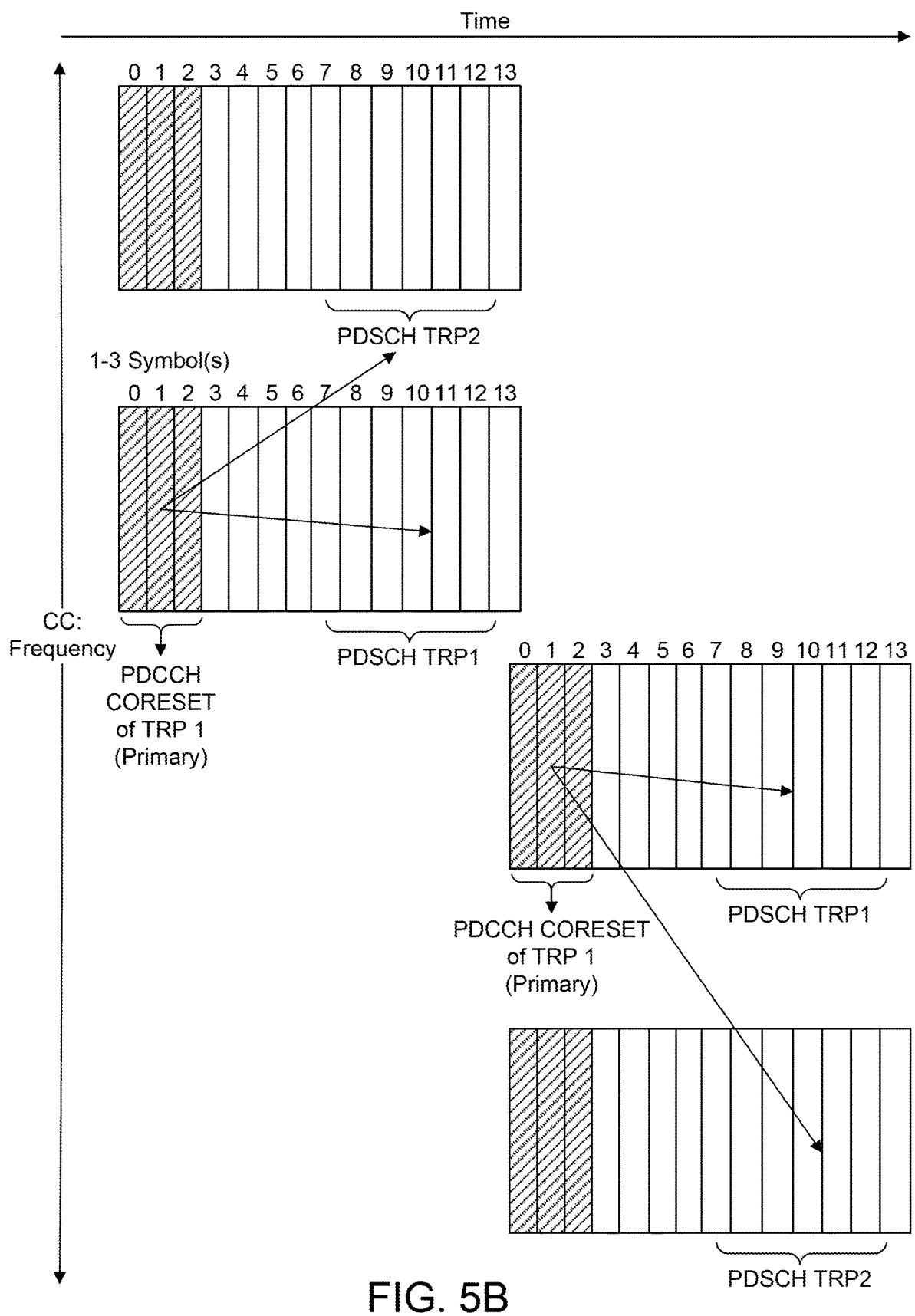
FIG. 5B illustrates a UE monitoring a single PDCCH with a BWP that can independently and dynamically configured by a primary PDCCH DCI.

According to another embodiment, assuming the UE receives PDCCH transmission from a primary PDCCH, when a UE is configured to monitor a single PDCCH, primary PDCCH should co-schedule multiple PDSCHs. This is exemplarily shown in FIGS. 5A-B.

Figure 6:
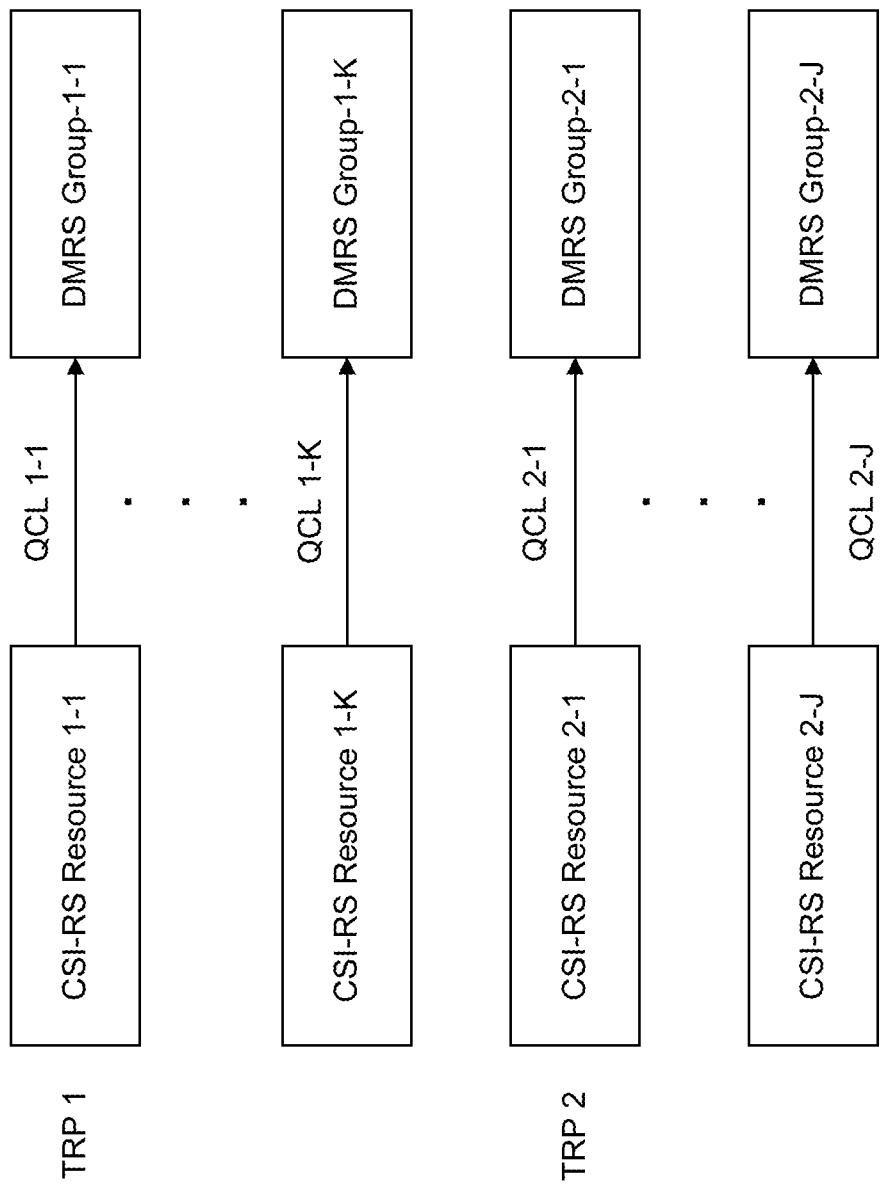
FIG. 6 illustrates CSI-RS resources QCL with DMRS-group for multiple TRP reception.

Regarding DMRS configuration for PDSCH (which TRP), it can be transparent to TRP because DCI configures the corresponding DMRS resource for the DCS/DPS case. For the NCJT case, since only one DM-RS port group is allowed for each TRP within a coordinating set, two RS sets with the same RS indices can be configured in each PQI state within DCI from corresponding TRPs for minimizing the number of DCI formats. This is exemplarily shown in FIG. 6.

The DMRS group set can be used for indicating a PUCCH resource for HARQ process A/N feedback and CSI report. A/N from different HARQ processes can include either multiplexing or bundling. If a UE is only configured, it is a (primary) co-scheduling PDCCH.

A detailed design method for indicating UL PUCCH resource allocation via CSI-RS or DMRS configuration is described according to an embodiment. Specifically, the seed value used to initialize the scrambling sequence for CSI-RS is set as:

$$c_{init} = 2^{10} \cdot (14(n_s + 1) + l + 1) \cdot (2Y + 1) + 2Y + N_{CP},$$

$$N_{CP} = \begin{cases} 1 & \text{for normal } CP \\ 0 & \text{for extended } CP \end{cases}$$

where Y can be any value from the range of all possible cell IDs and does not have to be the cell ID of the serving cell (or any other cell in the CoMP measurement set). The PUCCH resource can be set as a function of Y, e.g., the PUCCH resource can be expressed as $f(Y)$, where $f(Y)$ is a mapping function of Y then the PDCCH resources mapping from two CSI-RS $Y_1$ and $Y_2$ are equal to $f(Y_1)$ and $f(Y_2)$ respectively. To ensure two PDCCH resources do not overlap, $f(Y_1) \neq f(Y_2)$ for any $Y_1 \neq Y_2$. $f(Y_1)$ and $f(Y_2)$ are allocated at different non-overlapping OFDM symbols, e.g., PUCCH resource from different TRP is TDM, thus for any $Y_1 \neq Y_2$, the PUCCH resources from different TRPs do not overlap. If multiple (or two) PUCCHs are setup separately, then there is one CSI-RS or DMRS used and the PUCCH resource can be uniquely determined. Meanwhile, if multiple (or two) PUCCHs are setup separately, there is one CSI-RS or DMRS used and the PUCCH resource can be uniquely determined. The number of transmit layers from each TRP can be independently configured by either co-scheduling PDCCH DCI or each PDCCH DCI.

Figure 7:
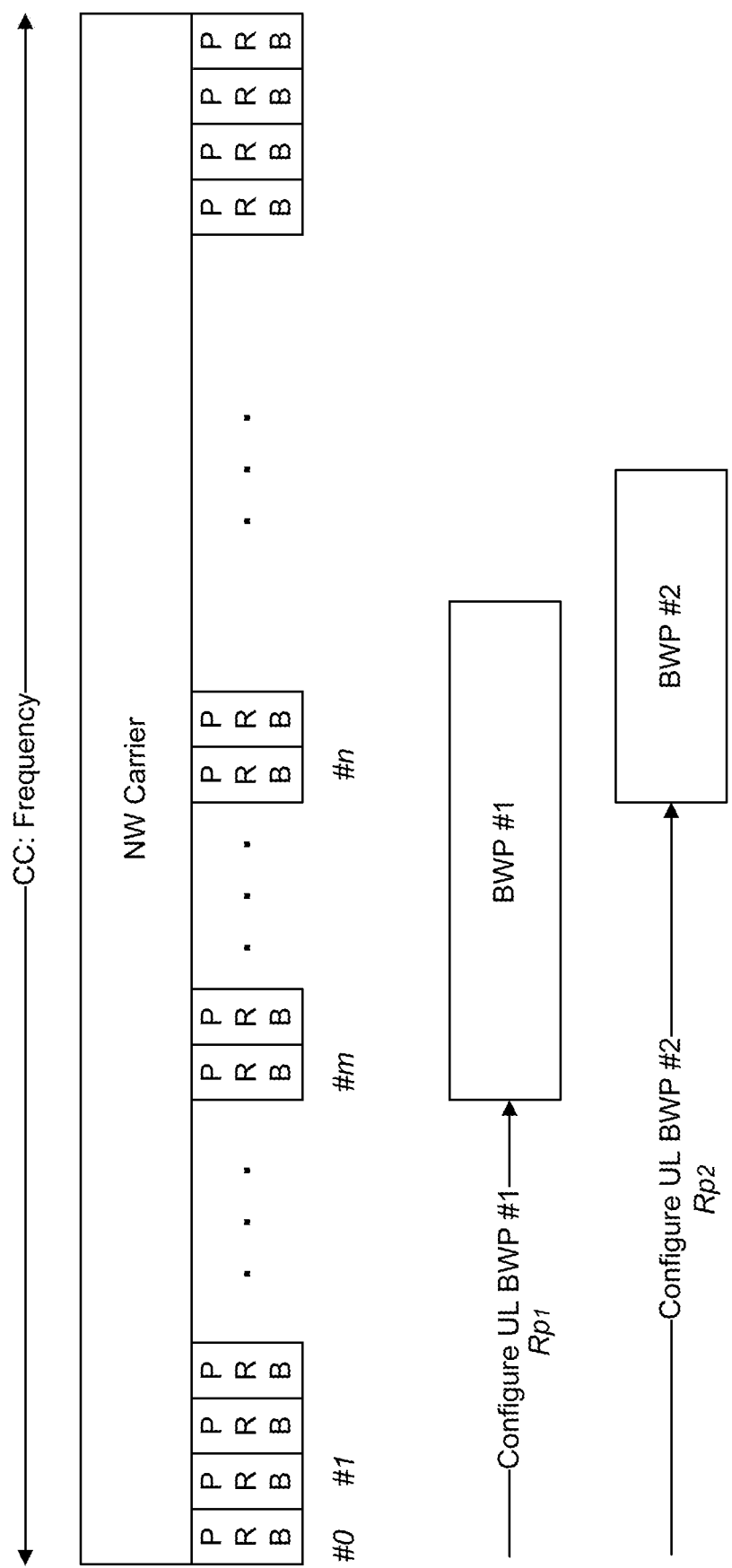
FIG. 7 illustrates an uplink BWP configuration for FDD systems.

For TDD or self-contained subframe systems, the UL BWP is similarly set as the configured DL BWP. No extra higher layer or DCI signaling is required because the UE is not expected to retune the center frequency of channel BW between the DL and UL for TDD or self-contained subframe systems. For FDD systems, the allocated UL BWP can be independently configured via the UL grant. In an exemplarily embodiment, FIG. 7 illustrates a BWP configuration example for FDD system. There are two UL BWPs configured via an UL grant. The first UL BWP #1 starts with the m-th PRB and the second UL BWP #2 starts with the n-th PRB.

Default BWP

Figure 8:
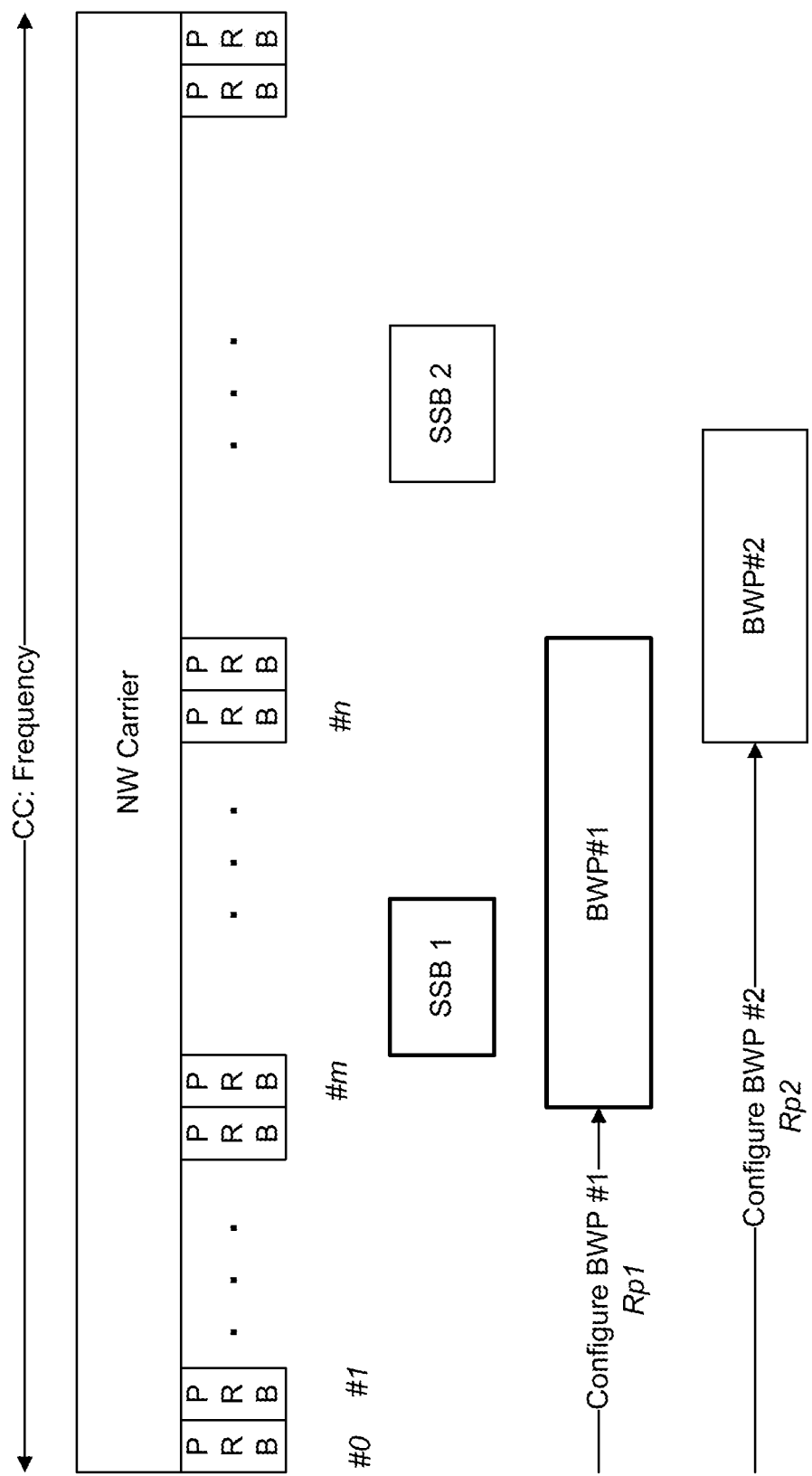
FIG. 8 illustrates an exemplary BWP configuration.

In yet another embodiment of the application, for gNB or Cell/TRP, either can configure at least one DL BWP as a default BWP and the default BWP(s) should contain a SS burst set within UE's BW. Those SS burst information can be configured via system information (SI). In FIG. 8, there are 2 BWPs setup in this example. BWP #1 can be treated as a default BWP because there is a SS burst set, e.g., SSB1, within BWP #1.

The default BWP setup can have the following options in multiple TRP reception when BWP #2 comes from a different cell (e.g., BWP #1 is associated with Cell #1 and BWP #2 is associated with Cell #2). If PDCCH is jointly scheduled, e.g., there is a single PDCCH co-scheduled for Cell #1 and Cell #2, then BWP #1 and BWP #2 can use the same default BWP (e.g., the primary). If PDCCHs are separately scheduled, e.g., there are multiple PDCCHs independently scheduled from cell #1 and cell #2, then each configured BWP use their own default BWP associated with the cell.

Figure 9A:
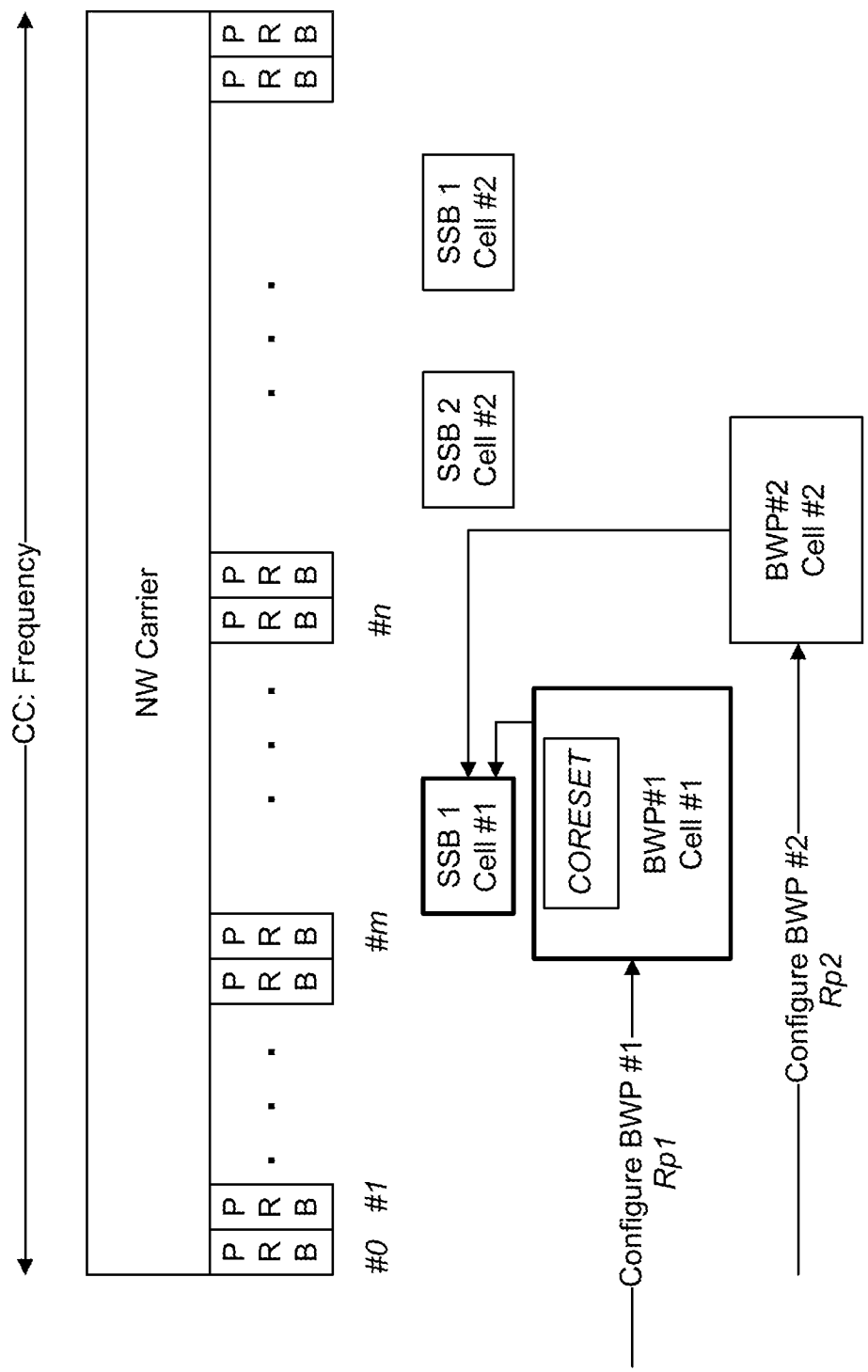
FIGS. 9A-B illustrate an exemplary BWP configuration for multiple TRP receptions.
Figure 9B:
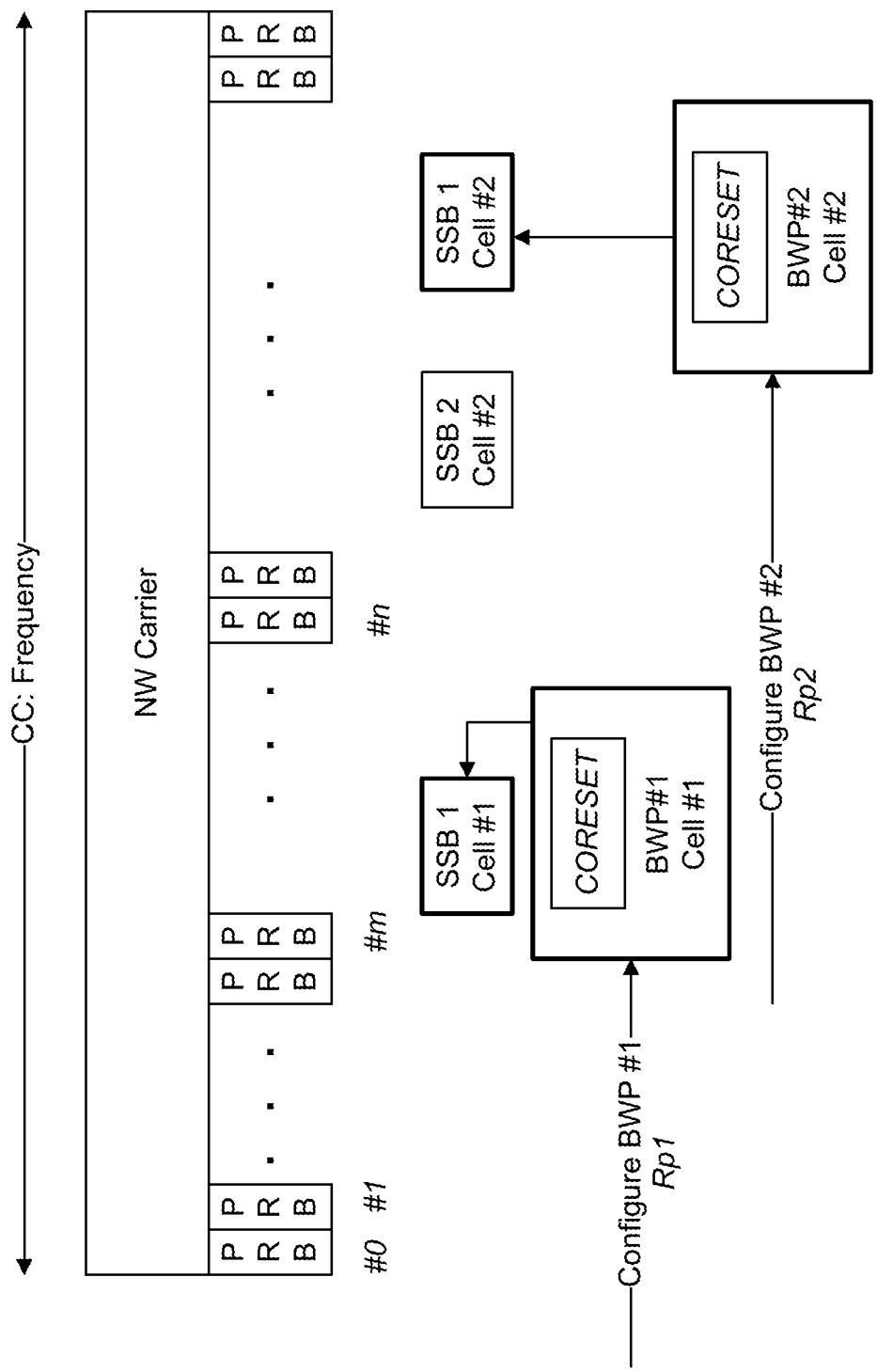

According to an embodiment, the default BWP for multiple TRPs reception are illustrated in FIGS. 9A and 9B. In FIG. 9A, the BWP #1 and BWP #2 are co-scheduled by the BWP #1 CORESET and BWP #1 is the default BWP. In FIG. 9B, the BWP #1 and BWP #2 are separately scheduled by each own BWP #1 CORESET and BWP #2 CORESET. The default BWPs are independently configured by each TRP in this case.

BWP Operation with DRX

If there is no DL and UL traffic for X slots or subframes, a gNB may define a timer, e.g., return to RRC Idle or RRC Inactive timer, which triggers a UE to return to its default BWP during transfer from RRC Connected mode to RRC Idle or Inactive mode. Furthermore, the gNB may also configure a periodic time-pattern, e.g., DRX pattern, which may direct a UE to retune to an UL or DL BWP from the default BWP while transfer from RRC Idle or RRC Inactive mode to RRC Connected mode. For example, it can detect a CORESET in a Common Search Space (CS S) on the default BWP at the RRC Idle mode, or perform and report measurements in a given BWP in RRC Connected mode. A gNB may configure a UE with one of the following: (i) a timer, which triggers the UE to retune to the default DL BWP in RRC Connected mode, if DL assignment or UL grant is not received for X slots on the current active DL BWPs; or (ii) a time-pattern, e.g., a periodic pattern, which triggers UE to retune to a DL BWP.

When UE changes from the RRC Connected mode to either the RRC Idle or Inactive mode, the UE can return to the default BWP where it can perform synchronization, mobility measurement, etc. via the SS burst set in the default BWP. If a UE is configured with DRX timer, then UE can either retune to the default BWP, after wake up from the DRX sleep cycle, for performing beam recovery (BR) and it can transmit the beam recovery request (BRR) via (i) the contention PRACH in the default BWP or the configured BWP; or (ii) the PUCCH in the default BWP or the configured BWP if available.

Rate-Matching or Puncturing for Multiple BWPs Operation

Figure 10:
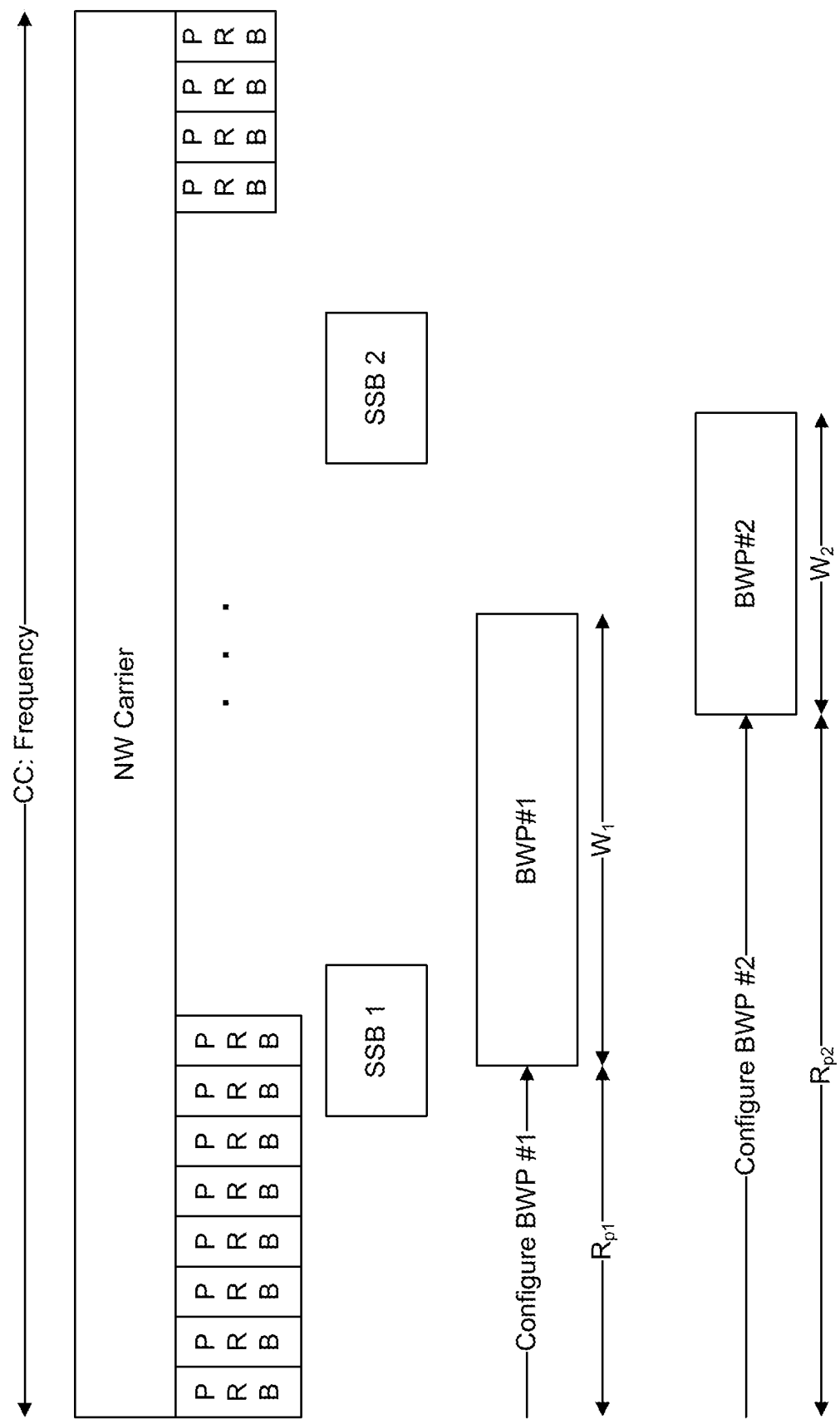
FIG. 10 illustrates BWPs configured with offset and bandwidth.

According to yet another embodiment, the location of the BWP can be identified by the starting offset Rp and bandwidth W configured by the higher layer signaling, e.g., RRC, MAC CE, or dynamically configured by DCI. Starting offset Rp represents the number of units (e.g., PRB) the BWP is away from the reference point, e.g., reference PRB in the system. Bandwidth W is the number of units the BWP occupies where the unit can be in PRB or RBG. A UE may receive multiple BWPs in the same time. Use two BWPs case as an example, Rp1 and W1 will be configured for BWP1, Rp2 and W2 will be configured for BWP2 as shown in FIG. 10. The location of the two BWPs can have the following three options: (i) BWP1 and BWP2 have same starting offset and different bandwidth, where Rp1=Rp2 and W1≠W2; (ii) BWP1 and BWP2 have different starting offset and same bandwidth, where Rp1≠Rp2 and W1=W2; and (iii) BWP1 and BWP2 have different starting offset and different bandwidth, where Rp1≠Rp2 and W1≠W2.

When a UE is configured with two active BWPs where both BWPs are used for data reception, the two BWPs cannot overlap. When a UE is configured with one active BWP1 and one inactive BWP2, the two BWPs can be non-overlapped or partially overlapped. In this scenario, the active BWP1 is used for data reception and inactive BWP2 can be used for conducting one or more of the following functionalities: (i) CSI-RS for CSI measurement; (ii) CSI-RS/SS block for mobility measurement; and (iii) TRS for time/frequency tracking.

A UE may monitor the same or different inactive BWPs during receiving data on its active BWP1 at different times. If the UE needs to monitor different BWPs at different times, one of the following options can be used to configure the pattern of the BWPs to be monitored:

(i) A BWPs frequency hopping pattern may be configured to UE through higher layer signaling e.g., RRC signaling and/or Mac CE. The UE is configured with information of the location of an inactive BWPs with {Rp1 . . . Rpn} and {W1 . . . Wn,} to be monitored, the frequency hopping pattern of the n BWPs, the monitoring time (such as each BWP need to be monitored in m slots), and the reference signals need to be monitored.

(ii) The inactive BWP(s) to be monitored may be dynamically configured by DCI. The DCI carries a filed indicating a parameter set containing information of inactive BWP(s) such as the BWP location, the reference signal to be monitored, etc., which is configured by higher layer signaling. By detecting the corresponding PDCCH via the CORESET of the BWP, UE determines the configuration details and monitors the inactive BWP.

When a UE is configured with active BWP1 and inactive BWP2, part of the time and frequency resources in these two BWPs may be overlapped with each other. Signal colliding will happen if the same resource element is scheduled for both BWPs for different purposes which will cause performance degrading. To solve this issue, one of the following methods can be used depends on different use cases.

In a first method, active BWP1 performs rate matching. For example, the collision may have happened on the resources used by BWP1 for PDSCH and by BWP2 for transmitting reference signals such as CSI-RS, TRS etc. In this scenario, gNB performs the rate match of the PDSCH around the resource elements used by BWP2 as reference signal ports. The UE indicates rate matching is required by the gNB. With the configuration of the reference signal, the UE can determine which REs in BWP1 are muted for the reference signal ports and decode the data accordingly on PDSCH.

In a second method, active BWP1 is punctured. This option may apply to the scenario the overlapping area is small between two BWPs. If a few REs for CSI-RS in BWP2 is overlapped with the PDSCH in BWP1, then the PDSCH may be punctured at the overlapped Res used for CSR-RS ports to guarantee the transmission of the CSI-RS for BWP2 without causing obvious performance degrading of PDSCH for BWP1.

In a third method, inactive BWP2 is punctured. This option may apply to the scenario that BWP2 is performing some measurement that requires the samples to be collected in multiple slots. For example, when a UE is performing the CSI based measurement for BWP2 within a time window, if a few of the CSI-RSs are punctured, e.g., not transmitted on those ports, it won't significantly affect the measurement results while can guarantee the higher priority transmissions on BWP1 without performance impact, e.g., PDCCH transmission in BWP1.

It is envisaged according to the application that CSI-RS is exemplarily employed and any of the above-mentioned methods can be used on BWP2 with control or data transmission on BWP1. Since multiple options can be used when the collision occurs, a UE needs to indicate which method to use. This indication can be done through the higher layer configuration such as RRC signaling and/or MAC CE e.g., for periodic or semi-persistence configuration. Alternatively, it can be dynamically indicated by the DCI where a DCI field points to a parameter set containing the related parameter configured by higher layer signaling.

PRACH Operation for BWP

According to another aspect of the application, PRACH operation with BWP may be employed in a number of UE modes, such as for example, initial access, transition from RRC_INACTIVE to RRC_CONNECTED, RRC connection re-establishment, DL arrival during RRC_CONNECTED requiring random access, handover, multi-link, and beam recovery.

In this application, the PRACH resources include two major parts. The first part is the UL PRACH transmission resource (e.g., UL BWP and preambles). The second part is the DL RA response (RAR) resources (e.g., DL BWP). For a dynamic TDD flexible subframe, the DL RAR and UL PRACH transmission are within the same BWP. The DL BWP for RAR reception and UL BWP for PRACH transmission can be independently configured and allocated within the UE supported BWPs accordingly. On the hand, the RAR and PRACH are set at separate BWPs for FDD. In other words there are two BWPs. One is for UL PRACH transmission, e.g., UL BWP, and the other is for DL RAR reception, e.g., DL BWP.

Initial Access or Transition from RRC_INACTIVE to RRC_CONNECTED

Figure 11A:
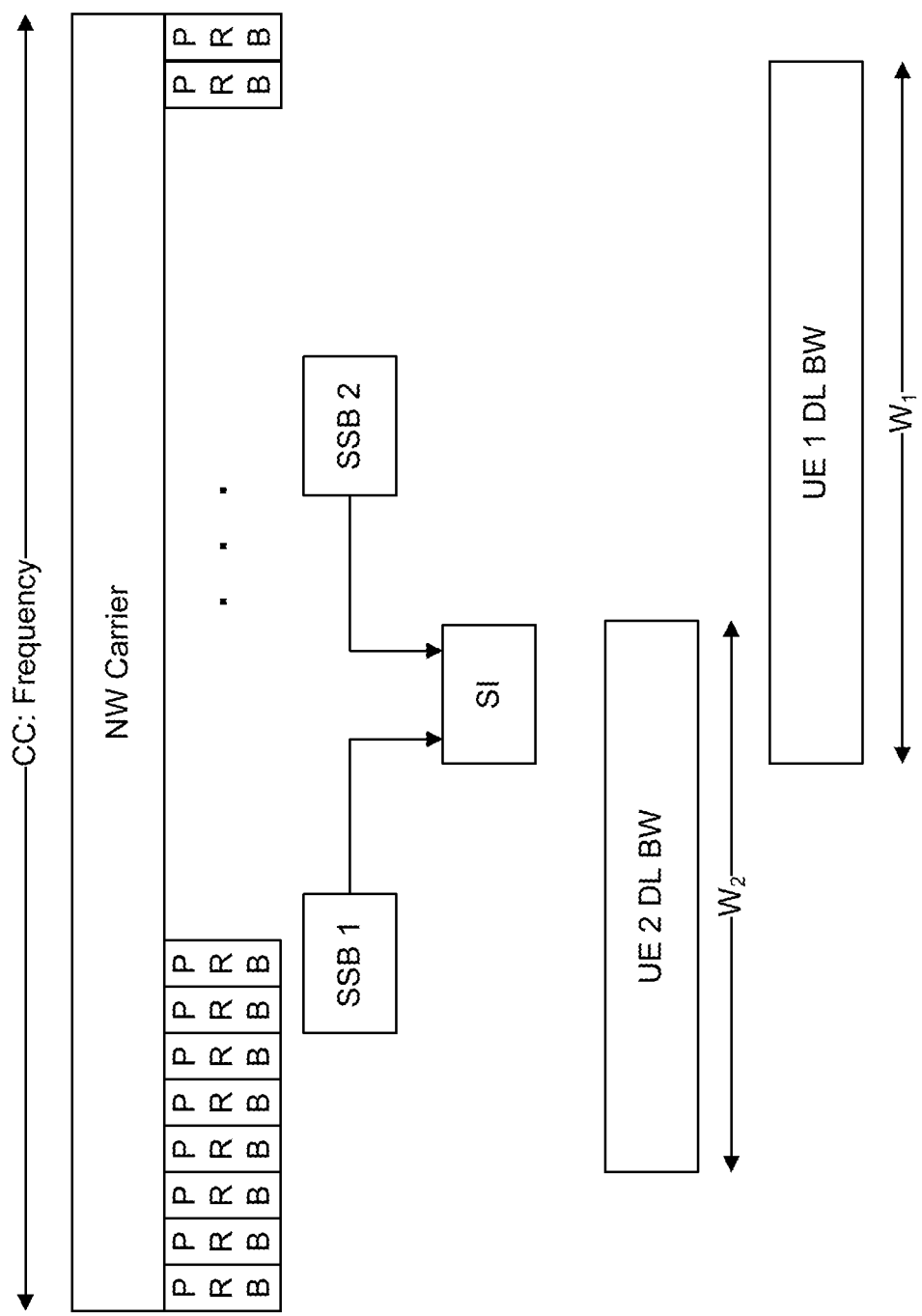
FIG. 11A illustrates an example of where System Information (SI) is shared by $SSB_1$ and $SSB_2$.
Figure 11B:
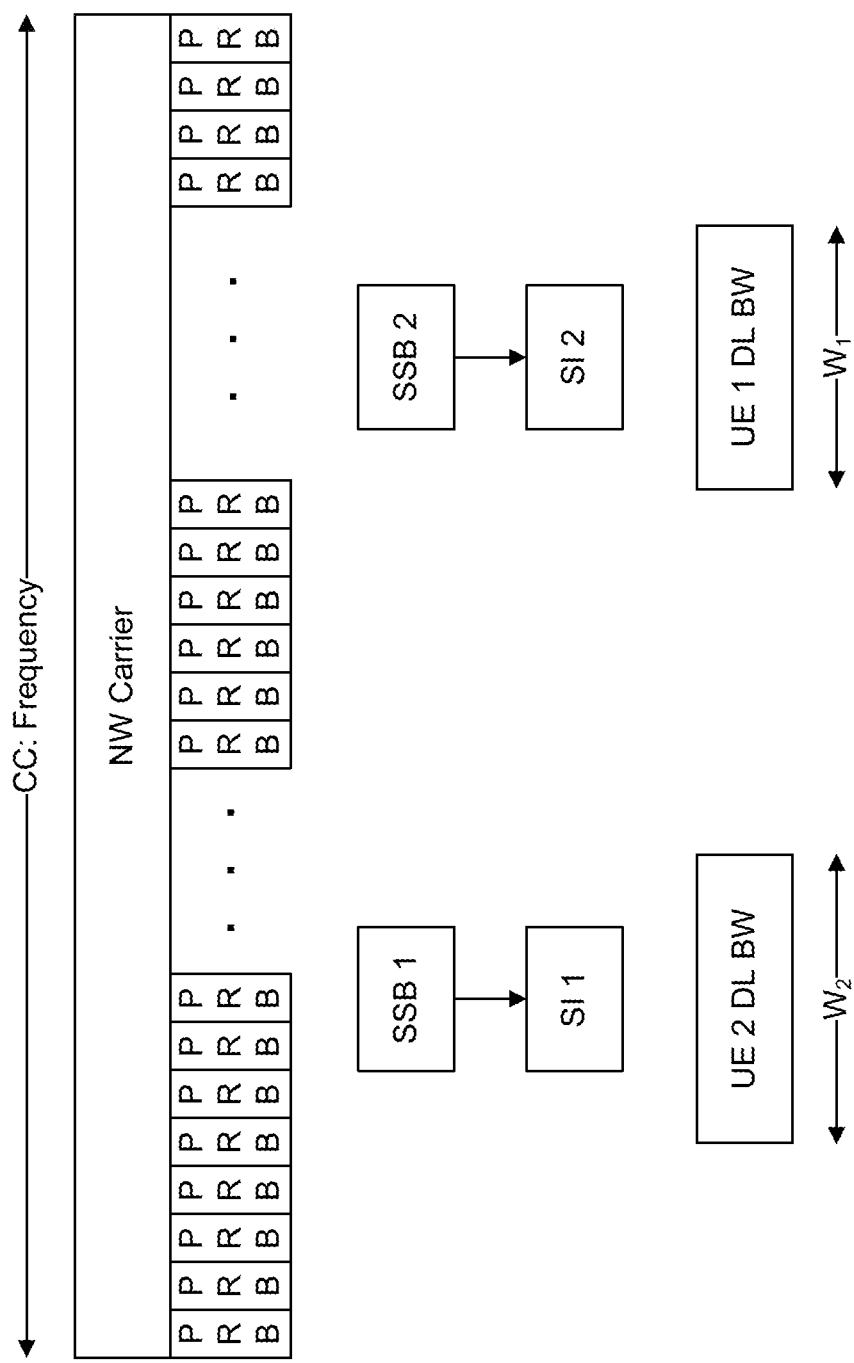
FIG. 11B illustrates an example of where SI is independently owned by $SSB_1$ and $SSB_2$.

At an initial RRC connection setup, in order to switch from the RRC_IDLE/RRC_INACTIVE state to the RRC_CONNECTED state, a UE may initiate random access. If a NR CC broadcast to multiple SSBs (synchronization burst set) is denoted as SSBi, i=1, . . . S at different SS rasters. The numerology SSBi equals to the numerology SSBj for i≠j, as shown in FIG. 11A and FIG. 11B. FIG. 11A illustrates an example of where System Information (SI) is shared by SSB1 and SSB2. FIG. 11B illustrates an example of where SI is independently owned by SSB1 and SSB2.

The PRACH resource(s) may vary when UE performs initial access from RRC_IDLE mode. For example, if SIi=SIj for i≠j, then the PRACH resource(s) may be configured as a shared PRACH allocated resource as illustrated in FIG. 12A1. FIG. 12A2 illustrates an example of a single allocated PRACH frequency resource.

Alternatively FIG. 12B1 illustrates the PRACH resource(s) configured as multiple allocated resources. FIG.

12B2 illustrates an example of multiple allocated PRACH frequency resource when SIi=SIj for i≠j for PRACH transmission.

Figure 13A:
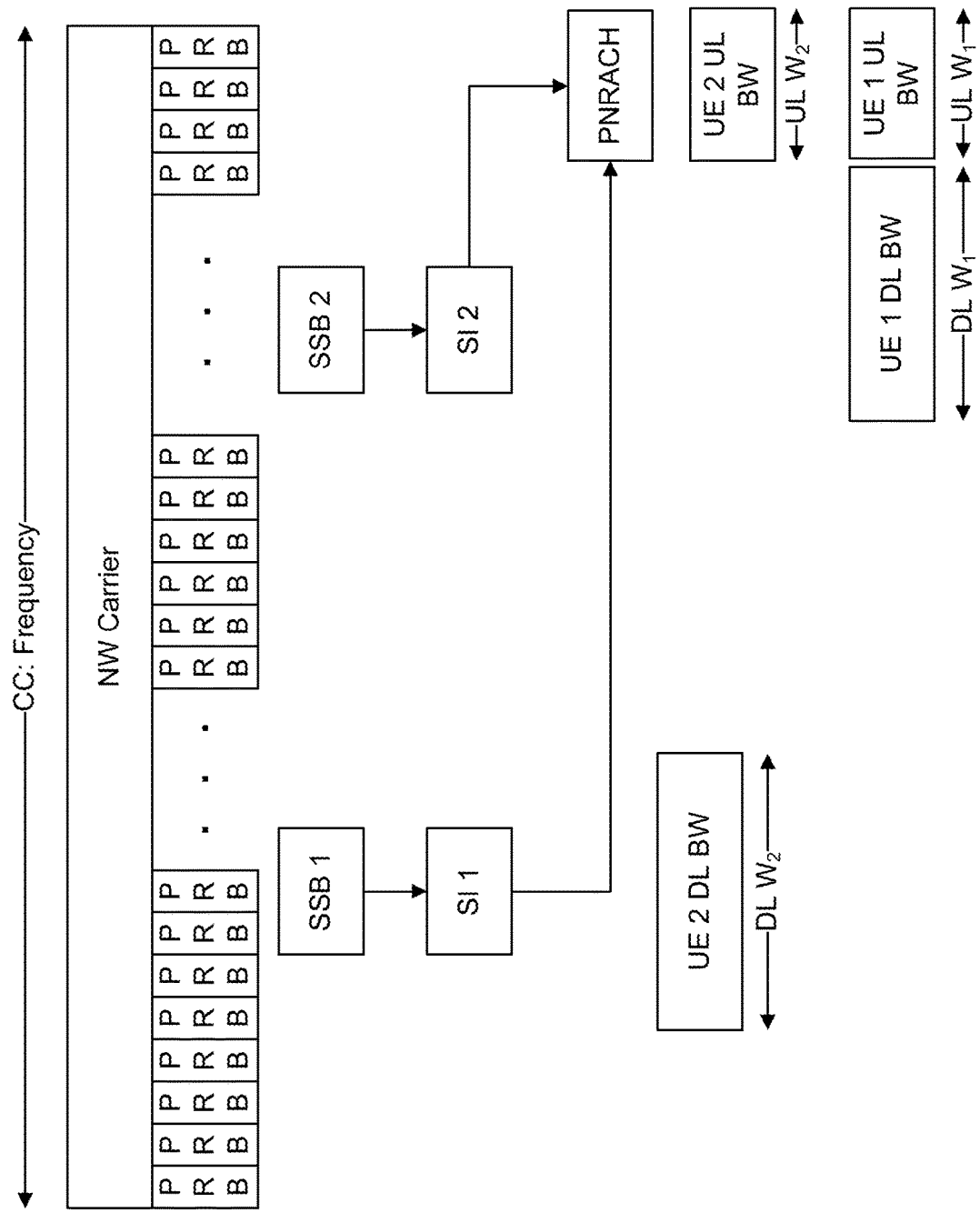
FIG. 13A illustrates an example of single allocated PRACH frequency resource for a first case.
Figure 13B:
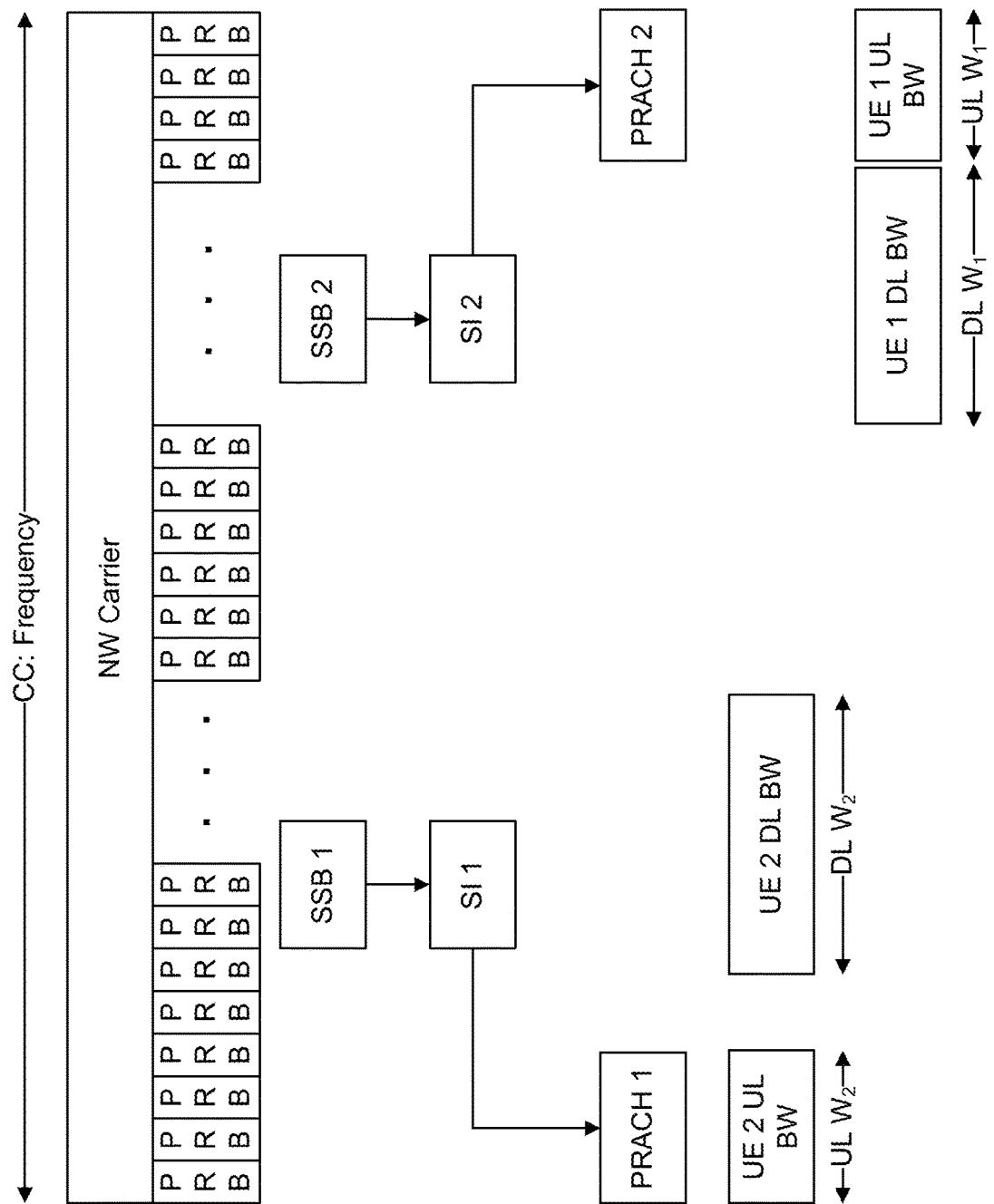
FIG. 13B illustrates an example of single allocated PRACH frequency resource for a second case.
Figure 13C:
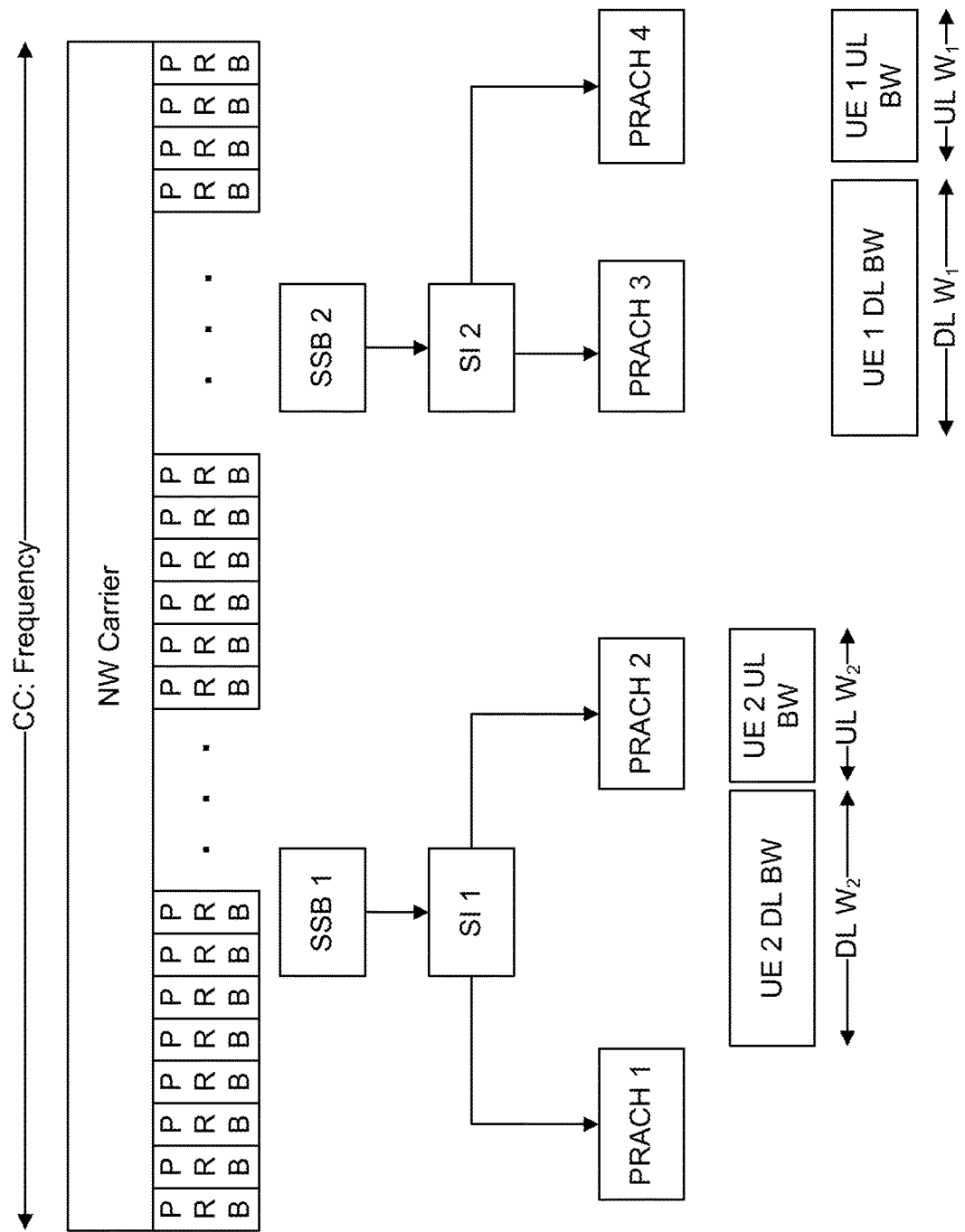
FIG. 13C illustrates an example of multiple allocated PRACH frequency resources where $SIi \neq SIj$ for $i \neq j$.

If SIi≠SIj for i≠j, then the PRACH resource may be configured as a shared PRACH allocated resource as illustrated in FIG. 13A. FIG. 13A illustrates an example of single allocated PRACH frequency resource case 1. Alternatively, the PRACH resource may be configured as multiple allocated resources as shown in FIG. 13B. FIG. 13B illustrates an example of single allocated PRACH frequency resource case 2. FIG. 13C illustrates an example of multiple allocated PRACH frequency resources when SIi≠SIj for i≠j.

Here, we define a narrow band UE, e.g., its supported BW, denoted as BWUE. If a narrow band UE, e.g., BWUE<BWCC has multiple allocated PRACH resources for transmitting PRACH when SIi=SIj for i≠j then UE may choose an allocated PRACH resource at random, or selected a PRACH resource based on Cell ID and RA-RNTI.

Figure 14A:
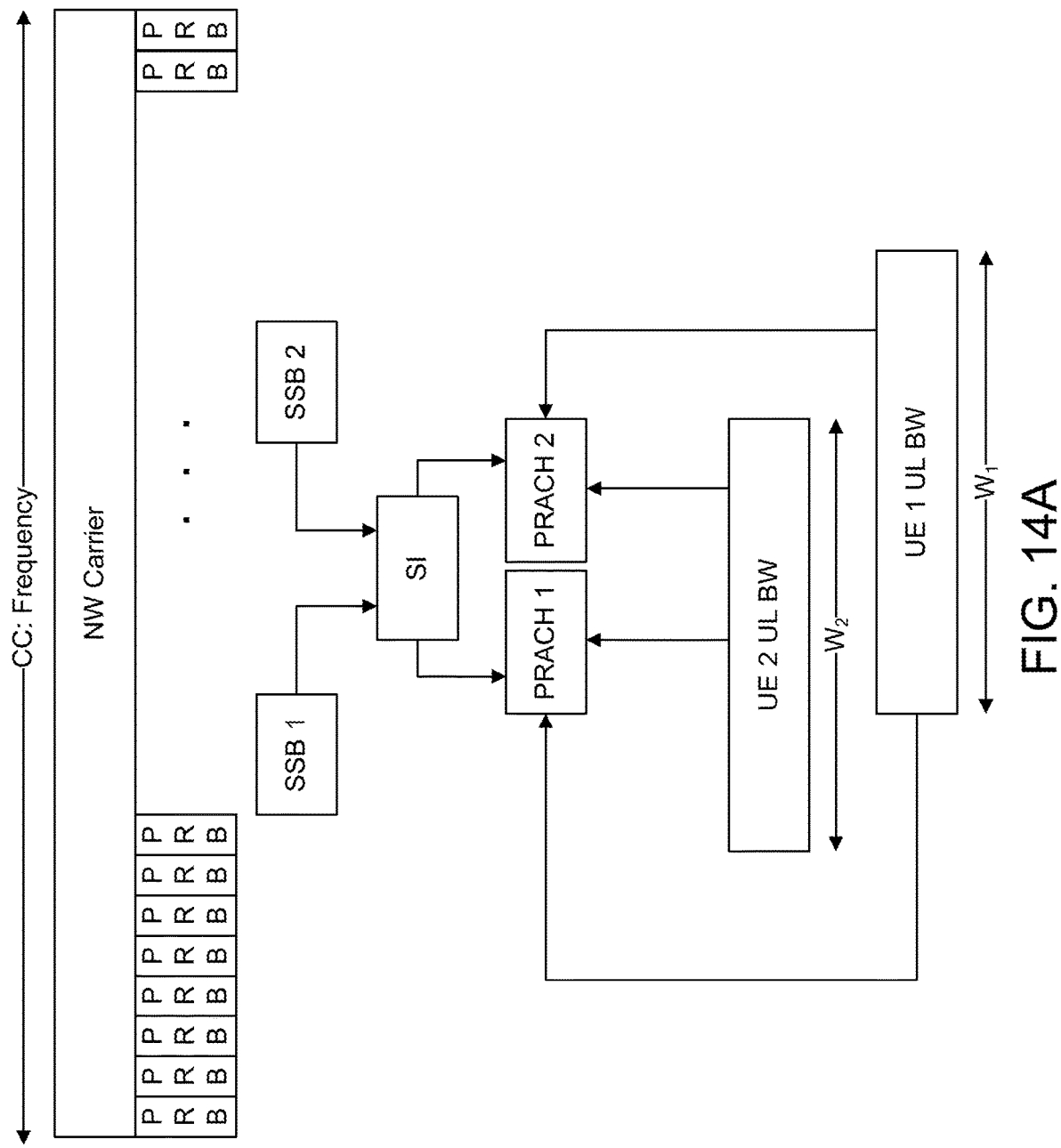
FIG. 14A illustrates an example PRACH resource(s) associated with $SI_1$ and $SI_2$.
Figure 14B:
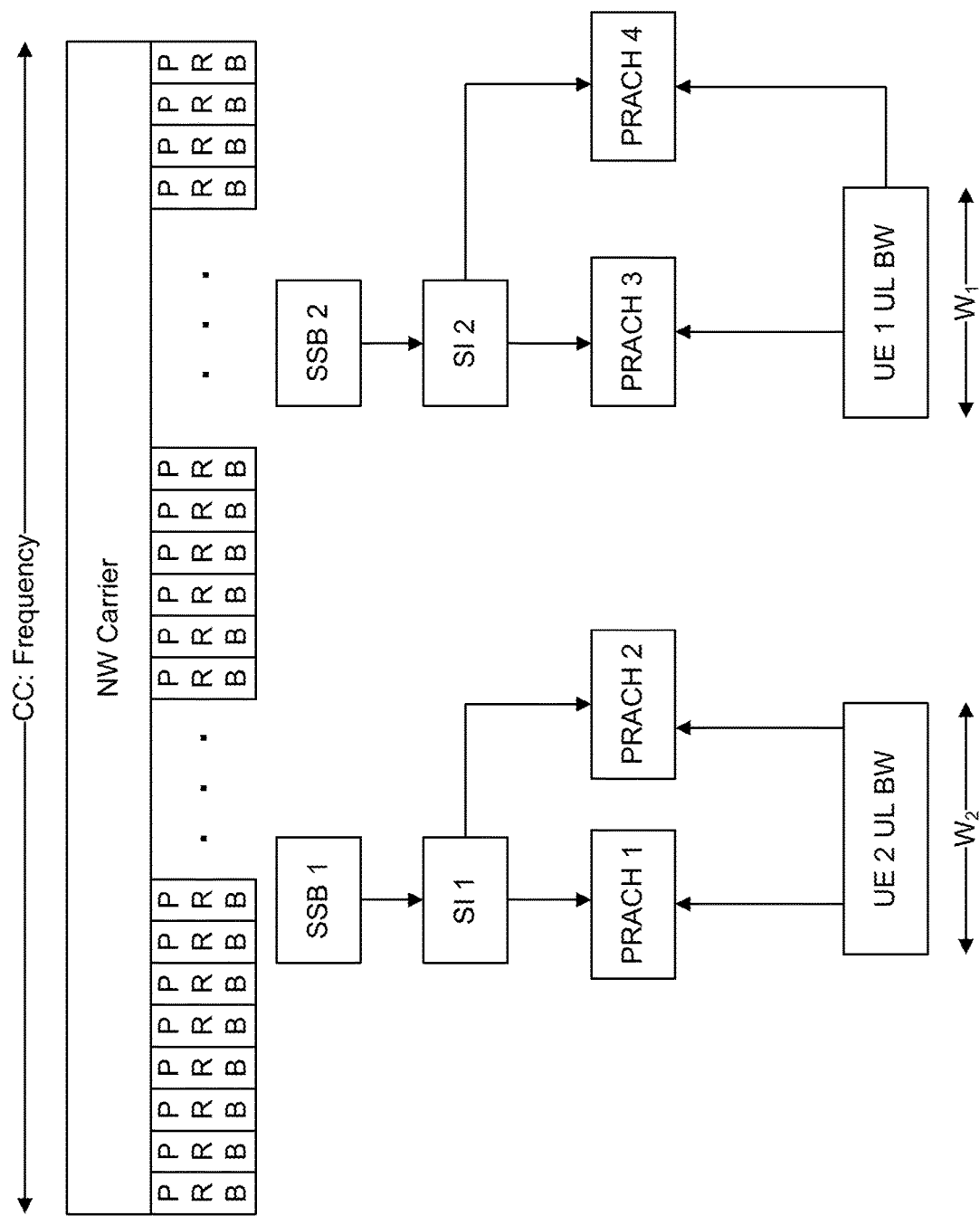
FIG. 14B illustrates another example PRACH resource(s) associated with $SI_1$ and $SI_2$.

FIGS. 14A and 14B illustrate two UEs performing initial access from RRC_IDLE mode. For each UE, BWUE<BWCC and SI indicates more than one allocated PRACH resources. In this case, UE 1 and UE 2 have 2 PRACH resources to transmit (UL) PRACH. In FIG. 14A, PRACH resource(s) are associated with SI1 and SI2 when SIi=SIj for i≠j. In FIG. 14B, PRACH resource(s) are associated with SI1 and SI2 when SIi≠SIj for i≠j.

In another embodiment, a gNB or Cell/TRP may configure at least one DL BWP as a default BWP and the default BWP(s) should contain a SS burst set within UE's BW. The PRACH resources include allocated frequency resources and PRACH preamble configuration. The PRACH resources may be tied with SSB.

Figure 15A:
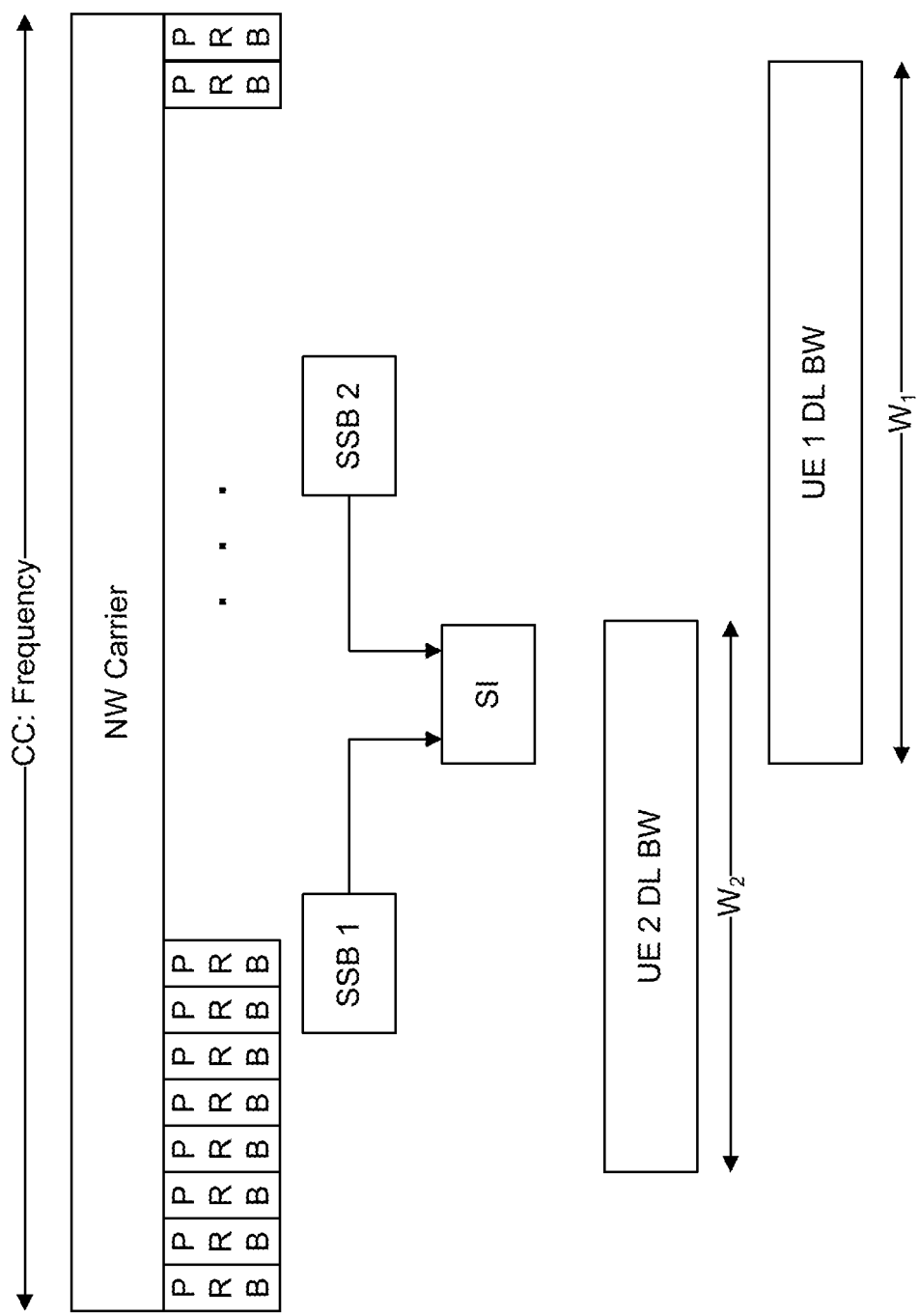
FIG. 15A illustrates an example where System information (SI) is shared by SSBs.
Figure 15B:
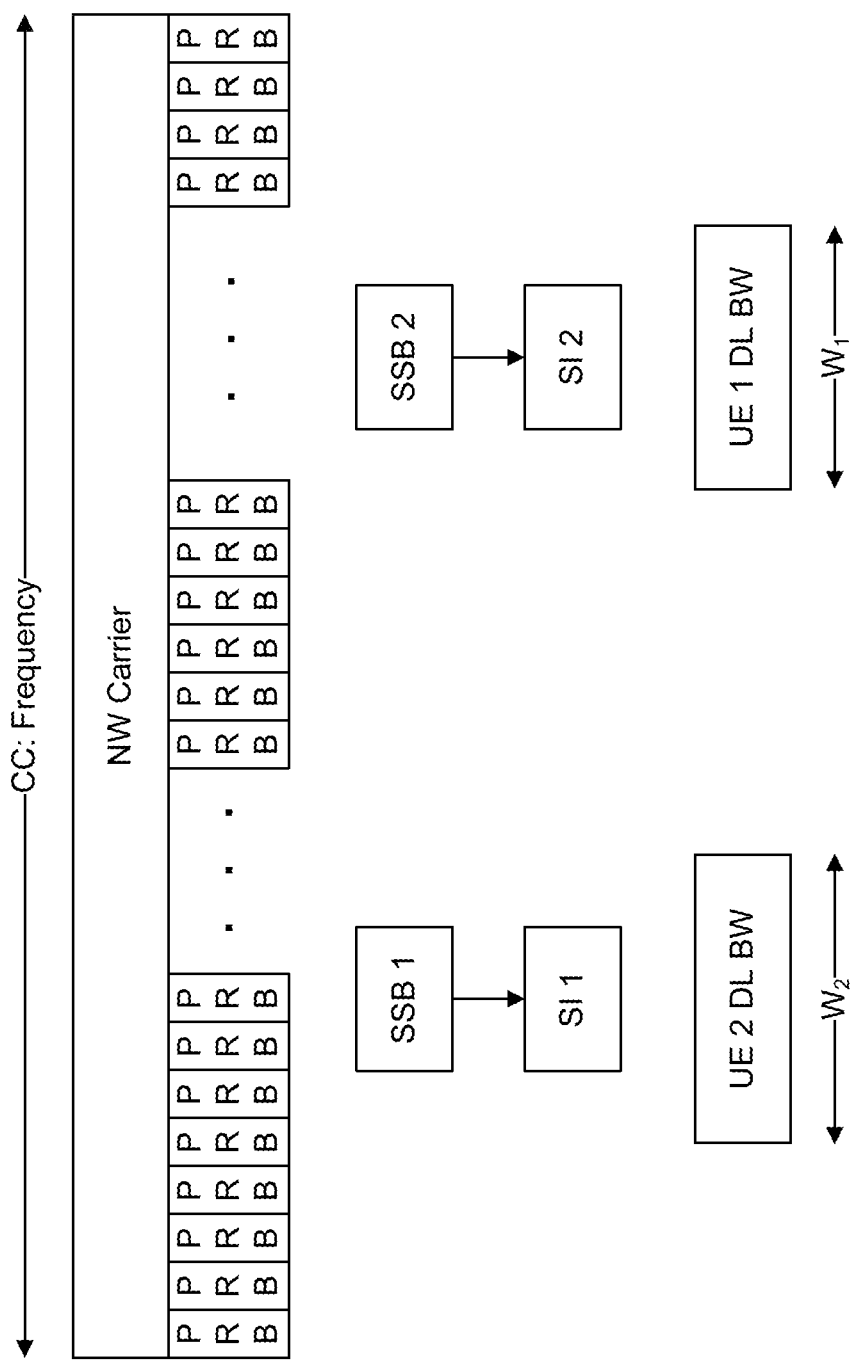
FIG. 15B illustrates an example where SI is independently owned by SSBs.

UE's PRACH resources (include allocated frequency resource and PRACH preambles) for a default BWP may be indicated by SI information. The PDSCH carry SI is indicated by MIB. The numerology SSBi does not equal to the numerology SSBj for i≠j, as shown in FIGS. 15A and 15B. FIG. 15A illustrates an example where System information (SI) is shared by SSB1 and SSB2. FIG. 15B illustrates an example where SI is independently owned by SSB1 and SSB2.

The PRACH resource(s) when UE performs initial access from RRC_IDLE mode may adopt one of the following options. If SIi=SIj for i≠j, then the PRACH resource(s) may be configured as a shared PRACH allocated resource as shown in FIG. 16A1. FIG. 16A2 illustrates an example of single allocated PRACH frequency resource when SIi=SIj for i≠j for PRACH transmission. Alternatively, the PRACH resource(s) may be configured as multiple allocated resources as shown in FIG. 16B1. FIG. 16B2 illustrates an example of multiple allocated PRACH frequency resource where SIi=SIj for i≠j for PRACH transmission.

Figure 17A:
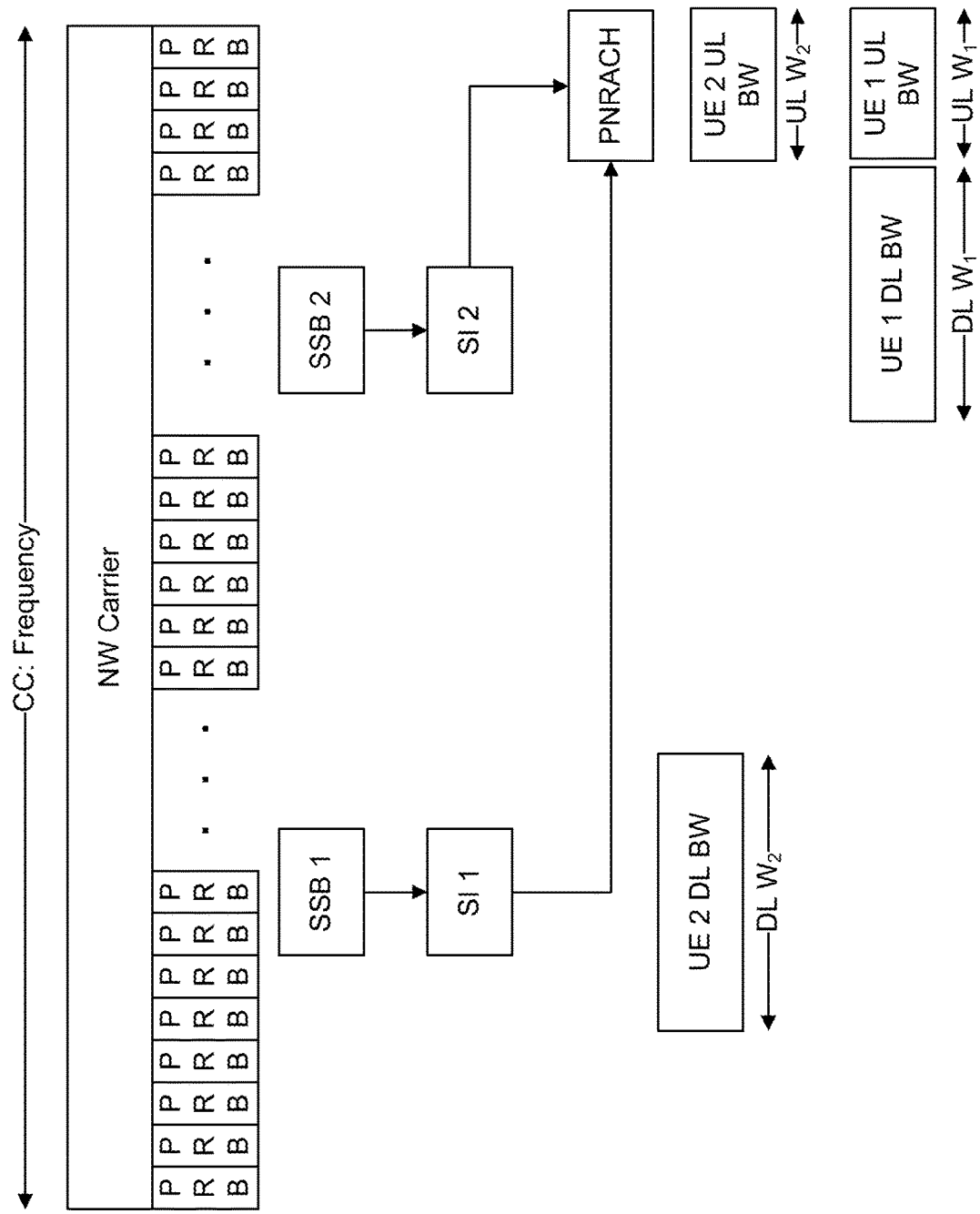
FIG. 17A illustrates an example of single allocated PRACH frequency resource in first case.
Figure 17B:
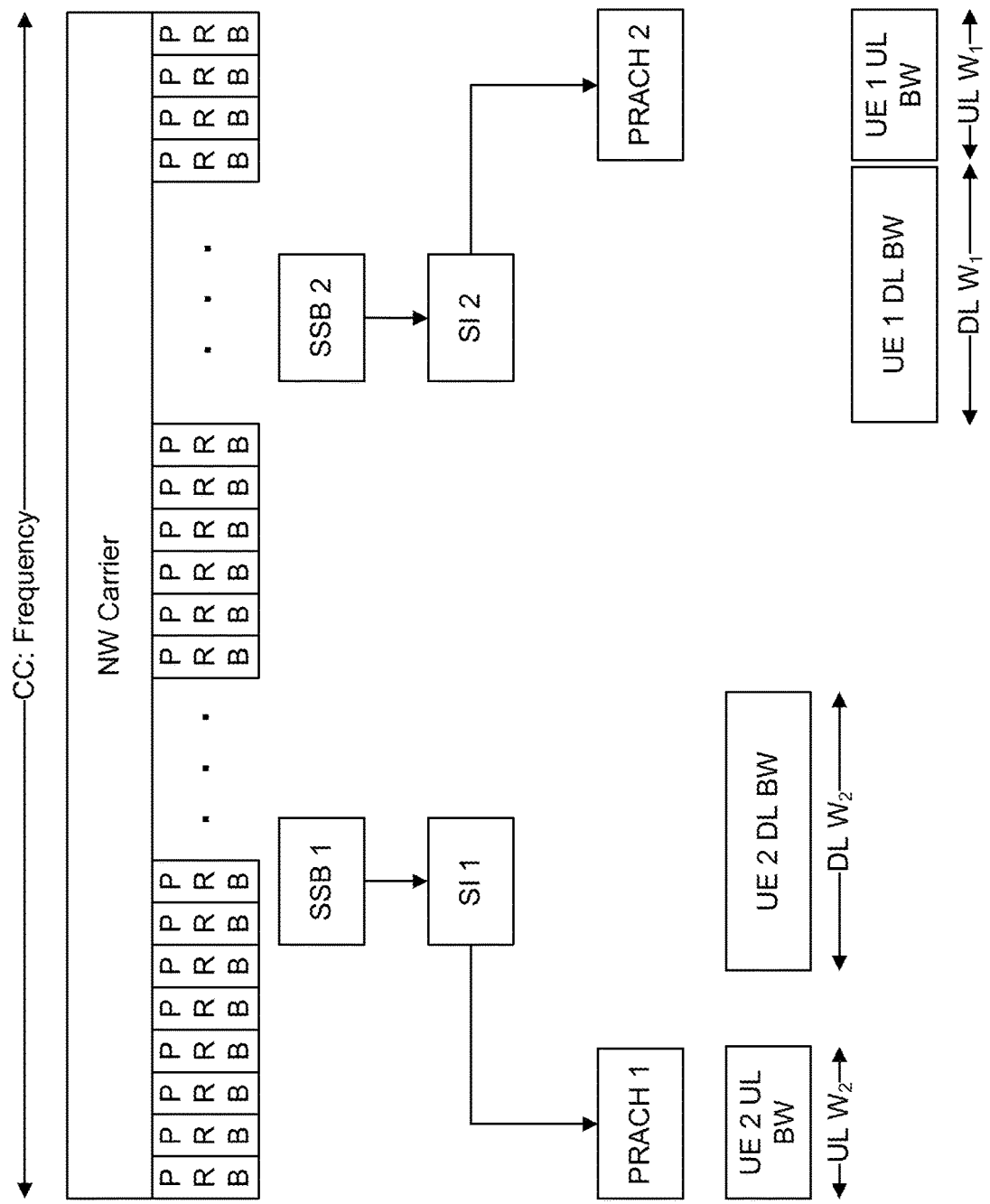
FIG. 17B illustrates an example of single allocated PRACH frequency resource in a second case.
Figure 17C:
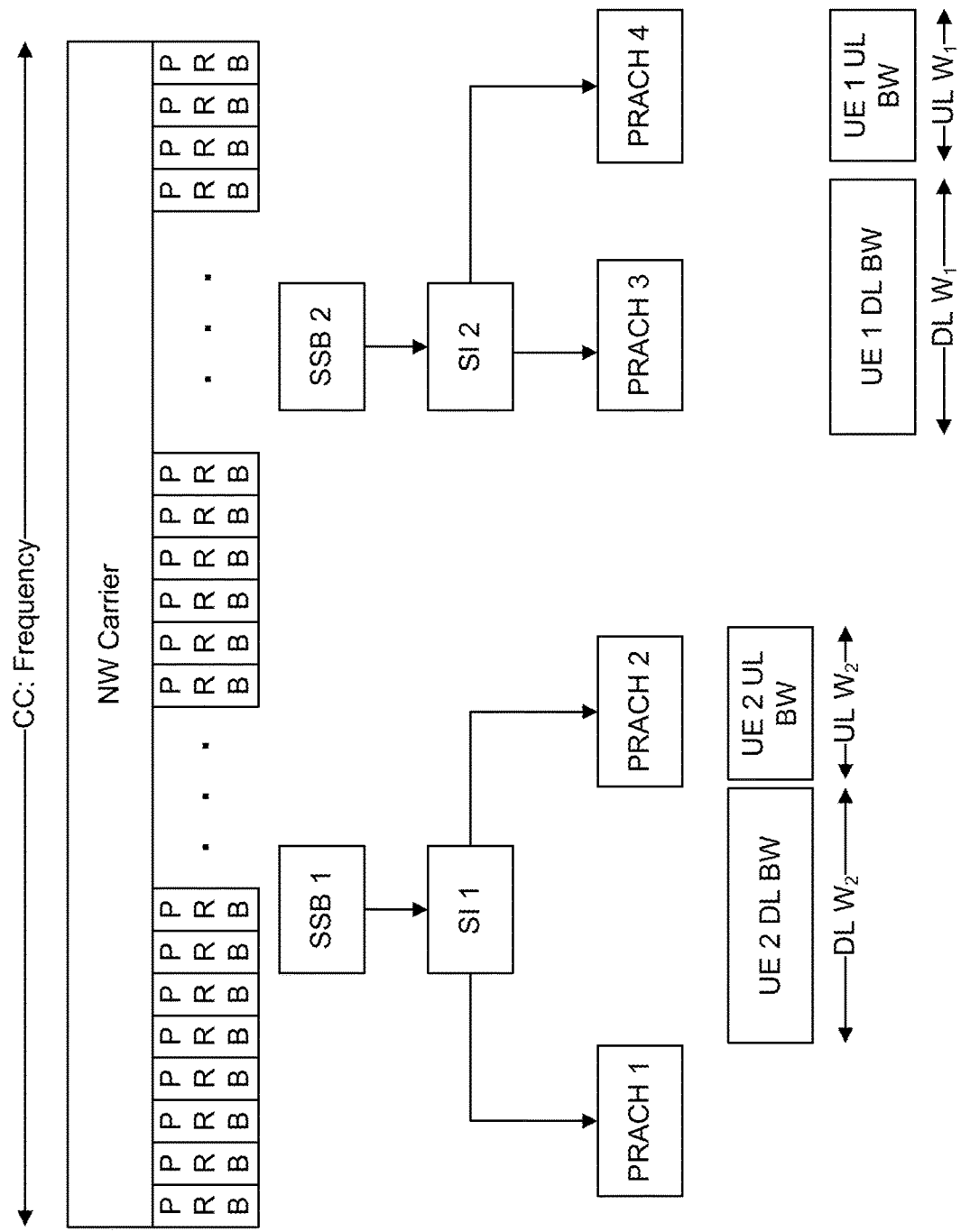
FIG. 17C illustrates an example of multiple allocated PRACH frequency resources.

Moreover, if SIi≠SIj for i≠j, then the PRACH resource may be configured as a shared PRACH allocated resource as shown in FIG. 17A. FIG. 17A illustrates an example of single allocated PRACH frequency resource case 1 where SIi≠SIj for i≠j. Alternatively, the PRACH resource may be configured as multiple allocated resources as shown in FIG. 17B. FIG. 17B illustrates an example of single allocated PRACH frequency resource case 2 where SIi≠SIj for i≠j. FIG. 17C illustrates an example multiple allocated PRACH frequency resources where SIi≠SIj for i≠j. Here, we define a narrow band UE, e.g., it's supported BW, denoted as BWUE. If a narrow band UE, e.g., BWUE<BWCC has multiple allocated PRACH resources for transmitting PRACH when SIi=SIj for i≠j then UE may choose PRACH resource based on Cell ID and RA-RNTI, or the UE may choose one of allocated PRACH resources at random.

Figure 18B:
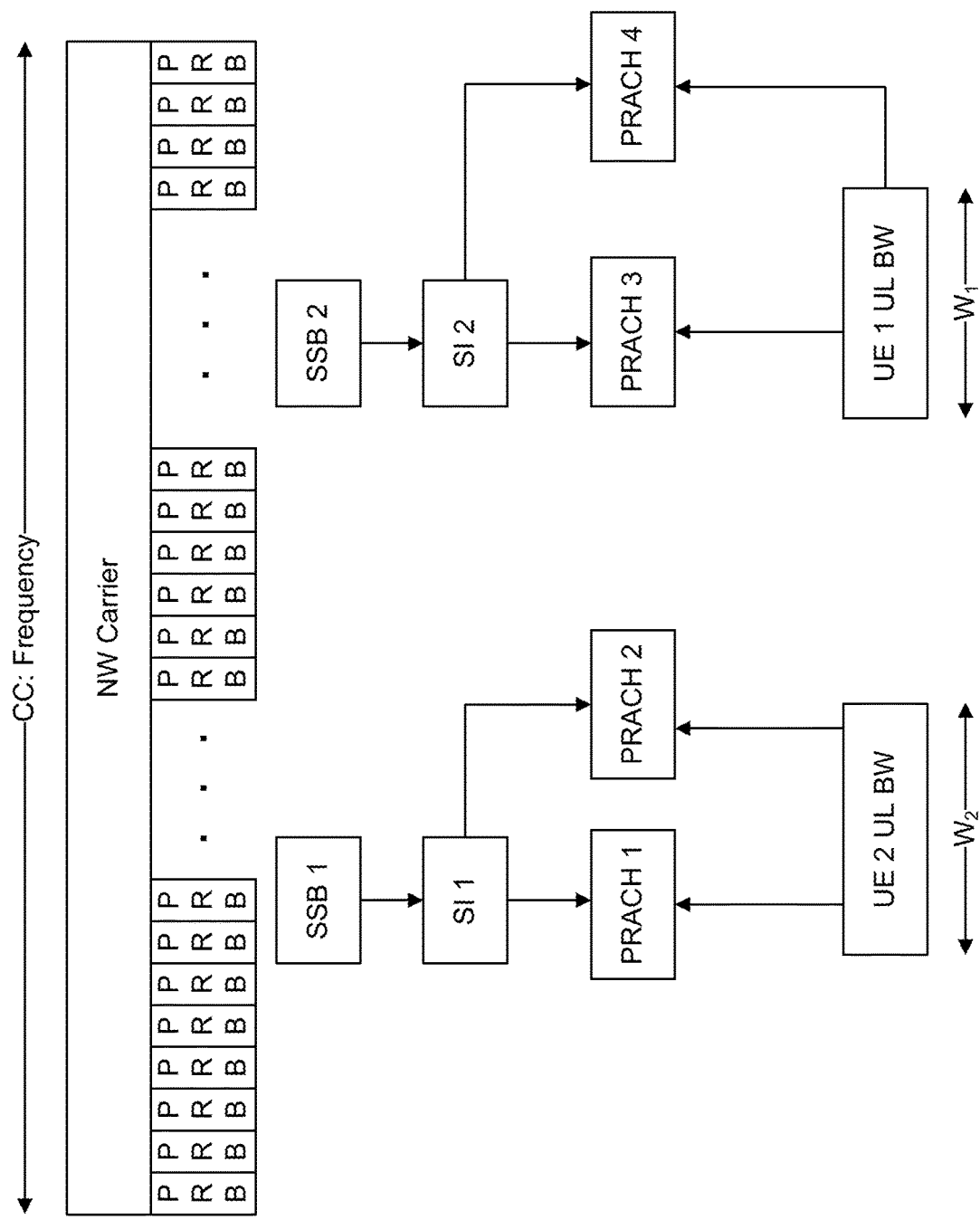
FIG. 18B illustrates another example PRACH resource(s) associated with $SI_1$ and $SI_2$.

FIG. 18A illustrates a PRACH resource(s) associated with SI1 and SI2 and when SIi≠SIj for i≠j. FIG. 18B illustrates a PRACH resource(s) associated with SI1 and SI2 when SIi≠SIj for i≠j. In both FIGS. 18A and 18B, two UEs perform initial access from RRC_IDLE mode. For each UE, BWUE<BWCC and SI indicates more than one allocated PRACH resources. In this case, UE 1 and UE 2 have 2 PRACH resources for transmitting PRACH. A gNB or Cell/TRP may configure at least one DL BWP as a default BWP, and the default BWP(s) may contain an SS burst set within UE's BW and PRACH resources including allocated frequency resources and PRACH preamble configuration. The PRACH resources may be tied to SSB.

Figure 19A:
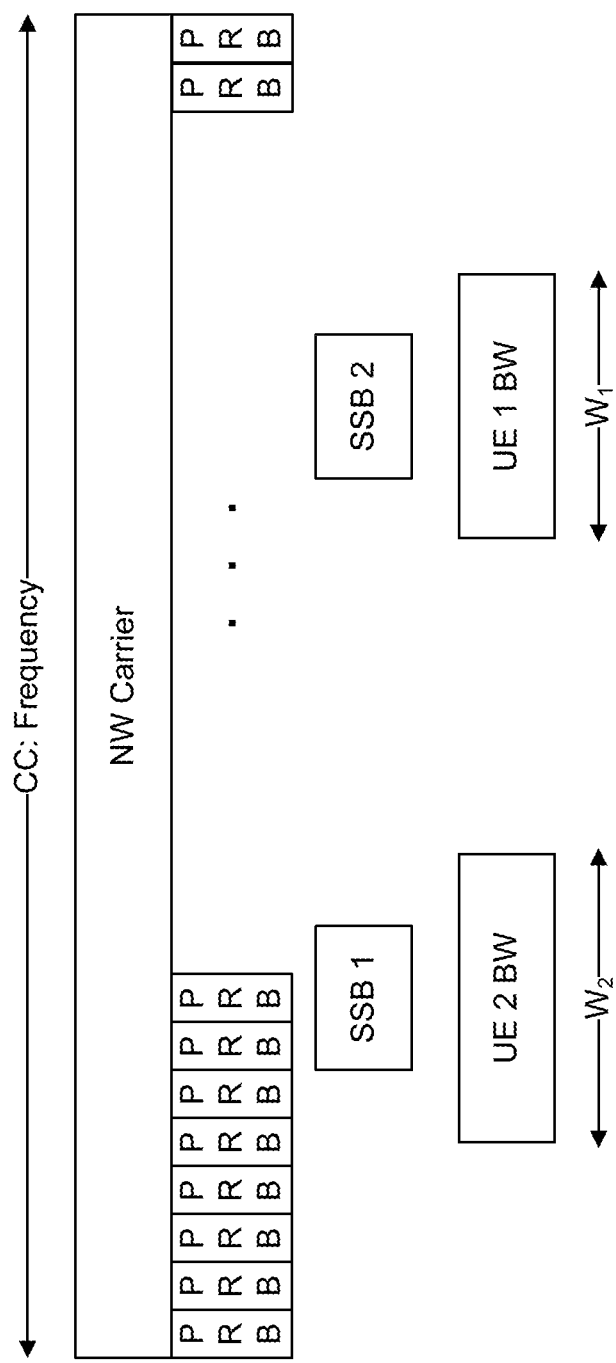
FIG. 19A illustrates and example of an NR CC broadcast to SSB where $SSB_1$ numerology is same as $SSB_2$.
Figure 19B:
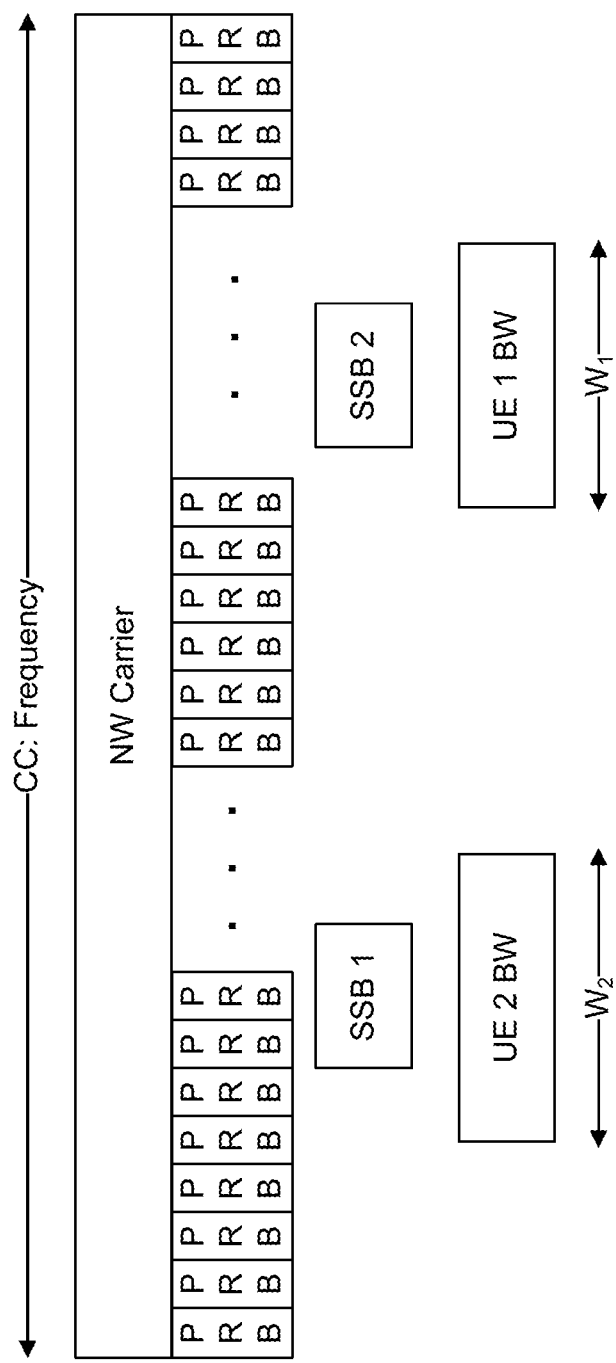
FIG. 19B illustrates an example an NR CC broadcast to SSB where the $SSB_1$ numerology is not equal to $SSB_2$.

FIG. 19A illustrates a NR CC broadcast to SSB where SSB1 numerology is same as SSB2. FIG. 19B illustrates a NR CC broadcast to SSB where the SSB1 numerology is not equal to SSB2. The UE's PRACH resources (including allocated frequency resource and PRACH preambles) for default BWP may be from PRACH resources are indicated by SI information. The PDSCH carry SI is indicated by MIB.

For case 1 and case 2, it is envisaged according to this application that the system information (SI) indicated by the master information block (MIB) of SSBi and SSBj may be shared for i≠j, e.g., resource of system information SIi=SIj for i≠j. Alternatively, SI may be independently allocated at different frequency resources for i≠j, e.g., resource of system information SIi≠SIj for i≠j. The bandwidth of SIi for i=1, . . . S should not exceed the minimum BW that system may support.

Figure 20A:
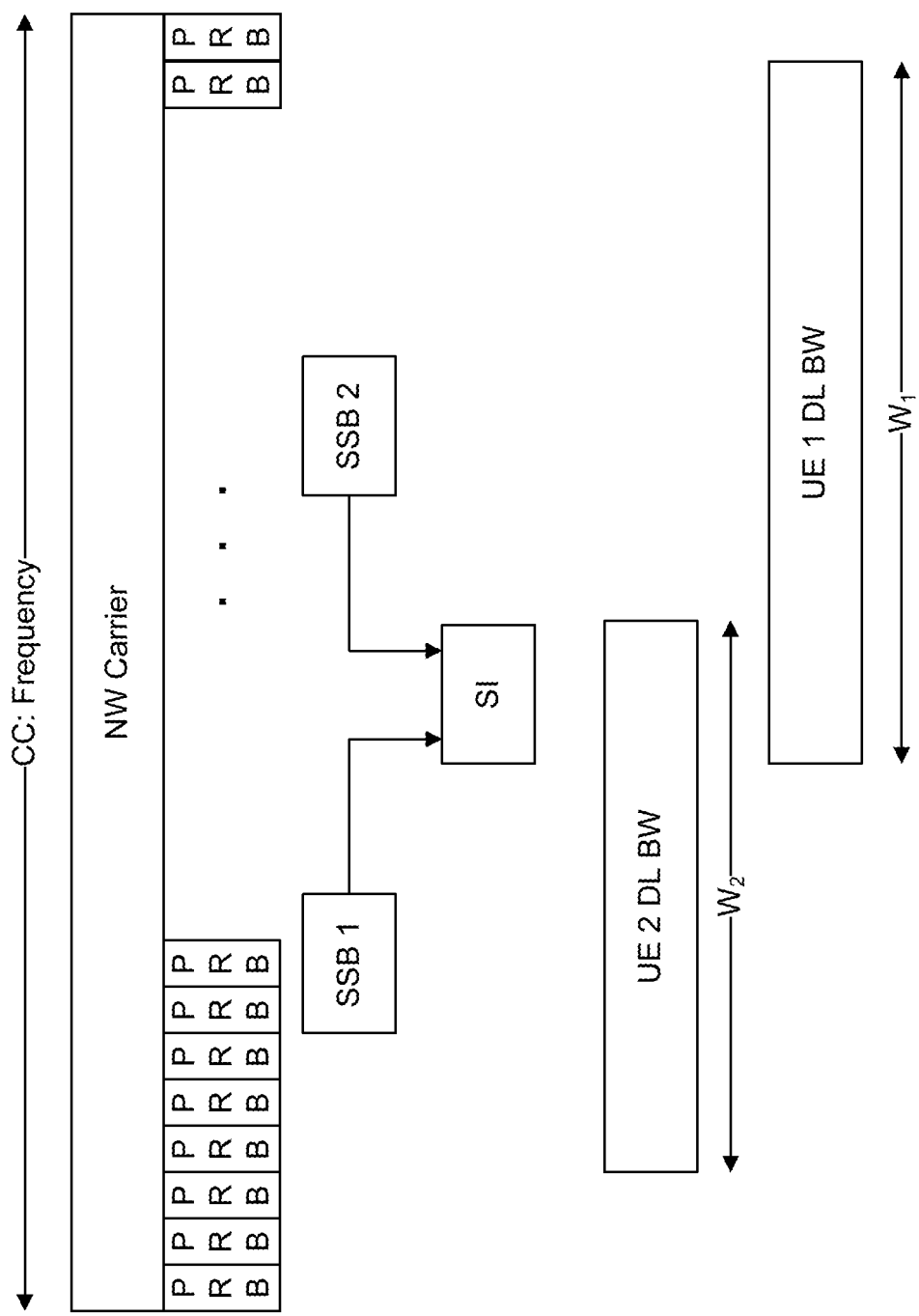
FIG. 20A illustrates an example of System information (SI) shared by $SSB_1$ and $SSB_2$.
Figure 20B:
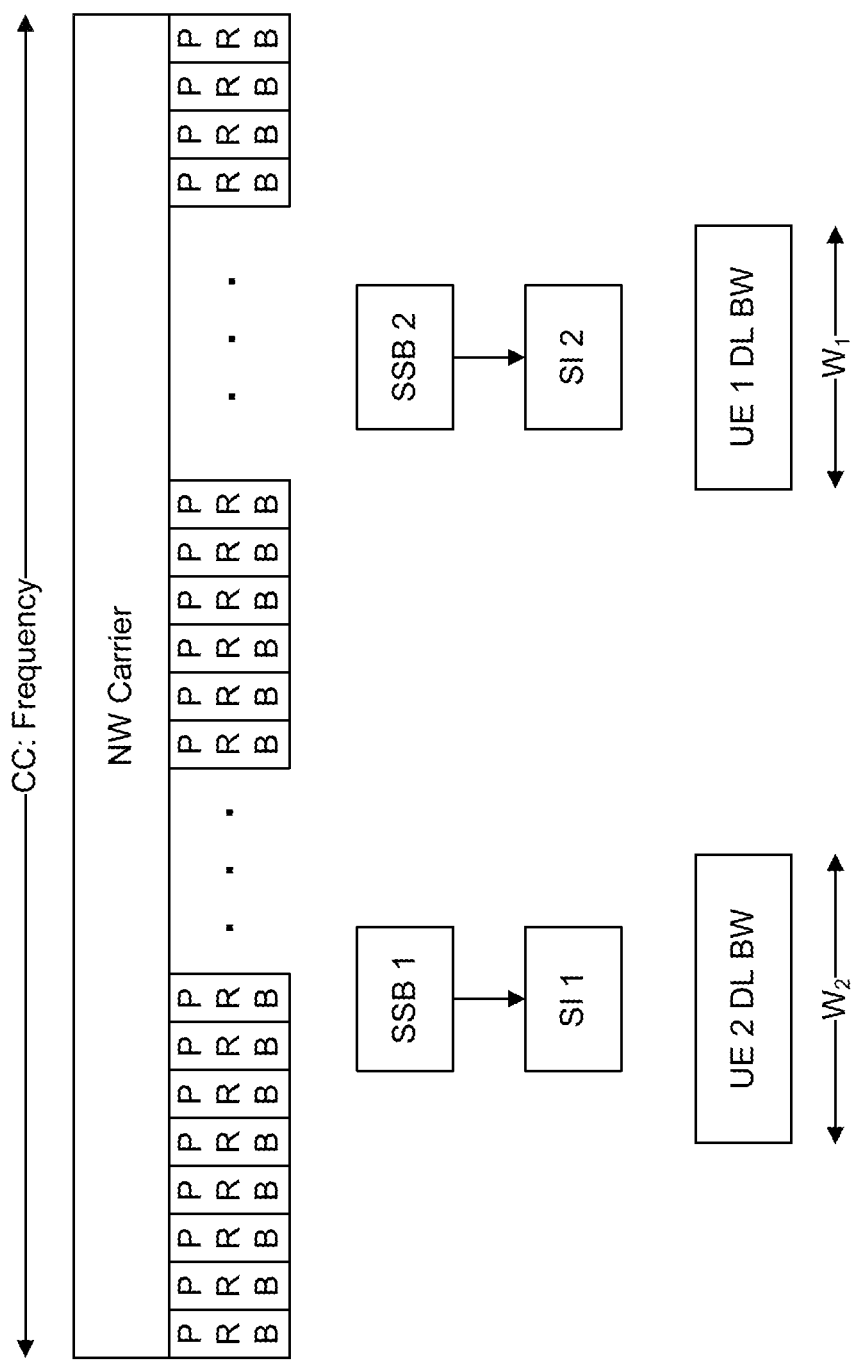
FIG. 20B illustrates an example of SI independently owned by $SSB_1$ and $SSB_2$.

FIG. 20A illustrates SI (a) shared by SSB1 and SSB2. FIG. 20B illustrates SI independently owned by SSB1 and SSB2.

FIG. 21A1 illustrates a single allocated PRACH frequency resource where SIi=SIj for i≠j for PRACH transmission. There are a number of options for PRACH resource(s) where a UE performs an initial access from RRC_IDLE mode. For example, if SIi=SIj for i≠j, then the PRACH resource(s) may be configured as a shared PRACH allocated resource as shown in FIG. 21A2. FIG. 21B1 illustrates multiple allocated PRACH frequency resource where SIi=SIj for i≠j for PRACH transmission. Here, the PRACH resource(s) may be configured as multiple allocated resources as shown in FIG. 21B2.

Figure 22A:
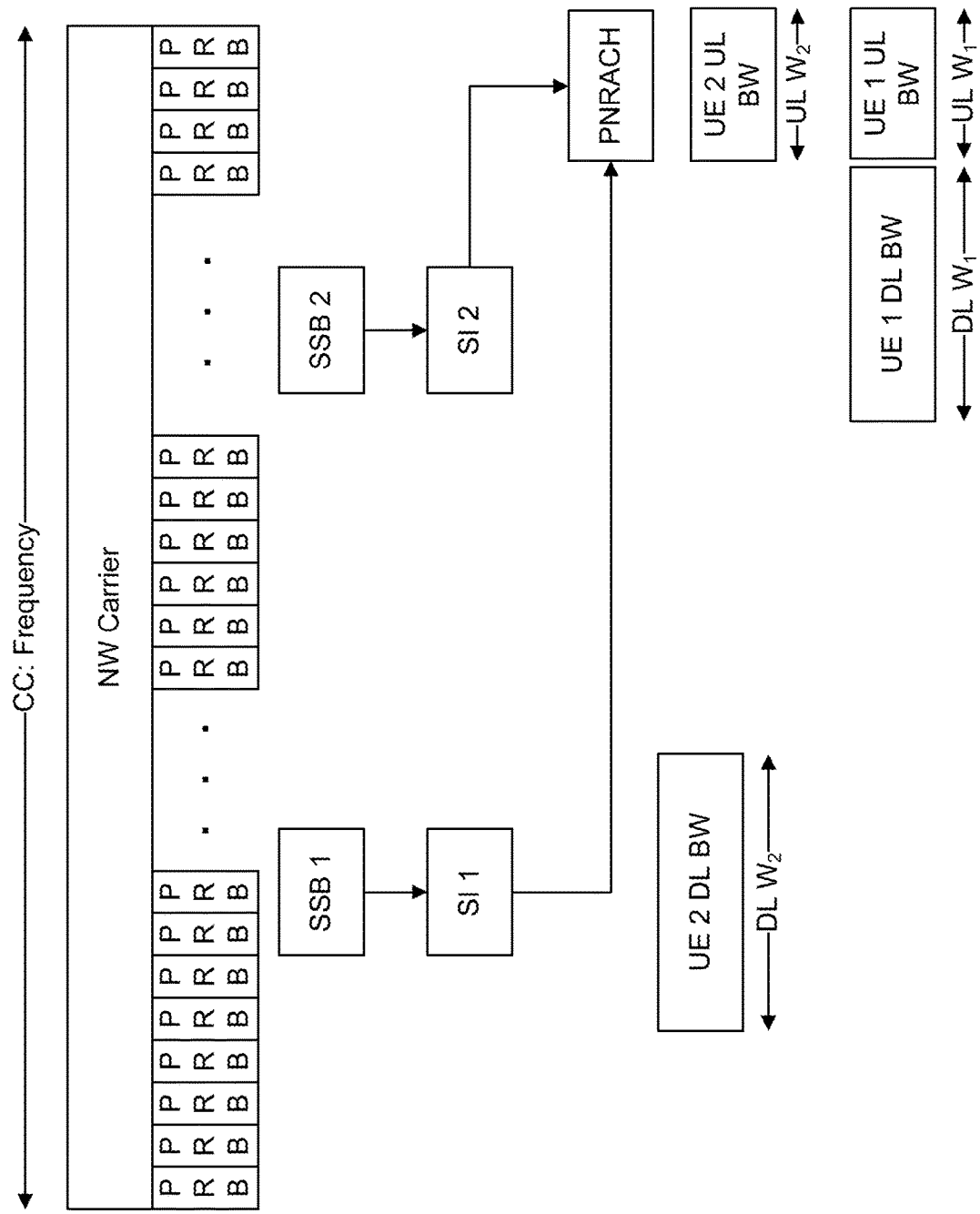
FIG. 22A illustrates an example of a single allocated PRACH frequency resource in a first case.
Figure 22B:
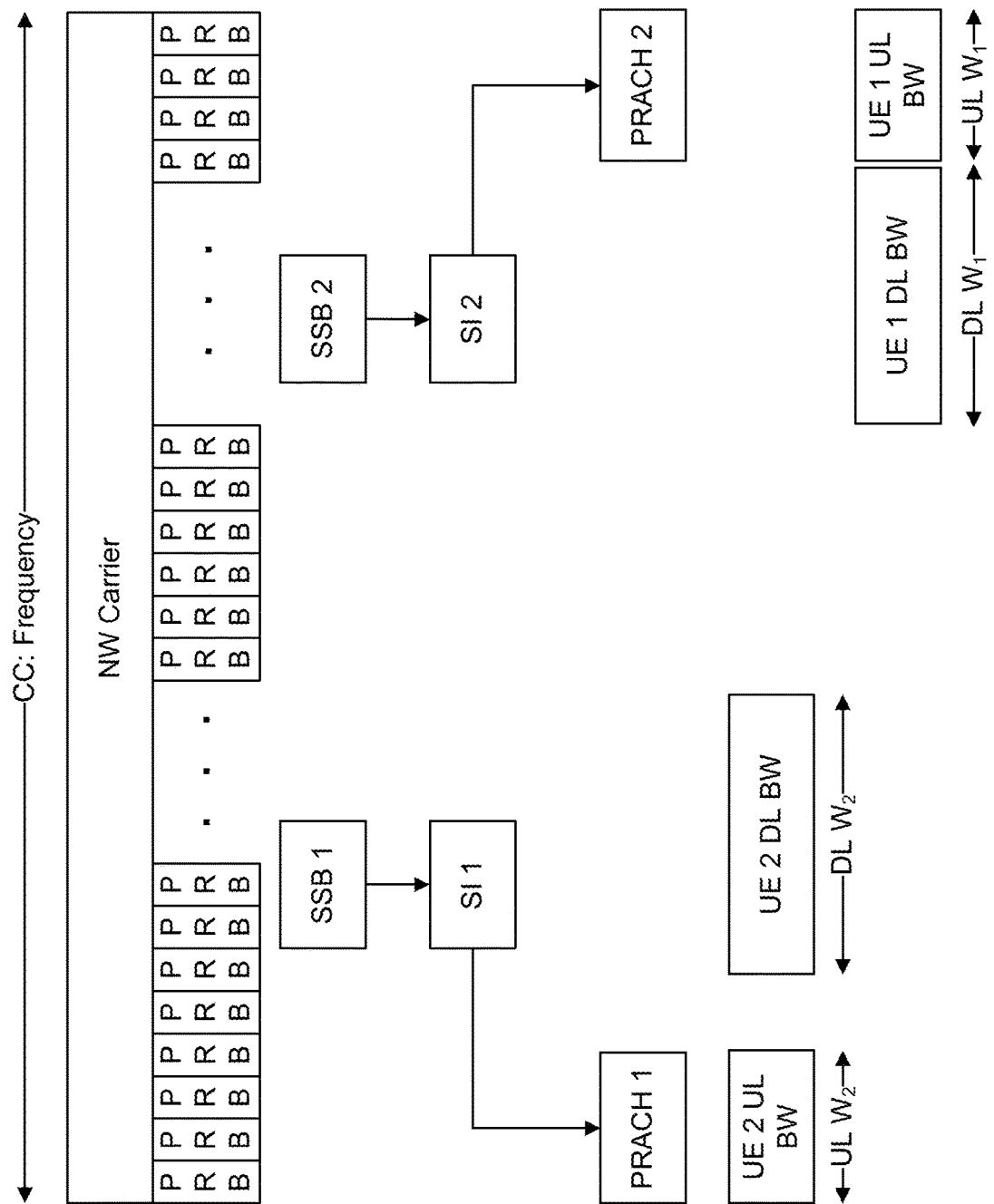
FIG. 22B illustrates an example of a single allocated PRACH frequency resource in a second case.
Figure 22C:
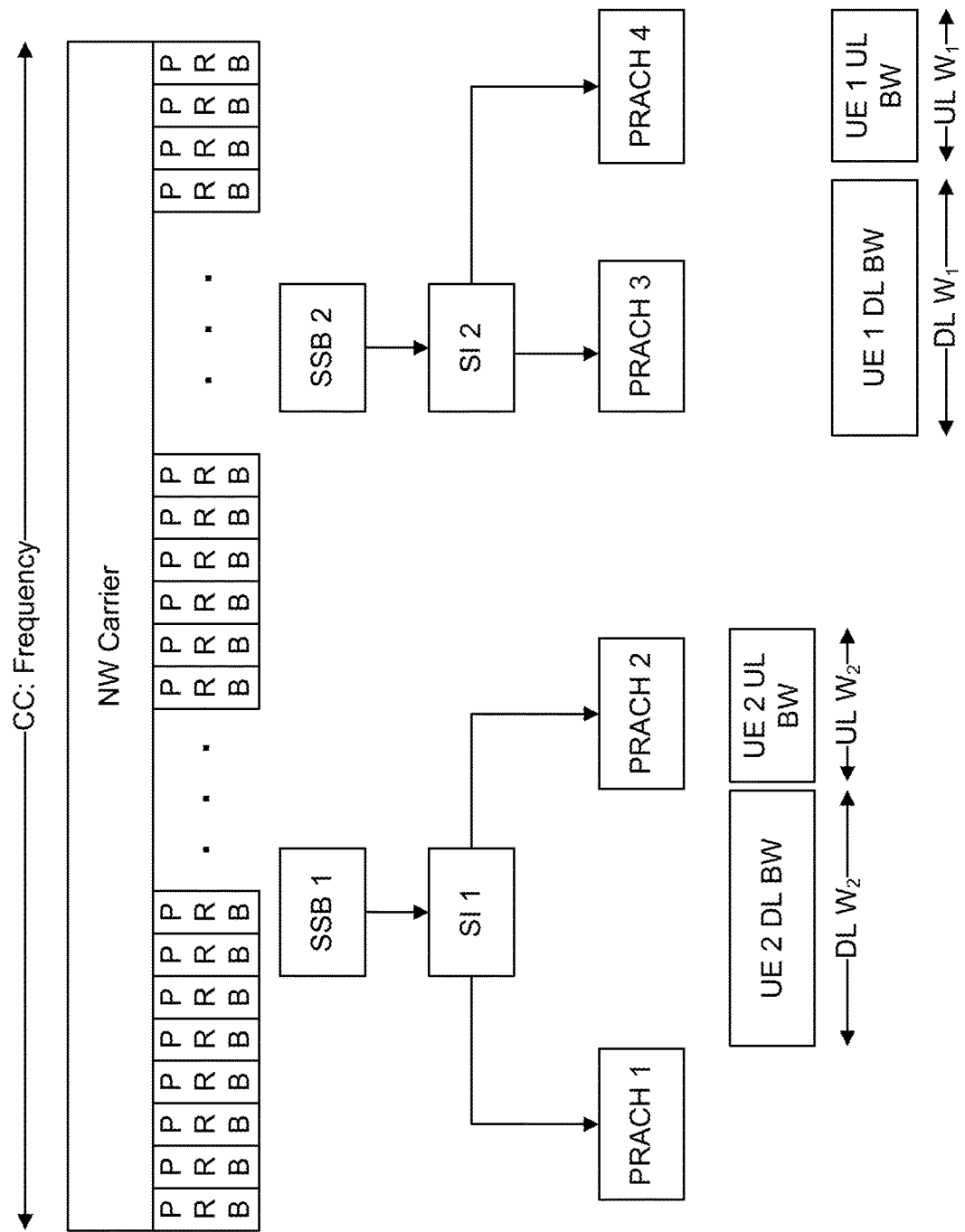
FIG. 22C illustrates an example of a multiple allocated PRACH frequency resources where $SIi \neq SIj$ for $i \neq j$.

FIG. 22A illustrates a single allocated PRACH frequency resource case 1 where SIi≠SIj for i≠j. If SIi≠SIj for i≠j, then the PRACH resource(s) may be configured as shared PRACH allocated resource, as shown in FIG. 22A. FIG. 22B illustrates a single allocated PRACH frequency resource case 2 when SIi≠SIj for i≠j. Alternatively, the PRACH resource(s) may be configured as multiple allocated resources, as shown in FIG. 22B. FIG. 22C illustrates a multiple allocated PRACH frequency resources when SIi≠SIj for i≠j.

According to this embodiment, a narrow band UE includes a supported BW denoted as BWUE. If a narrow band UE, e.g., BWUE<BWCC, has multiple allocated PRACH resources for transmitting PRACH, when SIi=SIj for i≠j, then UE may choose a PRACH resource based on a Cell ID and RA-RNTI, or alternatively, can randomly choose one of the allocated PRACH resources.

Figure 23B:
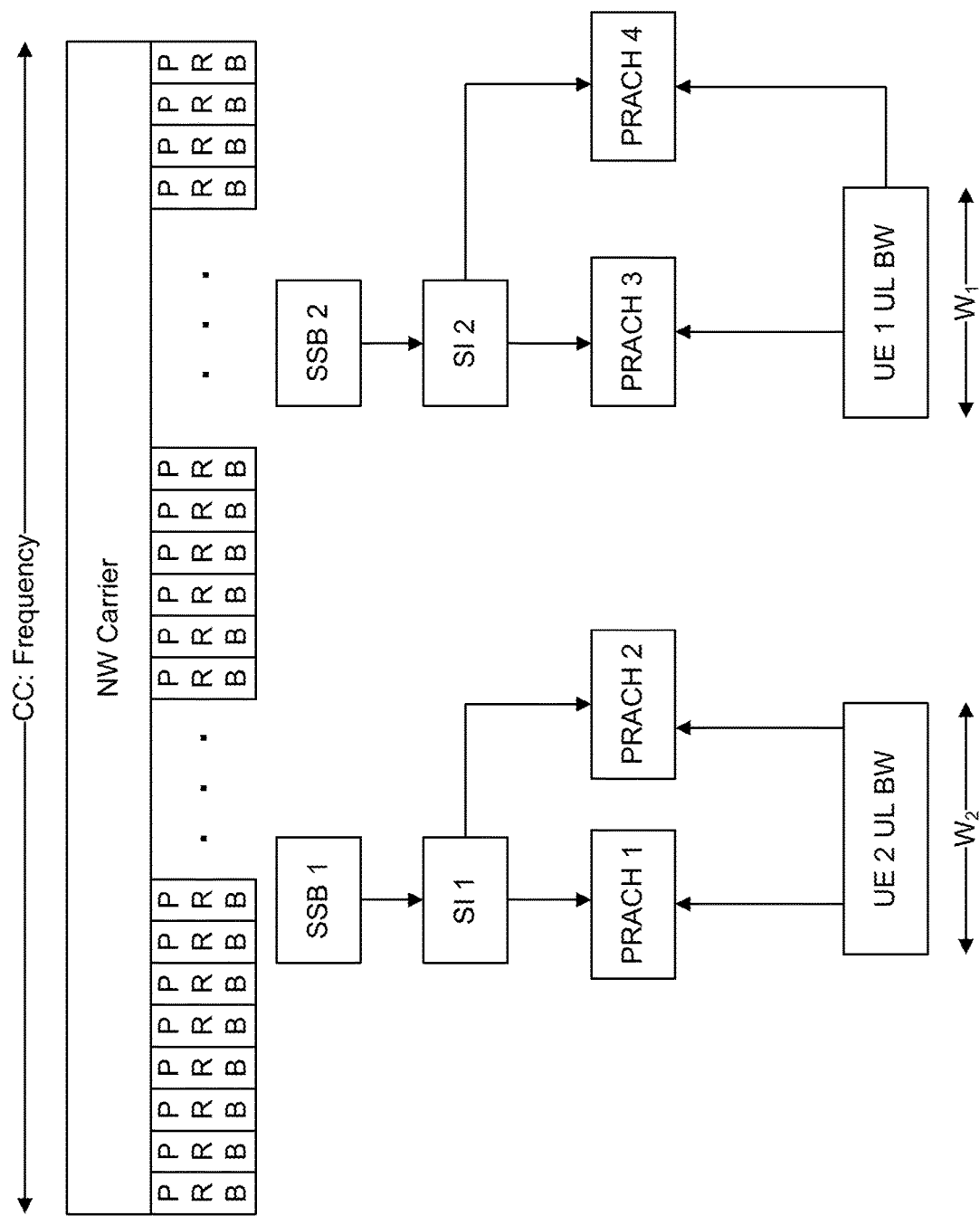
FIG. 23B illustrates an example of PRACH resource(s) associate with $SI_1$ and $SI_2$ where $SI_i \neq SI_j$ for $i \neq j$.

In a further embodiment, FIG. 23A and FIG. 23B illustrate an example where 2 UEs perform initial access from RRC_IDLE mode. For each UE, BWUE<BWCC and SI indicates more than one allocated PRACH resources. In this case, UE 1 and UE 2 have 2 PRACH resources for transmitting PRACH. FIG. 23A illustrates an example of PRACH resource(s) associated with SI1 and SI2 and when SIi=SIj for i≠j. FIG. 23B illustrates an example of PRACH resource(s) associate with SI1 and SI2 and where SIi≠SIj for i≠j.

A gNB or Cell/TRP may configure at least one DL BWP as a default BWP and the default BWP(s) should contain a SS burst set within UE's BW and PRACH resources including allocated frequency resources and PRACH preamble configuration. The PRACH resources may be tied with SSB. The UE's PRACH resources (include allocated frequency resource and PRACH preambles) for default BWP may be from PRACH resources are indicated by SI information. The PDSCH carry SI is indicated by MIB.

RRC Connection Re-Establishment Procedure

According to yet another aspect of the application, when a radio link failure (RLF) occurs, the UE needs to re-establish an RRC connection. In this scenario, the UE initiates random access. If the configured contention PRACH resource is not in the active BWP, then UE may re-tune its BW to the configured contention-based PRACH resources, e.g., the contention-based PRACH resource defined in the default BWP to transmit random access preamble and receive the random access response.

During the RRC re-establishment procedure, gNB may configure a new BWP for the UE. Once the RRC re-establishment procedure is completed, the UE may tune its BWP to the active BWP. If the contention-based PRACH resources are in the default BWP, then UE may use the PRACH resources associated with SSB to transmit PRACH. If the contention-based PRACH resources are not in the default BWP, then UE may use the PRACH resources associated with a CSI-RS to transmit PRACH.

Figure 24A:
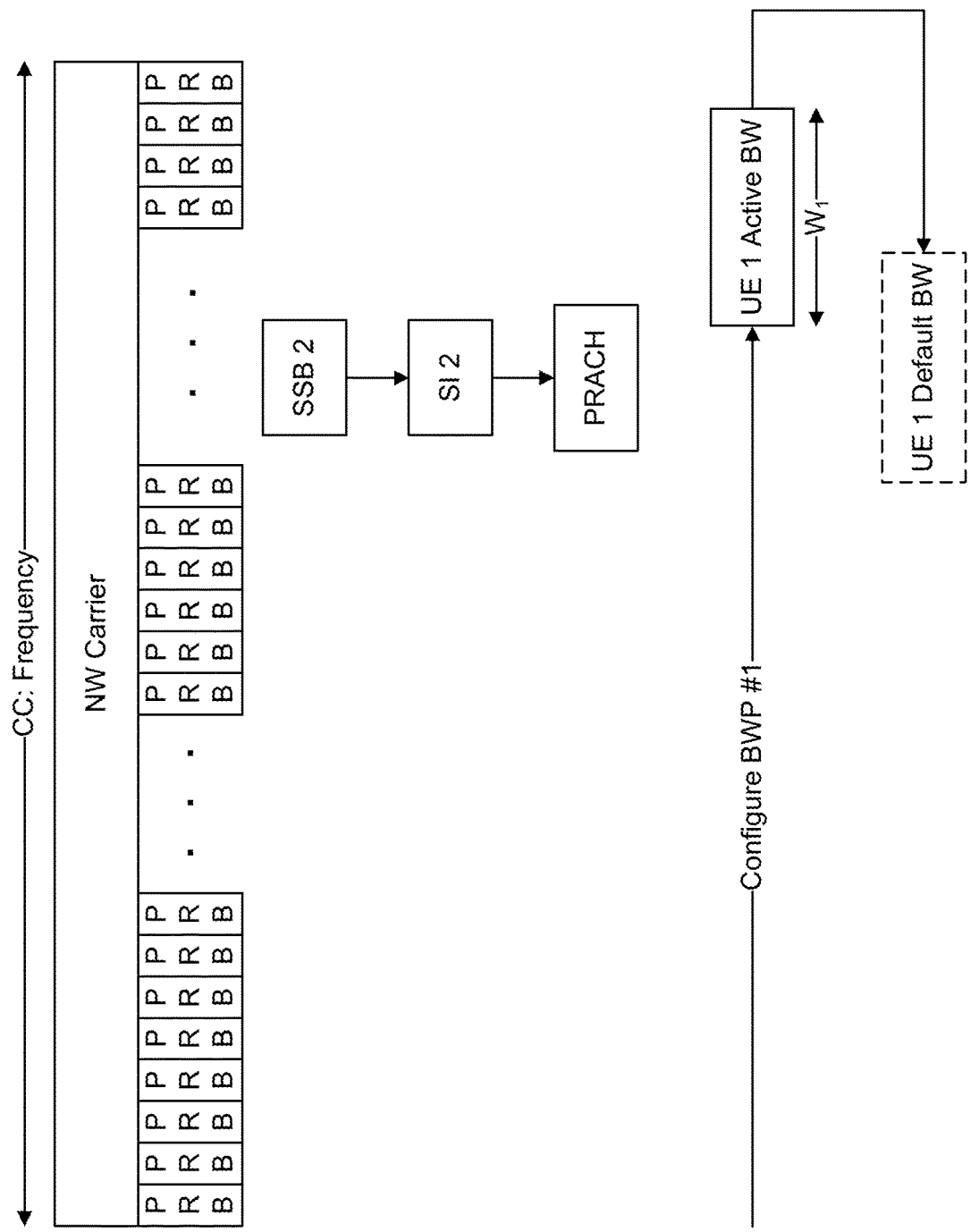
FIG. 24A illustrates reestablishing an RRC connection where PRACH resources are not in the current active BW.

FIG. 24A illustrates reestablishing an RRC connection where PRACH resources are not in the current active BW. Here, the configured contention-based PRACH is allocated within the default BWP. The current, active BWP does not overlap with the PRACH frequency resource. If the RRC connection needs to be re-established, the UE may tune its BW from a current active BWP to a default BWP, or alternatively, to the BWP containing the PRACH resource. Upon finishing the RRC re-establishment procedures, the UE may retune its BWP(s) to a new, active BWP(s) if a new active BWP(s) has been configured during the RRC re-establishment procedures. If so, the UE can re-tune its BWP(s) to the active BWP(s) before the RRC re-establishment.

Figure 24B:
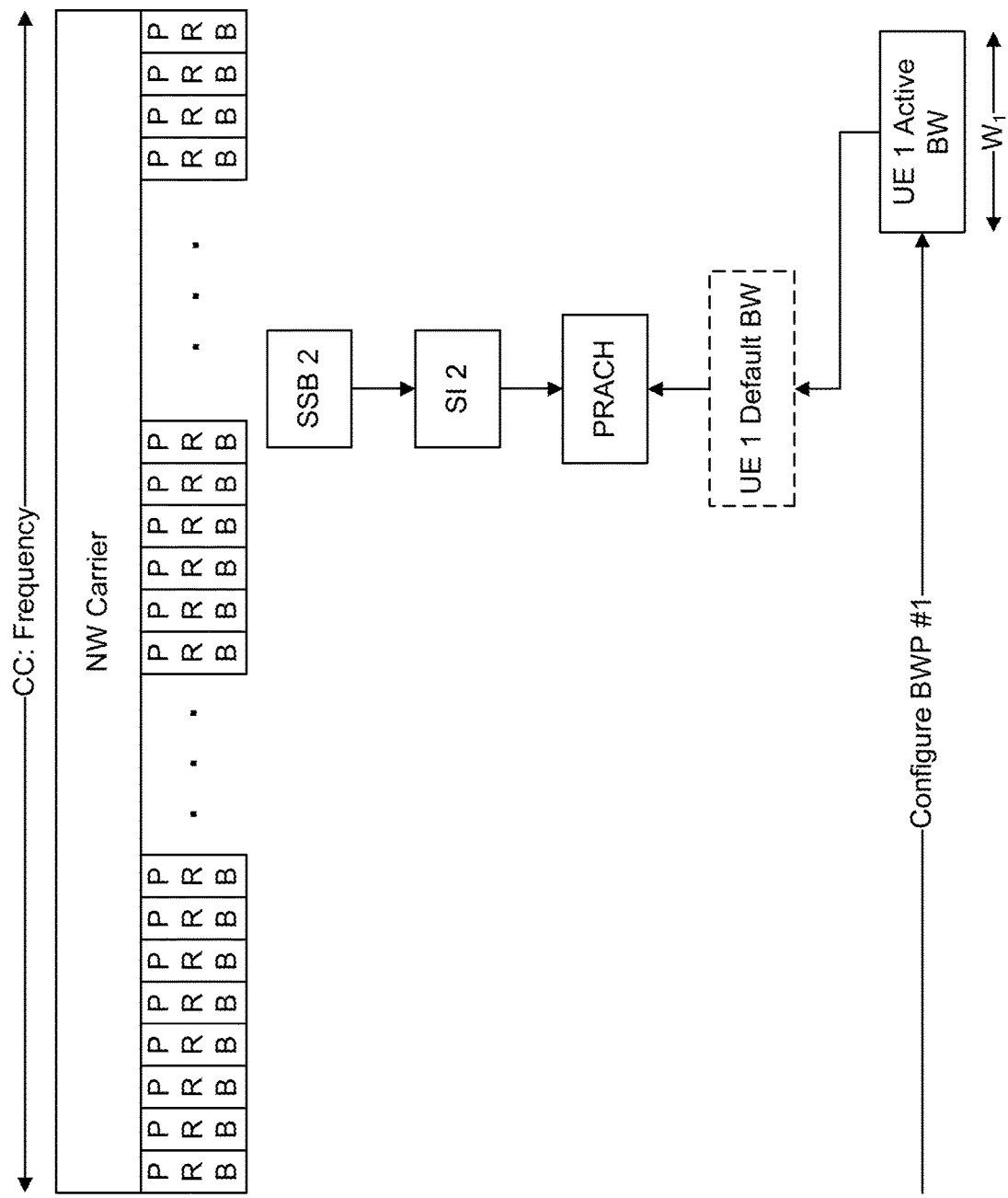
FIG. 24B illustrates reestablishing an RRC connection where the UE active BW is reconfigured during the RRC reestablish procedure.

FIG. 24B illustrates reestablishing an RRC connection where the UE additive BW is reconfigured during the RRC reestablishment procedure.

Figure 25:
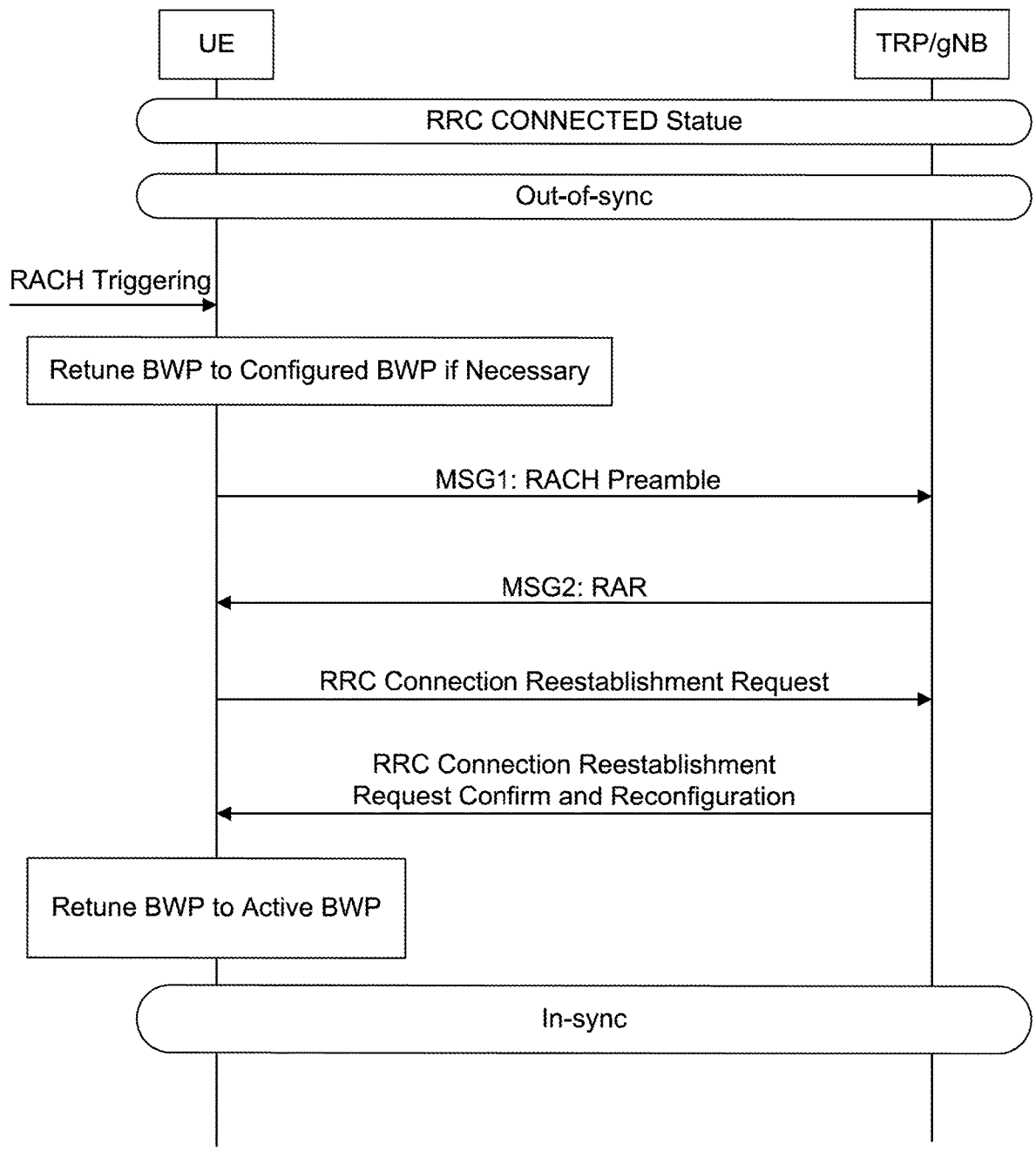
FIG. 25 shows an example method to reestablish an RRC connection with BWP configuration.

A method to reestablish an RRC connection with BWP configuration is exemplarily shown in FIG. 25. In one embodiment, the method may be employed where a UE in the RRC_CONNECTED state needs to send uplink data to a gNB and finds that it is out of uplink synchronization scenario. In another embodiment, the method may be employed for DL data arrival during RRC_CONNECTED requiring a random access procedure, e.g., when UL synchronization status is "non-synchronized."

In an embodiment, when a gNB needs to send downlink data to a UE in the RRC_CONNECTED state and finds the UE is out of uplink synchronization due to an alignment timer expiring, the gNB instructs the UE to initiate contention-free random access. The contention-free PRACH is dynamically triggered via DCI (PDCCH) and the PRACH resources for BWP operation. If the contention-free PRACH resource, e.g., UL PRACH transmission and DL RAR reception resources are allocated in the active band, the DL RA response (RAR) and UL PRACH transmission may be performed within the same active band so there is no need to retune the active BWP(s). On the other hand, if the contention-free PRACH resource is not in the active band, the UE retunes from the active BWP(s) to the BWP(s) where it can receive the DL RAR and transmit the PRACH preamble.

The UE may retune back to the active BWP(s) upon completing synchronization. The allocated contention-free PRACH resources may be indicated by CSI-RS or connected-mode SSB. The timing of transmitting the PRACH preamble may be configured after 1 symbols with the reception of DCI at a time slot.

Figure 26:
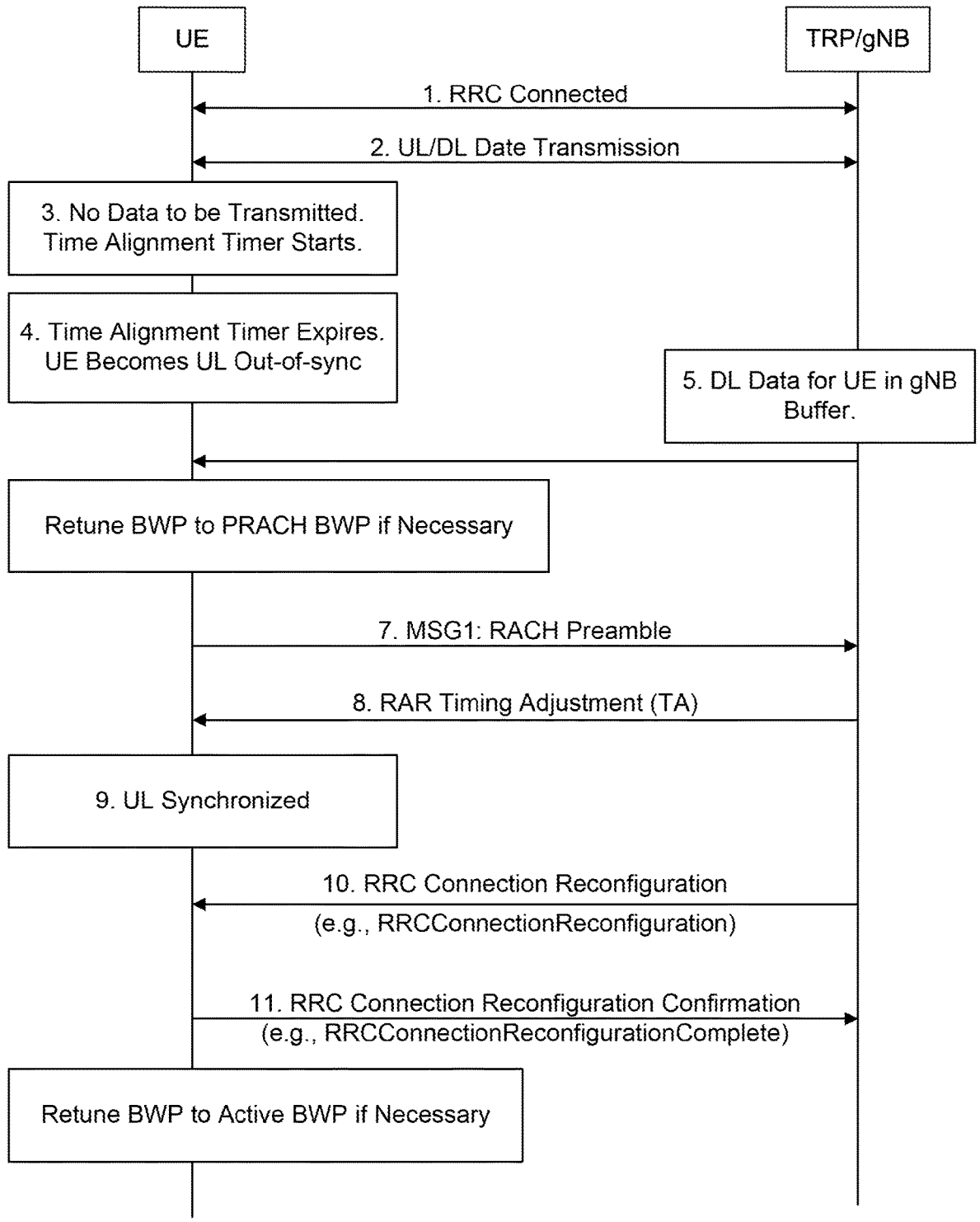
FIG. 26 shows an example method for DL data arrival during RRC_CONNECTED requiring random access with BWP configuration.

FIG. 26 shows an example method for DL data arrival during RRC_CONNECTED requiring random access with BWP configuration. Each of the steps is denoted by an Arabic numeral. In particular, the UE determines that the time alignment timer expires in step 4. The UE receives DL data from a gNB in a buffer state. The UE retunes its BWP to the PRACH BWP as needed and sends a messages including RACH preambles to the gNB in step 7. The UE receives a RAR timing adjustment (TA) in step 8. Then, the UE synchronizes its UL (step 9). After receiving and confirming the RRCE connection reconfiguration in steps 10 and 11, the UE retunes its BWP to an active BWP.

Handover

According to yet another aspect of the application directed to handover, a UE initiates random access in the target cell. If a contention-based PRACH is used for handover, and if the configured contention PRACH resource is not in the active BWP, the UE may retune its BW to the predefined contention PRACH resources. For example, the contention PRACH resource defined in the default BWP is used to transmit random access preamble and receive the response.

A target gNB may configure a new BWP(s) information via the handover command; e.g., the PHY/MAC configuration provided in the RRCConnectionReconfiguration message sent to the UE. Once the handover procedure is finished, the UE can tune its BWP(s) to the RRC configured BWP(s) within the target cell as the new active BWPs. The target cell's BWP configuration is in radioResourceConfigDedicated lists as shown in Example 1.

EXAMPLE 1

| RRC ConnectionReconfiguration message |
|---|

```
-- ASN1START
RRCConnectionReconfiguration-r8-IEs ::= SEQUENCE {
    measConfig            MeasConfig            OPTIONAL,    -- Need ON
    mobilityControlInfo   MobilityControlInfo   OPTIONAL,    -- Cond HO
```

| RRC ConnectionReconfiguration message | | | |
|---|---|---|---|
| dedicatedInfoNASList | SEQUENCE (SIZE(1..maxDRB)) OF DedicatedInfoNAS | OPTIONAL, | -- Cond nonHO |
| radioResourceConfigDedicated | RadioResourceConfigDedicated | OPTIONAL, | -- Cond HO-toEUTRA |
| securityConfigHO | SecurityConfigHO | OPTIONAL, | -- Cond HO |
| nonCriticalExtension | RRCConnectionReconfiguration-v890-IEs | OPTIONAL | |
| RadioResourceConfigDedicated ::= | SEQUENCE { | | |
| srb-ToAddModList | SRB-ToAddModList | OPTIONAL, | -- Cond HO-Conn |
| drb-ToAddModList | DRB-ToAddModList | OPTIONAL, | -- Cond HO-toEUTRA |
| drb-ToReleaseList | DRB-ToReleaseList | OPTIONAL, | -- Need ON |
| mac-MainConfig | CHOICE { | | |
|     explicitValue |     MAC-MainConfig, | | |
|     defaultValue |     NULL | | |
| } OPTIONAL, | | | -- Cond HO-toEUTRA2 |
| sps-Config | SPS-Config | OPTIONAL, | -- Need ON |
| physicalConfigDedicated | PhysicalConfigDedicated | OPTIONAL, | -- Need ON |
| ..., | | | |
| [[ bandwidthPartInfo- | RLF-TimersAndConstants-r15 | OPTIONAL | -- Need ON |
| ]], | | | |
| [[ rlf-TimersAndConstants-r9 | RLF-TimersAndConstants-r9 | OPTIONAL | -- Need ON |
| ]], | | | |
| [[ measSubframePatternPCell-r10 | MeasSubframePatternPCell-r10 | OPTIONAL | -- Need ON |
| ]], | | | |
| [[ neighCellsCRS-Info-r11 | NeighCellsCRS-Info-r11 | OPTIONAL | -- Need ON |
| ]], | | | |
| [[ naics-Info-r12 | NAICS-AssistanceInfo-r12 | OPTIONAL | -- Need ON |
| ]], | | | |
| [[ neighCellsCRS-Info-r13 | NeighCellsCRS-Info-r13 | OPTIONAL, | -- Cond CRSIM |
| rlf-TimersAndConstants-r13 | RLF-TimersAndConstants-r13 | OPTIONAL | -- Need ON |
| ]], | | | |
| [[ sps-Config-v1430 | SPS-Config-v1430 | OPTIONAL | -- Cond SPS |
| ]] | | | |
| } | | | |

A new 'bandwidthPartInfo' subfield is added to a 'physicalConfigDedicated' field. The 'bandwidthPartInfo' lists the target cell BWP information for UE.

If the contention PRACH resource is in the default BWP(s), then the UE may use the PRACH resources associated with the target cell's SSB. If the contention PRACH resource is not in the default BWP(s), then the UE may use the PRACH resources t associated with the target cell's SSB.

If contention-free based PRACH is used for handover, then the contention-free PRACH may be dynamically triggered via DCI (PDCCH). For example, the PDCCH order and the contention-free PRACH resources, e.g., BWP(s) operation may be the contention-free PRACH frequency resources is within the active band, in this case, transmit the PRACH preamble and RA response (RAR) may be done in the active band. Alternatively, the contention-free PRACH resources may be allocated contention-free PRACH resources, e.g., BWP(s) are not in the (current) active band, in this case, UE re-tune its BWP(s) to the contention-free PRACH and receive the RAR at the configured PRACH BWP. Once UE completes handover, UE may re-tune back to active BWP. The allocated contention-free PRACH resources may be indicated by CSI-RS or connected-mode SSB. The timing of transmitting PRACH may be configured l symbols following the reception of DCI.

Figure 27:
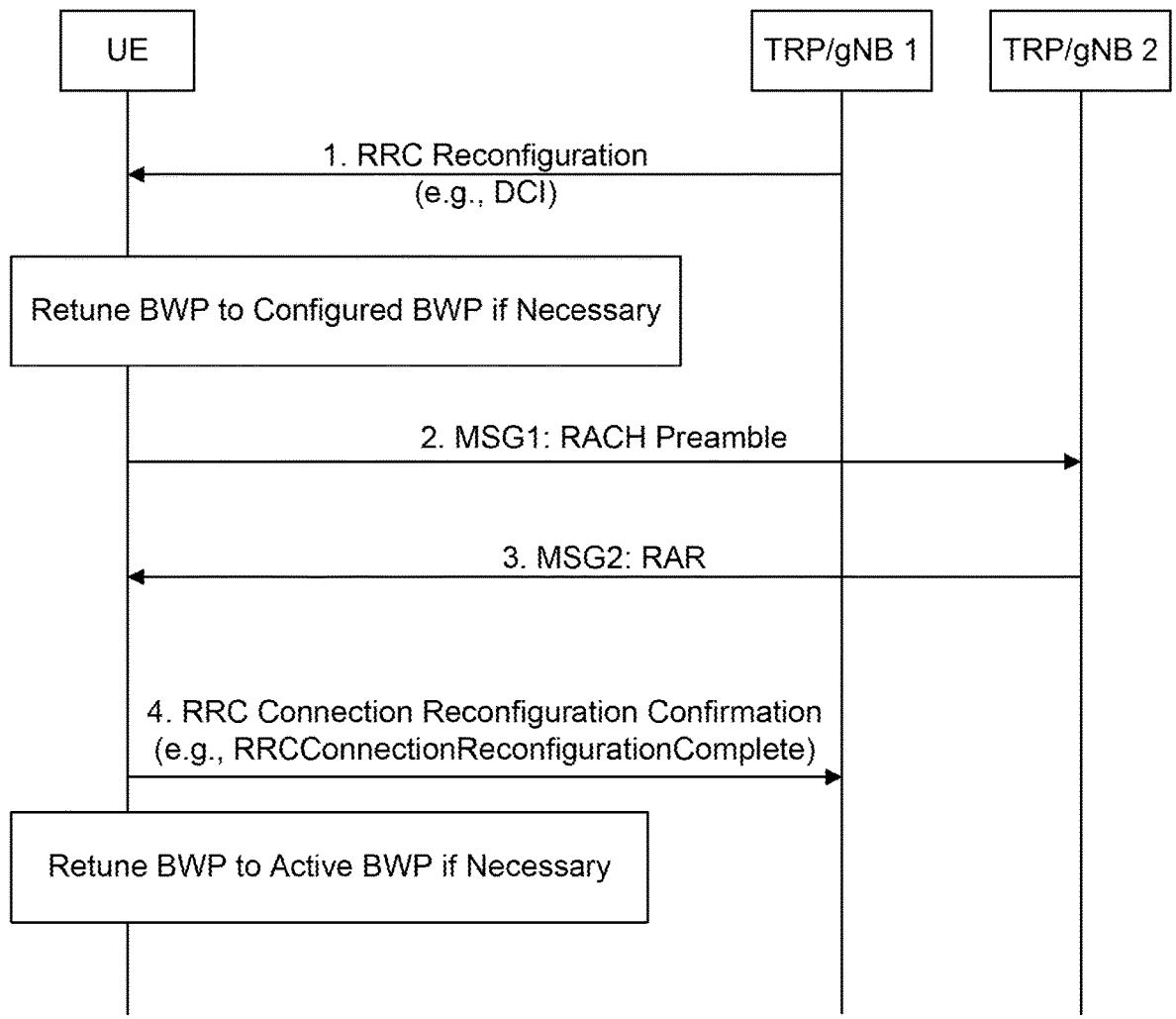
FIG. 27 is a call flow of an example UE handover procedure with BWP operation.

FIG. 27 illustrates an exemplar call flow of a UE handover procedure with BWP operation. This procedure requires random access with BWP configuration for contention-free based PRACH operations.

Multi-Link

According to yet a further aspect of the application, it is envisaged one or more PDSCHs may be transmitted in one BWP. In an embodiment, a PDSCH may be split into 2 BWPs for transmission. For example, a UE may be configured with 3 BWPs and 2 PDSCHs transmission. In this example, a UE may be configured with three BWPs, such as for example, BWP #1, BWP #2 and BWP #3. The PDSCH #1 may be transmitted in the BWP #1 and BWP #3. The PDSCH #2 may be transmitted in the BWP #2. This may be accomplished where a (primary) PDCCH co-schedules 2 PDSCHs in a (primary) BWP. For example, let BWP #1 be set as the primary BWP for co-scheduling PDCCH. Alternatively, two PDSCHs may be independently scheduled by two PDCCHs. Each PDCCH only transmits on the BWP having a configured CORESET. For example, the PDCCH #1 may be transmitted on BWP #1 and the PDCCH #2 may be transmitted in the BWP #3.

If a primary PDCCH co-schedules 2 PDCSHs and one of these links (or TRPs) requests RRC re-configuration or DL/UL out-of-sync, then the random access may use the PRACH BWP associated with the default BWP. If the default BWP partially or entirely overlaps with one of the active BWPs, then the rate matching information including the allocated PRACH BW needs to signal the UE.

If a primary PDCCH independently schedules 2 PDCSHs and one of the links (or TRP) either requests RRC reconfiguration or DL/UL out-of-sync, then the RA may use the PRACH BWP associated each default BWP. If each default BWP partially or entirely overlaps with one of the active BWPs, then the rate matching information including the allocated PRACH BW needs to signal to the UE. If multiple BWPs only use a primary default BWP, then the UE may use the PRACH resource (e.g., PRACH on PRB) in the primary default BWP.

Figure 28A:
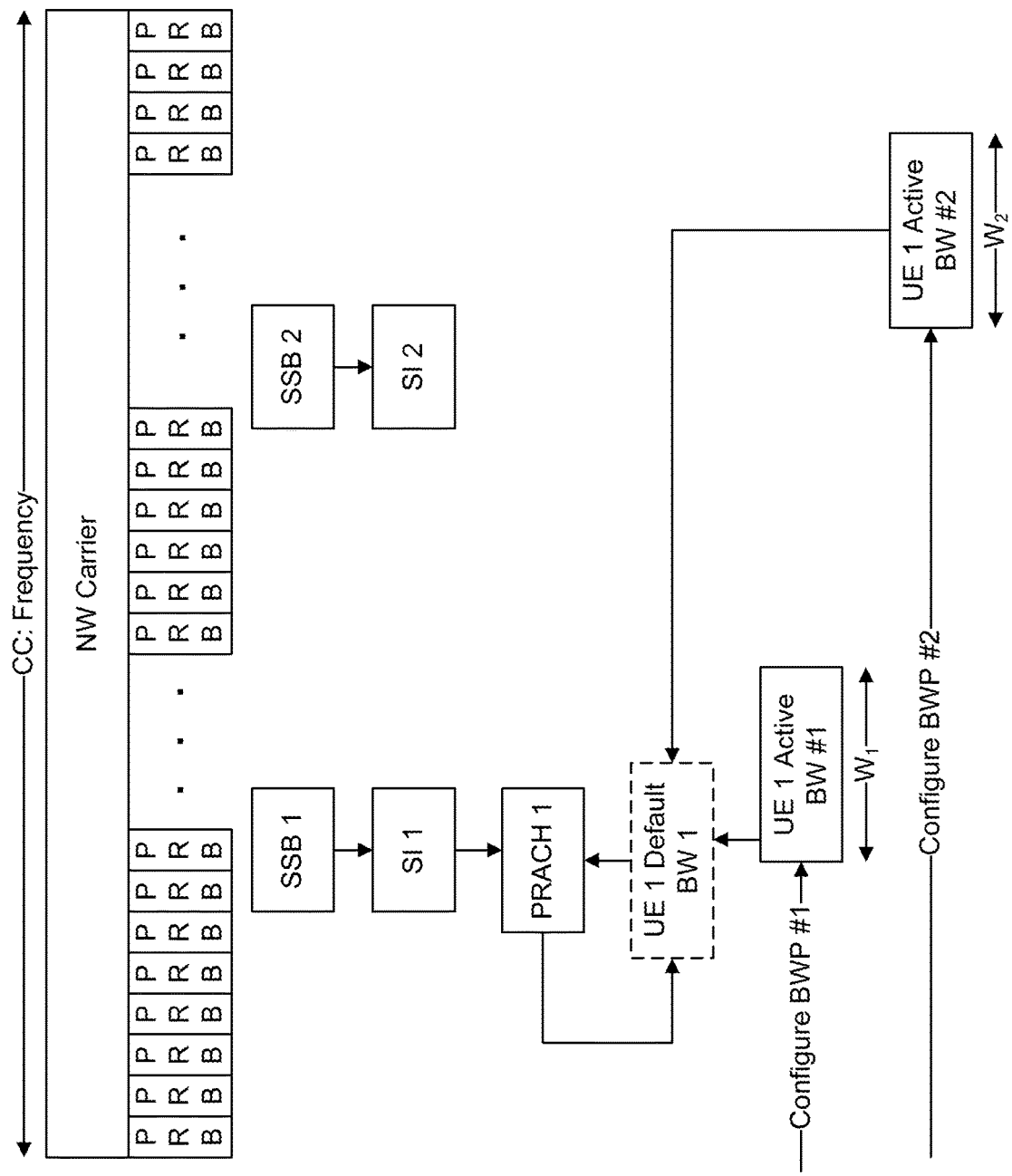
FIG. 28A illustrates a case where two PDCCHs are co-scheduled and use the PRACH BW associated with default BW 1.
Figure 28B:
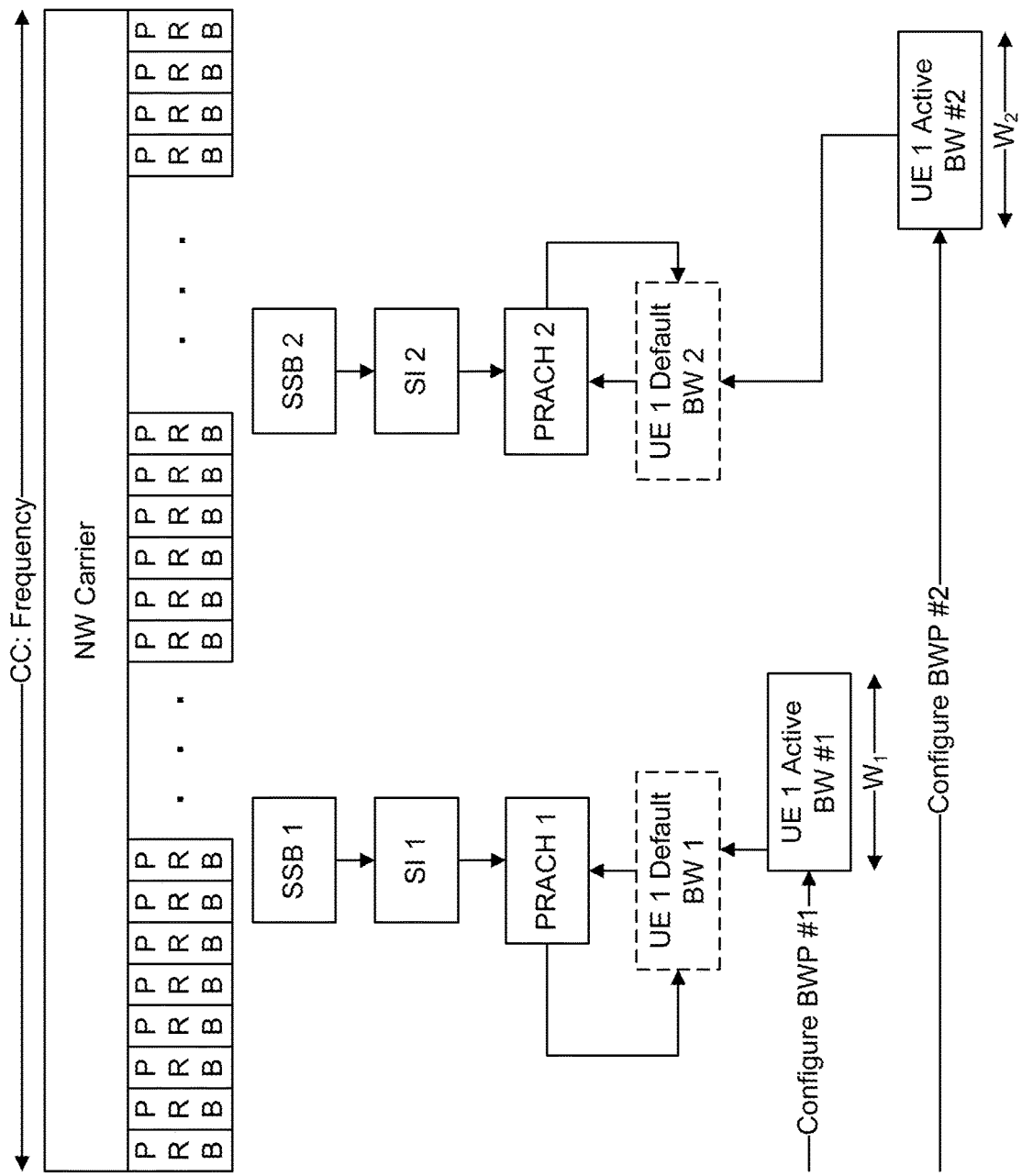
FIG. 28B illustrates a case where two PDCCHs are independently scheduled and use the PRACH BW associated with each default BWP, e.g., default BWP 1 and default BWP 2.

In an exemplary embodiment as shown in FIG. 28A, two PDCCHs are co-scheduled and use the PRACH BW associated with default BW 1. In FIG. 28B, two PDCCHs are independently scheduled and use the PRACH BW associated with each default BWP, e.g., default BWP 1 and default BWP 2.

Beam Recovery Request

According to yet even another aspect of the application, it has been discovered that when a UE's current beam triggers beam failure recovery, the UE needs to transmit a beam recovery request (BRR). For example, if PUCCH cannot be used for BRR transmission, the UE may initiate RA where the UE goes back to the (primary) default BWP(s) and uses the PRACH associated with the primary BWP to transmit PRACH with BRR. The dedicated PRACH preamble may be used to distinguish the BRR. The UE may then set and start the BWP timer, and if the BWP timer expires and there is no successful reception of RAR, the UE may stay at the (primary) default BWP(s) and set RRC_CONNECT to RRC_IDLE. If the beam is recovered before the BWP timer expires, the UE may switch (re-tune) back to the active BWP(s).

Alternatively, the UE may use the RA resources configured via RRC. The RA resources include two major parts. One of these parts is for UL PRACH transmission. The other part is for DL RAR reception. The configured RA resource can be the same as the current, active BWP(s) or at different BWP(s). The UE may use the PRACH associated with the primary BWP to transmit PRACH with BRR. The dedicated PRACH preamble can be used to distinguish the BRR. The dedicated PRACH preamble can also be used for setting and starting the BWP timer. If the BWP timer expires before reception of RAR, then the UE stays at the configured BWP and sets RRC_CONNECT to RRC_IDLE. However, if the beams is recovered before the BWP timer expires, the UE may switch (re-tune) back to the active BWP if necessary.

If PUCCH is available for BRR transmission, the UE may transmit BRR via PUCCH from an active BWP and set and start the BWP timer. If a successful reception of ACK occurs before the BWP timer expires, then the beam is recovered and the UE may resume to receive and transmit data. If the BWP timer expires without successful reception of ACK of BRR, then the UE may retune from the configured BWP(s) to the (primary) default BWP(s) and set RRC_CONNECT to RRC_IDLE.

Figure 29:
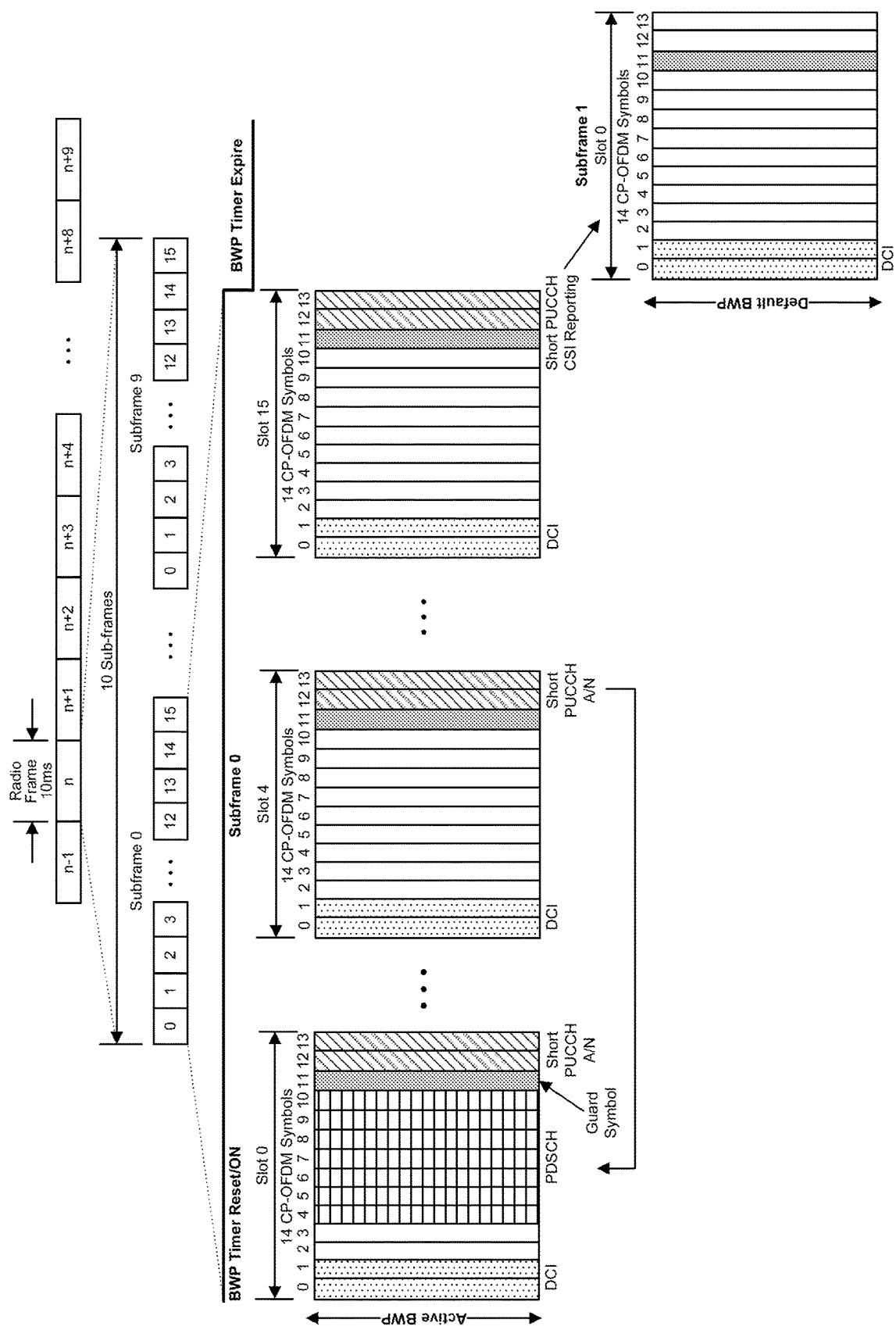
FIG. 29 illustrates an example of timing for active BWP timer expiration and UE going back to default BWP.

According to a further embodiment as exemplarily illustrated at FIG. 29, timing for active BWP timer expiration and the UE going back to a default BWP are described. BWP timer configuration, resolution, and operation methods may be used for a UE switching its active DL/UL bandwidth part (BWP) to a default or another active DL/UL BWP using BWP timers. The mechanisms discussed herein for switching from an active BWP to default BWP are also applicable to the scenarios such as switching from one active BWP to another active BWP.

A BWP inactivity timer may be configured and signaled to a UE by one of the following exemplary methods. For example, a bwp-inactivityTimer may specify the number of consecutive slot(s) during which the UE is active after successfully decoding a PDCCH indicating a new transmission or retransmission either on UL or DL. For example, this timer is restarted/reset upon receiving a UL grant on DL scheduling PDCCH. Upon expiration of this timer, the UE can switch to the default BWP.

The BWP inactivity timer is configured by RRC message for a serving cell, e.g., Primary Cell (PCell) or Primary SCell (PSCell). The BWP inactivity timer configuration may be carried under bwp-config IE in a RRC message such as RRCConnectionReconfiguartion, jointly with MAC-MainConfig for DRX cycle setting.

For an unpaired spectrum such as a TDD, inactivity DL and UL BWP timers may be jointly configured, or one BWP inactivity timer may be shared for both DL and UL. For example, the BWP inactivity timer value can be set as 1 ms as illustrated in FIG. 29, where a UE goes back to the default BWP when the BWP inactivity timer expires. Meanwhile, for a paired spectrum such as FDD, the DL and UL BWP inactivity timers may be separately configured, e.g., DL and UL inactivity timers.

The BWP inactivity timer value may be dependent on the configured BWP with the same or different numerologies or the BWP's BW. RRC signaling can configure separate BWP timers for each configured BWP. However, there is no need to configure an inactivity timer for the default BWP. A UE can refer the BWP inactivity timer value from the BWP activation DCI. The activation DCI uses a bit map or BWP index to indicate which configured BWP is enabled or activated, and the UE may set the BWP inactivity timer according to the activated BWP, where the timer value(s) for the BWP(s) may be configured via higher layer signaling, e.g., RRC.

In RRC message, the BWP inactivity timer values may be defined in terms of time, such as ms as an example, so it can be adapted to different numerologies or bandwidth. In FDD, the inactivity timer for DL or UL can be counted down contiguously for every slot. In TDD, the BWP inactivity timer decreases only when counting DL subframe and special subframe (SSF), Where the SSF is used to facilitate DL to UL switching.

A UE can send a Scheduling Request (SR) while the UL BWP inactivity timer is ON, but once it sends a SR, it should continuously monitor PDCCH until it finishes the SR procedures even if the DL BWP inactivity timer expires. Alternatively, when the UE transmits a SR in the UL, it should reset its UL for FDD or DL-UL for TDD or self-contained subframe BWP inactivity timer or pause or hold its BWP inactivity timer when UE receives DL DCI for uplink grant. In this method, if the DL BWP inactivity timer is shorter than the corresponding sr-ProhibitTimer, the UE needs to continue to monitor PDCCH until the sr-ProhibitTimer expires.

Figure 30A:
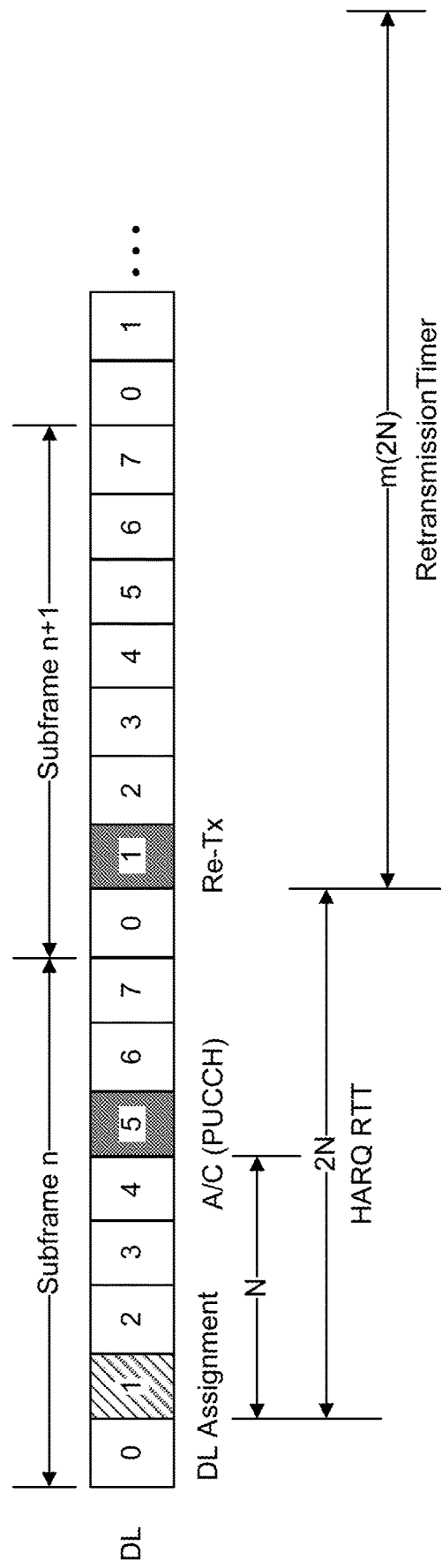
FIG. 30A illustrates an example of timing for HARQ RTT and retransmission timer.

In FDD, once the UE gets the uplink grant DCI (corresponding to it SR), it resets the UL BWP inactivity timer, e.g., ulbwp-inactivityTimer. In TDD, it reset the BWP inactivity timer bwp-inactivityTimer. If a UE switches from an active DL (first) BWP to another active DL or default (second) DL BWP, and the first and second BWPs are using different numerologies, then PRACH resource needs to be assigned for each (UL) BWP FIG. 30A illustrates an exemplary embodiment of timing for HARQ RTT and retransmission timer. A UE may have a BWP inactivity timer and one HARQ entity per serving cell with multiple BWPs, for example. While the BWP inactivity timer is ongoing (e.g., counting down), if there is a retransmission (NACK), the UE may respond in a number of ways. For example, the UE may sets the BWP inactivity timer according to the retransmission. Alternatively, the UE may hold the BWP inactivity timer for the retransmission.

The UE may release the hold of the inactivation timer after the earliest of the following: retransmission is ACKed, e.g., upon successful decoding of retransmission data; retransmission is timed out; or retransmission has reached the maximum retransmissions.

The retransmission timer value can be dynamically signaled via a DCI HARQ message. The UE can setup the dynamic DL/UL HARQ timing parameters via DCI. The dynamic DL/UL HARQ A/N timing parameters are K, and N. The DL/UL data reception in slot N and acknowledgment in slot +K. Therefore, the retransmission timer value can be set as 2N, e.g., minimum HARQ round trip time (RTT). The retransmission timer value can be setup as maximum number of retransmission times HARQ RTT.

While the BWP inactivity timer is ongoing (e.g., counting down for example) and a BWP activation DCI is received, Retransmission may be scheduled to the target BWP with the scheduling PDCCH carrying the activation DCI, e.g., UE switches to the activated BWP for retransmission and resets or deactivate the BWP inactivity timer.

When a BWP inactivity timer, e.g., bwp-inactivityTimer, expires and HARQ buffer is still not empty, the UE may opt not flush the HARQ buffer while performing switching to the default or another active BWP, e.g., unless the UE reports out-of-sync or there is no PUCCH resource assigned at the default (UL) BWP.

Figure 30B:
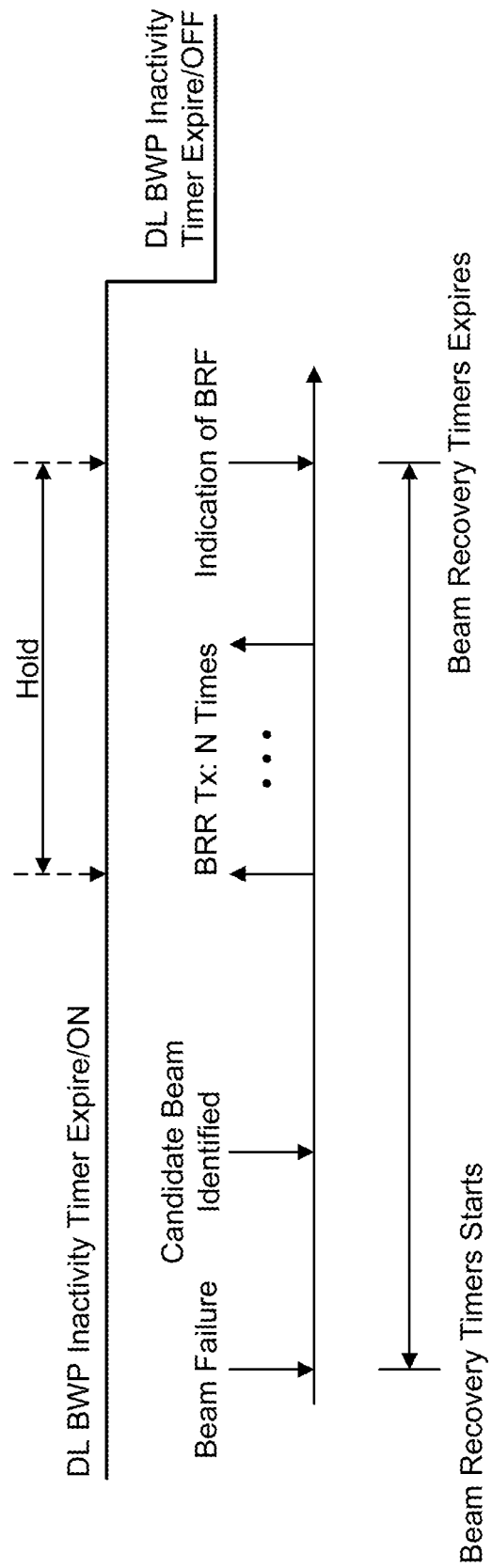
FIG. 30B illustrates an example of DL BWP inactivity timer with BFR.

According to FIG. 30B, if UE requests a Beam Failure Recovery (BFR), e.g., sends a PRACH or PUCCH for BFR while both beam recovery timer and the bwp-inactivityTimer for both DL and UL are running, then UE may pause the BWP inactivity timer(s) for both DL and UL, and then monitor the DL PDCCH in the current BWP for gNB's response. If UE receives the gNB's Beam Recovery (BR) response before the beam failure recovery timer expires or before the UE has reached the maximum transmission number of Beam Failure Recovery Requests (BFRRs), then the UE may resume the BWP inactivity timer. Otherwise, the UE may flush out the HARQ buffer, declares unsuccessful recovery of beam failure and then switch back to the default BWP.

If no CSI-RS or SSB is configured for the UE to perform new candidate beam identification upon detecting beam failure at the current BWP, the UE may start beam recovery timer and keep the data in HARQ buffer. The UE may switch to the default BWP and stop the BWP inactivity timer(s) for both DL and UL, and perform new candidate beam identification and request BFRR. The UE monitors BFRR response until the beam recovery timer expires or the UE has reached the maximum transmission number of BFRRs. FIG. 30B illustrates an exemplary embodiment of a DL BWP inactivity timer with BFR. If the UE starts the beam recovery timer during the BWP inactivity timer running time, the UE may pause the BWP inactivity timer or reset the BWP inactivity timer when UE performs BFRR until UE receive the BFR indication on the DL PDCCH at the current BWP.

If UE detects out-of-sync while either DL, UL for FDD, or DL-UL for TDD BWP inactivity timer, e.g., bwp-inactivityTimer is ongoing (ON) and the HARQ buffer is still not empty, UE doesn't flush out the HARQ buffer. If UE declares out-of-sync, e.g., the Radio Link (RL) recovery timer has expired, then the UE may go to the default BWP and the UE may reestablish a new RL from the default BWP.

A BWP inactivity timer may interact with the connected mode DRX timer. For example, the gNB may configure a UE with a BWP timer which triggers the UE to retune to the default DL BWP irrespective of RRC mode, if DL assignment or UL grant is not received for X slots on the current active DL BWPs and triggers UE to retune to a DL default BWP. The purpose of BWP inactivity timer is to switch to default BWP when there is inactivity on an active BWP.

Starting from the first slot in the onDuration period, a UE stays at the default BWP until after successfully decoding a PDCCH indicating an initial UL grant or DL transmission for this UE. If an initial BWP is indicated in the PDCCH, the UE will switch to initial BWP. If the UE goes back to DRX sleep mode, UE switches back to the default BWP. If there is no configured default BWP, it goes to DRX sleep mode on the initial BWP, which means the UE will wake up during onDuration period on this initial BWP. If BWP inactivity timer expires while DL/UL drx_RetransmissionTimer is running, the UE can hold the bwp-inactivityTimer and not switches to the default BWP. If BWP inactivity timer expires and the default BWP has a different numerology than the current active BWP while rx_RetransmissionTimer or drx_i-nactivityTimer is running, the UE does not flush out the HARQ buffer or If UE is in the default BWP while drx_RetransmissionTimer is running, then UE wait for drx_RetransmissionTimer expire. If BWP inactivity timer expires while drx-InactivityTimer is running, UE switches to the default BWP.

Figure 31A:
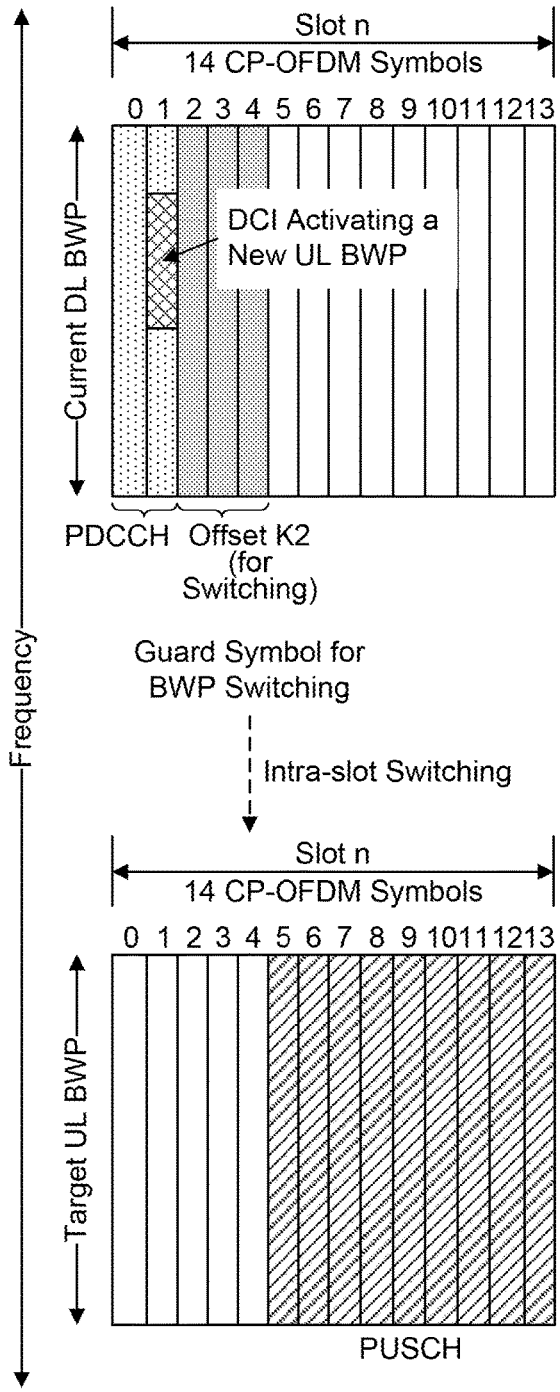
FIG. 31A illustrates an example of timing for a guard period for BWP switching when activation is for UL.
Figure 31B:
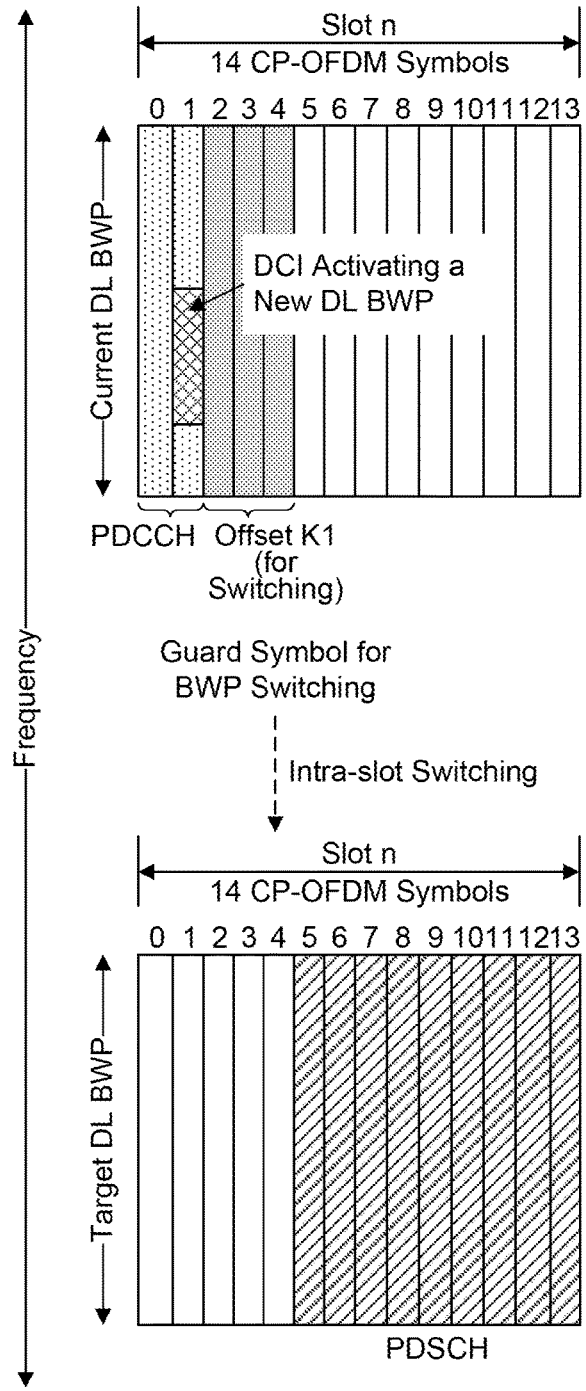
FIG. 31B illustrates an example of timing for a guard period for BWP switching when activation is for DL.
Figure 32:
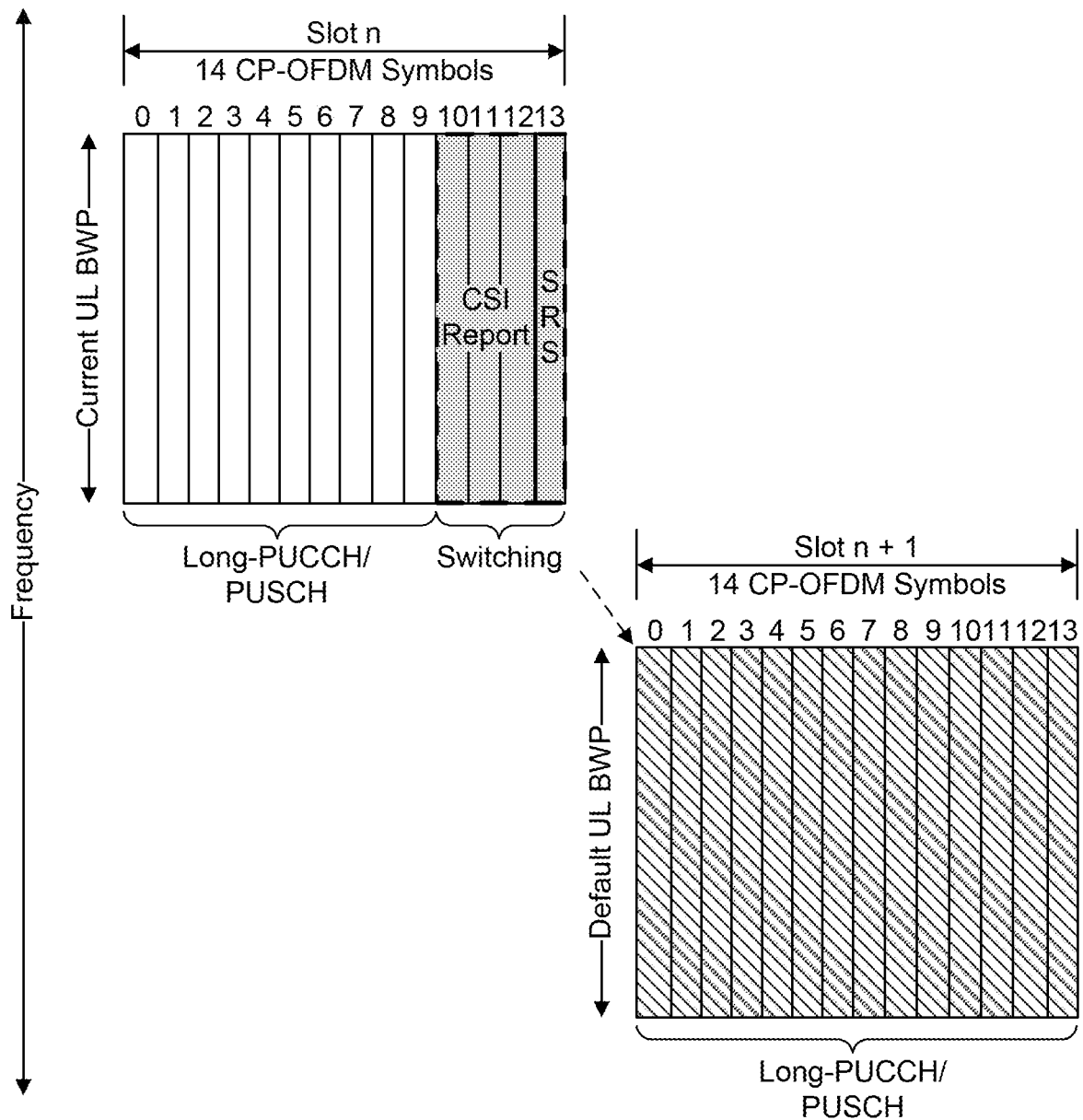
FIG. 32 illustrates an example of timing for a guard period for BWP switching when the BWP inactivity timer is expired for UL.
Figure 33:
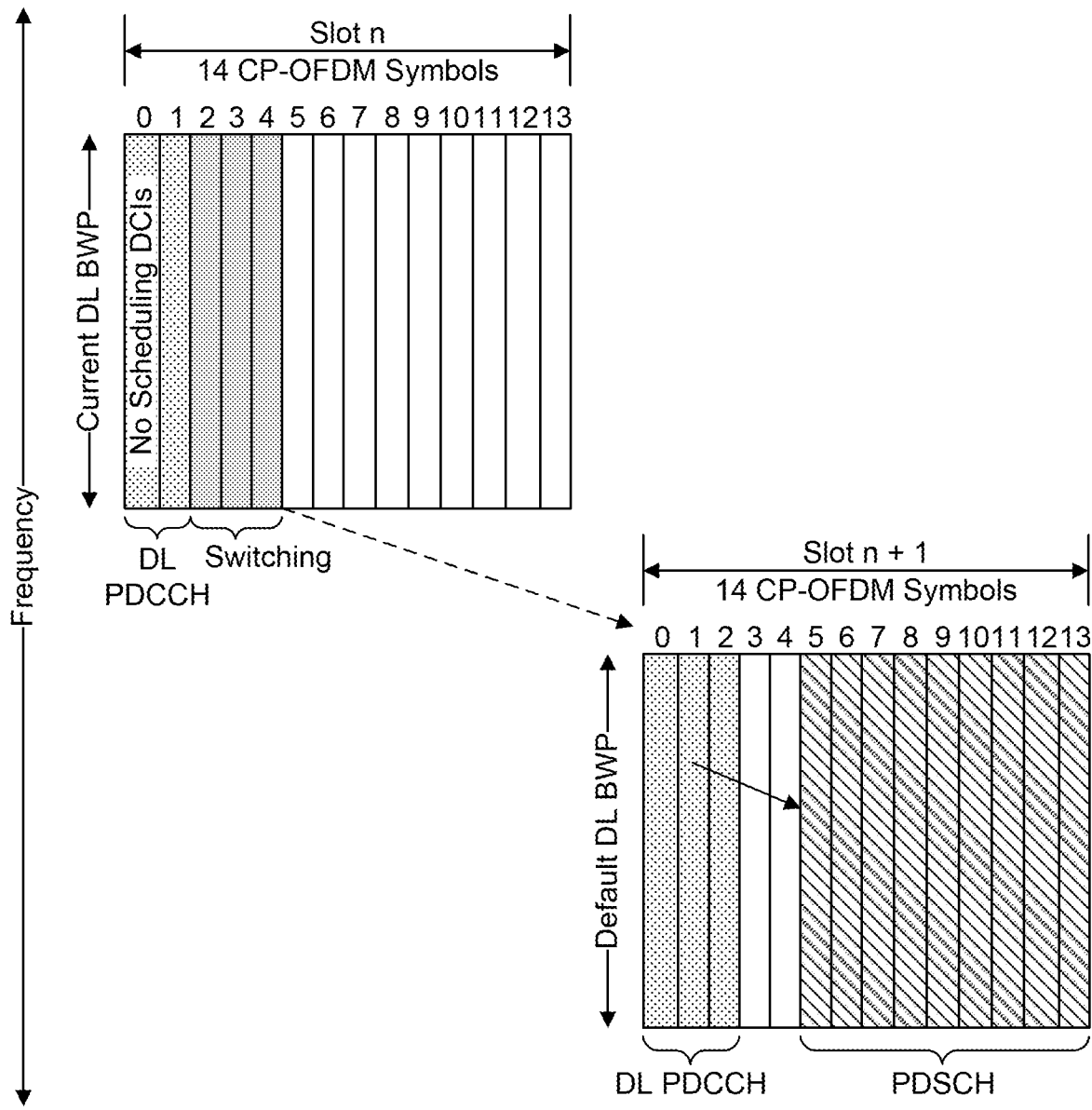
FIG. 33 illustrates an example of timing for a guard period for BWP switching when the BWP inactivity timer is expired for DL.

FIG. 31A illustrates an example of timing for a guard period for BWP switching for activation of UL. FIG. 31B illustrates an example of timing for a guard period for BWP switching for activation of DL. FIG. 32 illustrates an example of timing for a guard period for BWP switching when the BWP inactivity timer is expired for UL. FIG. 33 illustrates an example of timing for a guard period for BWP switching when the BWP inactivity timer is expired for DL.

For a paired spectrum such as FDD, a guard period is employed for frequency retuning between two consecutive slots. While the UL BWP inactivity timer is ongoing (e.g., counting down) and a UL BWP activation DCI is received, then a guard period is created by DL scheduling DCI jointly with the activation DCI. For example, it can reserve $K_2$ guard OFDM or SC-FDMA symbols referenced from the activation DCI received or the PDCCH in the current DL BWP slot (where the current DL BWP means the DL BWP where UE stays on). For example, the $K_2$ value can be set to 3 symbols as illustrated in FIG. 32A. The UE transmits PUSCH after K2 symbols at the target UL BWP where the target UL BWP means the UL BWP where UE is going to switch to.

While the DL BWP inactivity timer is ongoing (e.g., counting down) and a DL BWP activation DCI is received, a guard period is created by DL scheduling DCI with the activation DCI. For example, it can reserve $K_1$ guard symbols referenced from the activation DCI received or PDCCH in the current DL BWP slot (where the current DL BWP means the DL BWP where UE stays on). For example, the $K_1$ value can be set to 3 symbols as illustrated in FIG. 32B. The UE receives PDSCH after K1 symbols at the target DL BWP where the target DL BWP means the DL BWP where UE is going to switch to.

Figure 34:
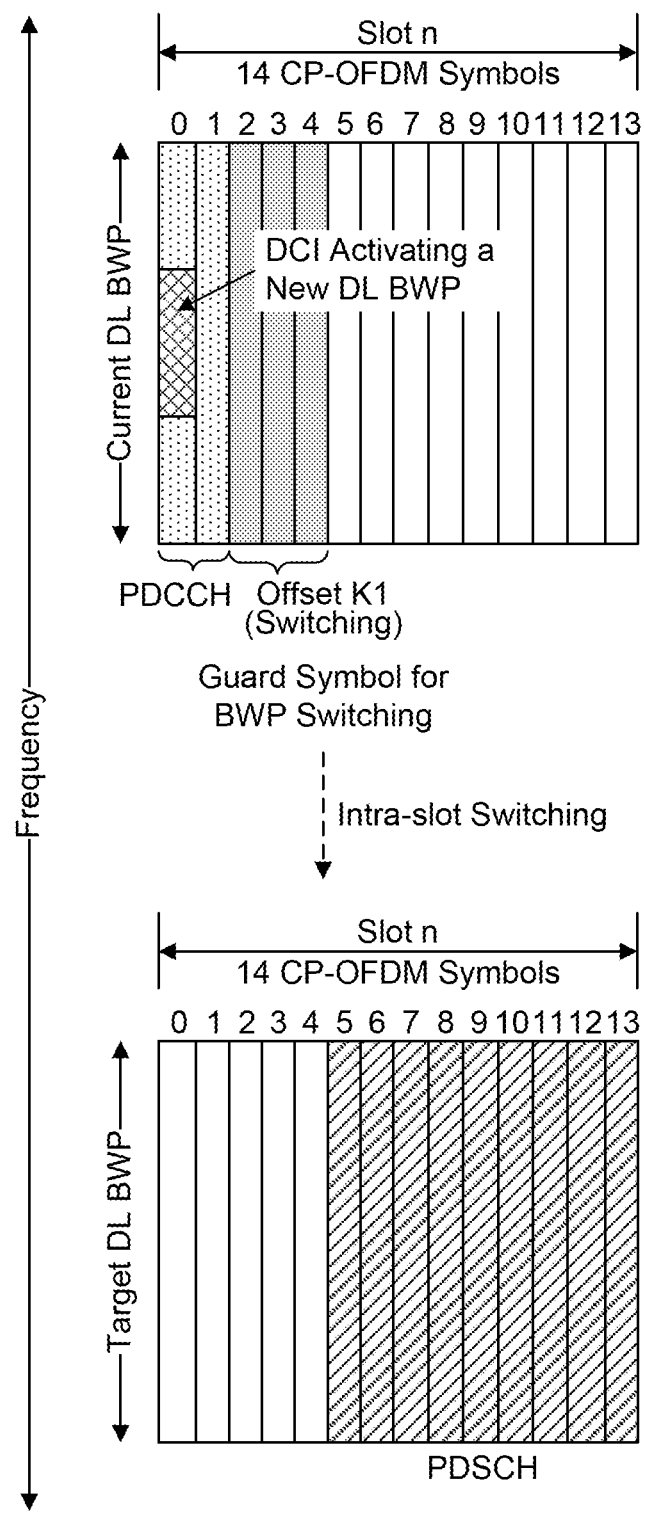
FIG. 34 illustrates an example of timing for a guard period for BWP switching for TDD.
Figure 35A:
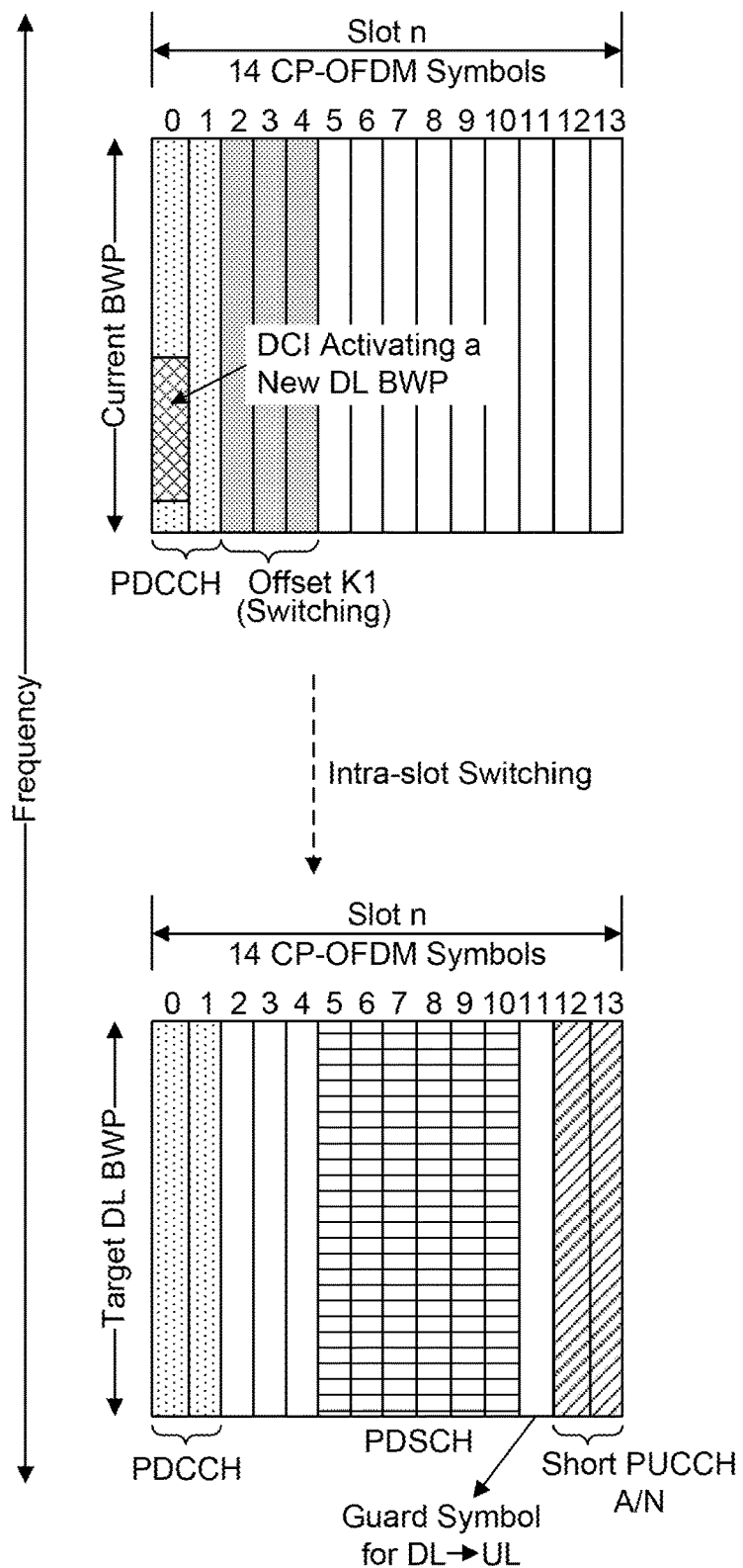
FIG. 35A illustrates an example of timing for a guard period created by UE for BWP switching with self-contained subframe and same numerology for BWP activation.
Figure 35B:
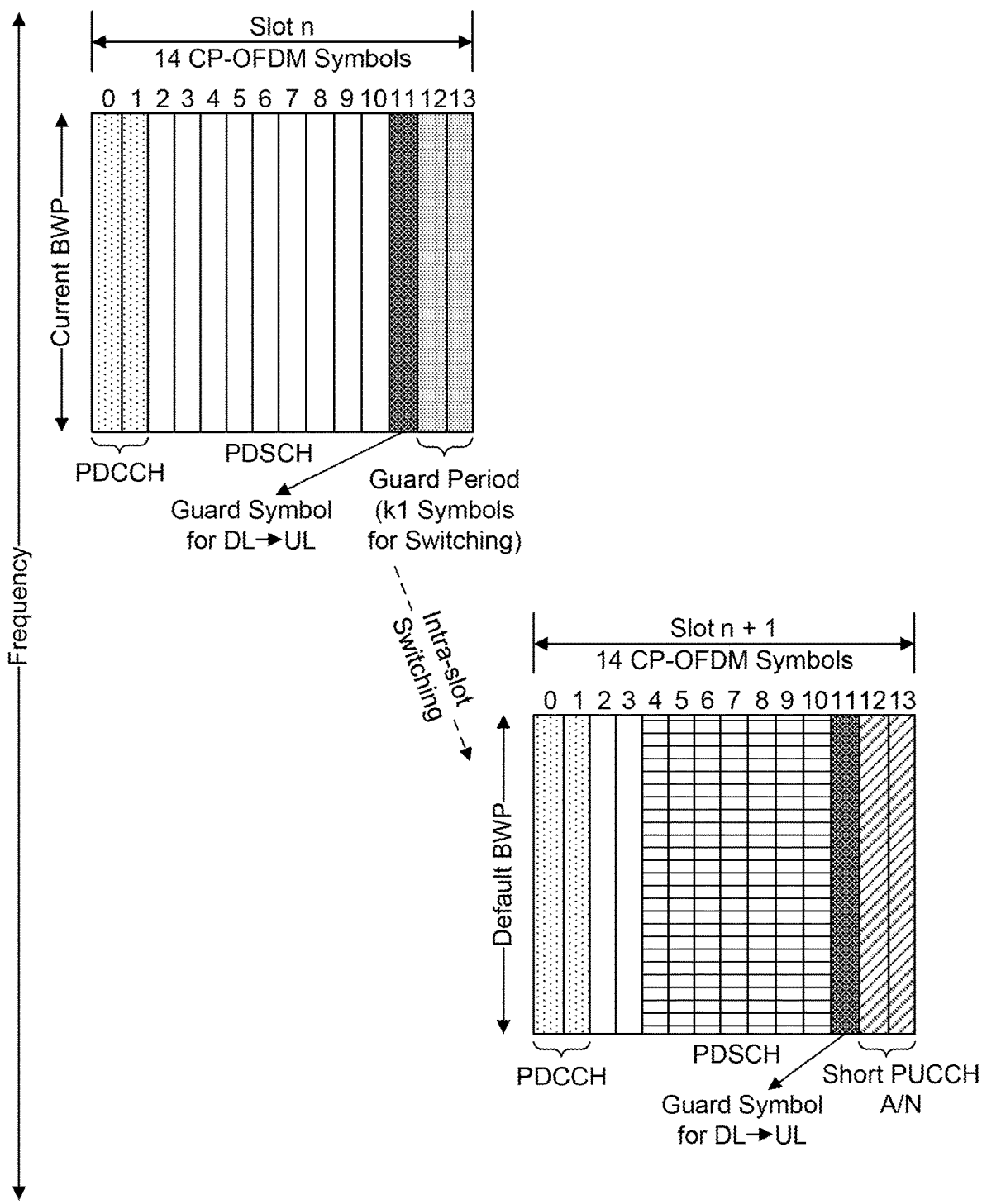
FIG. 35B illustrates an example of timing for a guard period created by UE for BWP switching with self-contained subframe and same numerology for BWP inactivity timer expiration.

FIG. 34 illustrates an example of timing for a guard period for BWP switching for TDD. FIG. 35A illustrates an example of timing for a guard period created by UE for BWP switching with self-contained subframe and same numerology for BWP activation. FIG. 35B illustrates an example of timing for a guard period created by UE for BWP switching with self-contained subframe and same numerology for BWP inactivity timer expiration.

For an unpaired spectrum such as TDD, while the BWP inactivity timer is ongoing (e.g., counting down) and a BWP activation DCI is received, then a guard period is created by DL scheduling DCI. For example, it can reserve K1 guard symbols referenced from the activation DCI or PDCCH in the current DL BWP TDD as shown in FIG. 34. After the BWP inactivity timer expires and UE switches from the current BWP back to its default BWP, the UE may monitor the scheduling DCI at the default BWP PDCCH region if it is a TDD DL slot, or the UE may transmit SRS, PUCCH (long or short format), PRACH at the default BWP if it is a TDD UL slot.

For a self-contained subframe, while the BWP inactivity timer is ongoing (e.g., counting down) and a BWP activation DCI is received, the transmission guard symbol $K_1$ for intra-slot switching can be implicitly indicated by activation DCI or explicitly by the scheduling DCI as shown in FIG. 35A. While the BWP inactivity timer expires and UE switches from the current BWP back to the default BWP, a guard period may be reserved by dropping the last $K_2$ UL symbols as shown in FIG. 35B.

Figure 36:
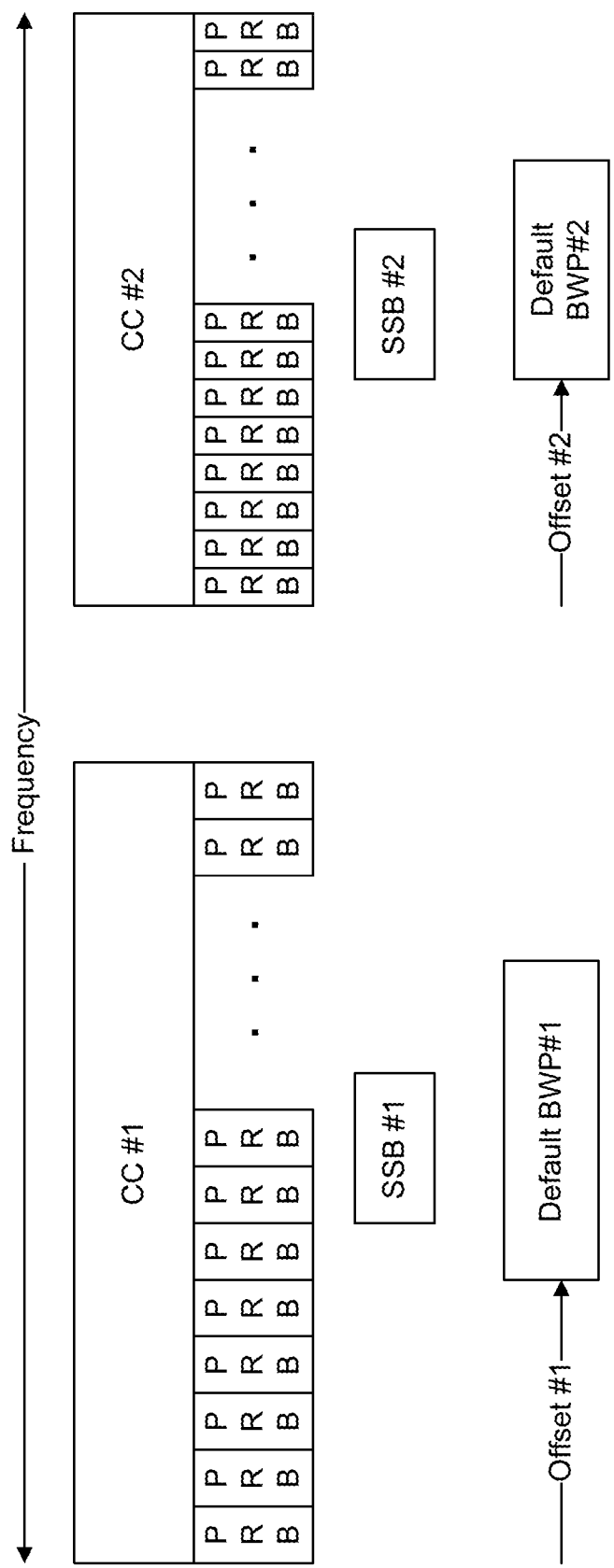
FIG. 36 illustrates an example of timing for default BWP setting with CA.

According to yet a further embodiment, FIG. 36 illustrates an example of timing for default BWP settings with Carrier Aggregation (CA). A gNB may configure one DL BWP as the default BWP for each component carrier (CC) and each default BWP can contain a SS burst set within UE's BW. For a secondary CC, gNB may configure a default BWP. In FIG. 36, CC #1 and CC #2 are using different numerology and each CC is configured with a separate default BWP.

SS burst (a set of SS blocks) can be configured within the measurement duration (connected mode only) for the default BWP in each CC. Those SS burst information can be configured via system information (SI). If a CC is disabled, then the corresponding configured default BWP is disabled. The DCI carrier indicator (CIF) and the BWP bit map can be used for indicating which BWP is activated at which CC. For example, if 4 bits of CIF and 4 bits of BWP are used for the indication of which BWP at which CC is activated then the binary 0010 0100 indicate 2nd CC and third BWP is activated For primary serving cell, if there is no configured default BWP then the initial (active) BWP can be used for the default BWP. The initial (active) BWP mean the BWP that UE perform the initial access, Each CC can be configured with a BWP inactivity timer and the BWP inactivity is numerology dependent. In CA, if BWP #1 is for CC #1 as the default BWP, then the UE may respond in a number of ways. If PDCCH is jointly scheduled for CA, e.g., there is a single PDCCH co-scheduled for CC #1 and CC #2, then UE can use the BWP #1 as the default BWP (e.g., the primary default BWP) when there is no default BWP setup for CC #2. If numerology of CC #1 and CC #2 are same, UE can use BWP #1 as the default for both CC #1 and CC #2, otherwise, CC #1 can use BWP #1 as the default BWP and CC #2 can use BWP #2 as the default BWP. If PDCCHs are separately scheduled, e.g., there are multiple PDCCHs independently scheduled from CC #1 and CC #2, then CC #1 can use BWP #1 as the default BWP and CC #2 can use BWP #2 as the default BWP.

Figure 37:
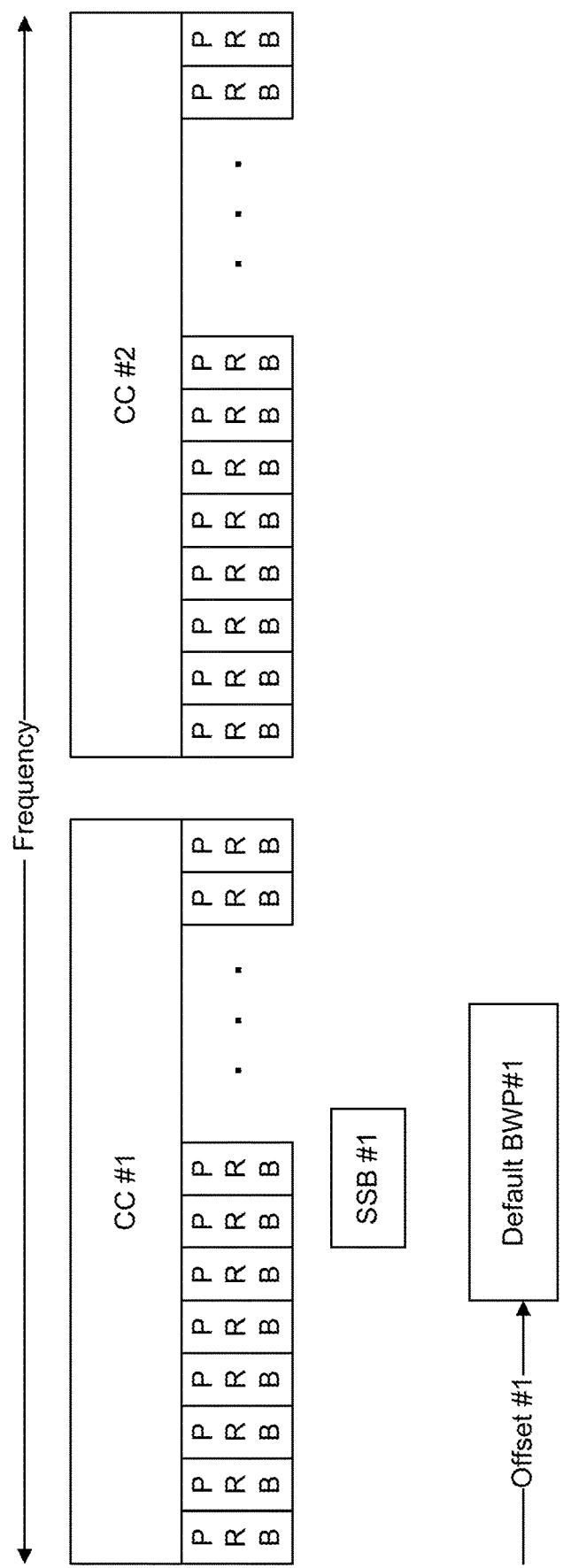
FIG. 37 illustrates an example of timing for default BWP when CCs are co-scheduled.

In yet even a further embodiment, FIG. 37 illustrates an example of timing for default BWP when CCs are co-scheduled. The default BWP operation with CA is illustrated. The CC #1 and CC #2 are co-scheduled and CC #1 and CC #2 are with same numerology. The BWP #1 CORESET and BWP #1 is the default BWP for both CC #1 and #2.

In CA, for example, in FIG. 36, if BWP #2 is configured for CC #2 as the default BWP and BWP #1 is for CC #1 as the default BWP, then the UE may respond in a number of ways. For FDD, DL and UL BWP timers can be independently configured for each CC. For TDD and self-contained subframe, BWP timer is independently configured for each CC.

If PDCCH is jointly scheduled or separately scheduled for CA, e.g., there is a single PDCCH co-scheduled for CC #1 and CC #2, then UE can be set by RRC with a single BWP timer value if numerology of CC #1 and CC #2 are same, otherwise, the BWP timer value can be independent setup for each CC. If PDCCH is jointly scheduled when CA, then a single DRX timer can be used for all CC. If PDCCH is separately scheduled when CA, then Separate DRX timer can be independent configured for each CC if their numerologies are different with the primary CC.

Figure 38:
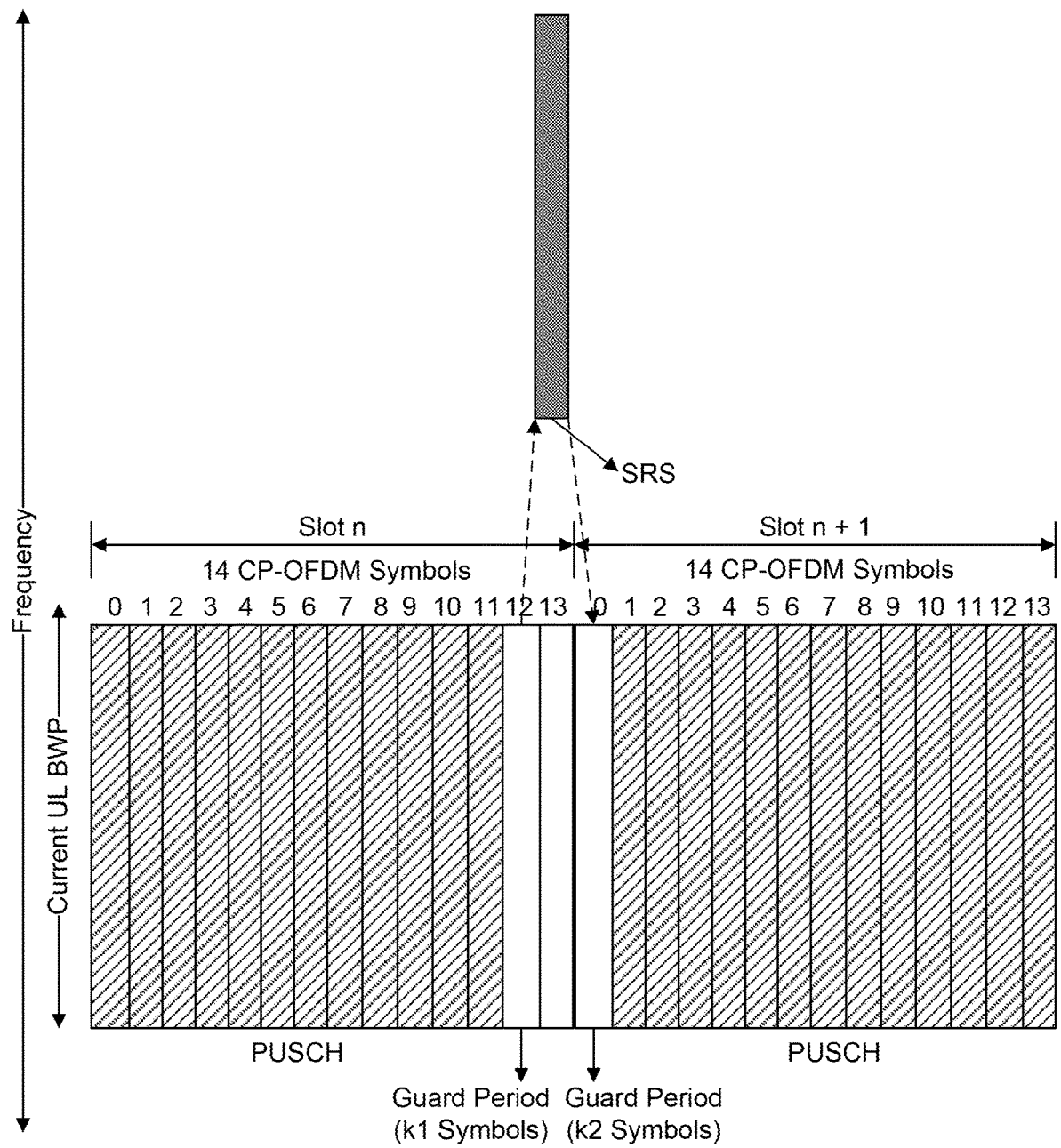
FIG. 38 illustrates an example of timing for guard periods for UE performing SRS gap transmission.
Figure 39:
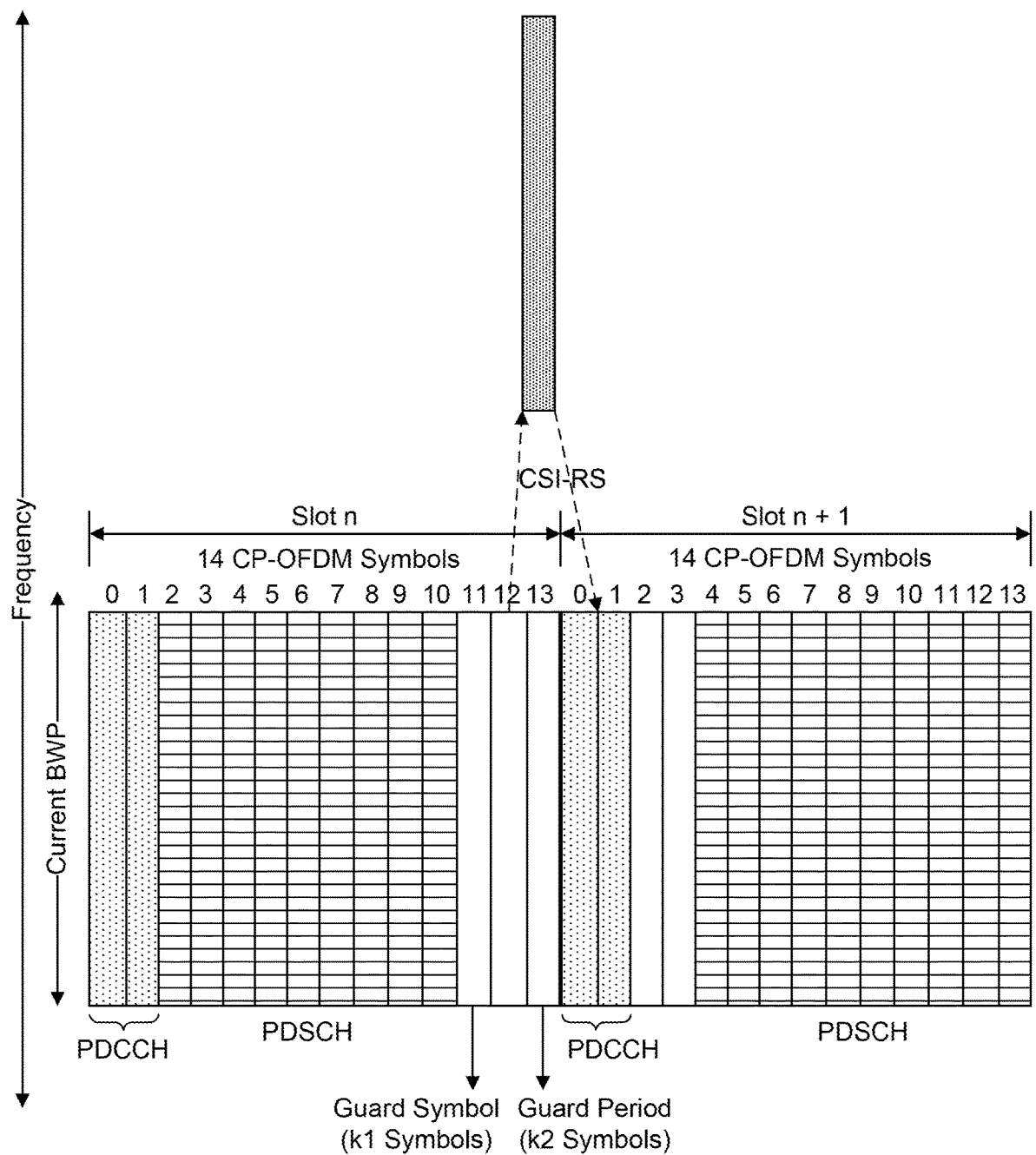
FIG. 39 illustrates an example of timing for guard periods for UE performing CSI-RS gap measurement.

According to yet even another embodiment, FIG. 38 illustrates an example of timing for guard periods for UE performing SRS gap transmission. FIG. 39 illustrates an example of timing for guard periods for UE performing CSI-RS gap measurement. When a UE performs measurement gap or transmits SRS outside of its active BWP and the BWP inactivity timer is ON (e.g., not expired), for pair spectrum (FDD) if aperiodic, SP or periodic SRS is scheduled to transmit with a long-PUCCH or short-PUCCH within a UL slot, the UE may skip aperiodic, SP or periodic SRS transmission. If a PUSCH is scheduled to transmit with aperiodic, SP or periodic SRS then a guard period is generated by a UE and follow with a PUSCH transmission at next slot. It generates a guard period with $k_1$ OFDM or SC-FDMA symbols then follow with the scheduled SRS transmission and the first $k_2$ OFDM or SC-FDMA guard symbols are generated at second PUSCH transmission slot. If a PUCCH is scheduled to transmit with aperiodic, SP or periodic SRS then a guard period is generated by a UE and follow with a PUSCH transmission at next slot. It generates a guard period with $k_1$ OFDM or SC-FDMA symbols then follow with the scheduled SRS transmission and the first $k_2$ OFDM or SC-FDMA guard symbols are generated at second PUCCH transmission slot. If a PUSCH is scheduled to transmit with aperiodic, SP or periodic SRS then a guard period is generated by a UE and follow with a PUCCH transmission at next slot. It generates a guard period with $k_1$ OFDM or SC-FDMA symbols then follow with the scheduled SRS transmission then follow with $k_2$ OFDM or SC-FDMA guard symbols at the end of current transmission slot If a PDSCH is scheduled to transmit with aperiodic, SP or periodic CSI-RS then a guard period is generated by a UE and follow with a PDSCH transmission at next slot. It generates a guard period with $k_1$ OFDM symbols then follow with the scheduled CSI-RS (out of active BWP) then follow with $k_2$ OFDM guard symbols at the end of current slot, as shown in FIG. 39.

For an unpaired spectrum (TDD, self-contained subframe), if aperiodic, SP or periodic SRS is scheduled to transmit with a long-PUCCH or short-PUCCH within a UL slot or UL symbols in a self-contained subframe, the UE can skip aperiodic, SP or periodic SRS transmission. If a PUSCH is scheduled to transmit with aperiodic, SP or periodic SRS then a guard period is generated by a UE. It generates a guard period with $k_1$ OFDM or SC-FDMA symbols then follow with the scheduled SRS transmission then follow with $k_2$ OFDM or SC-FDMA guard symbols at the end of current transmission slot The gNB may set a CSI-mask for a UE when bwp-CSI-mask limits CQI/PMI/PTI/RI and/or QCL reports to the duration period of the (DL) bwp timer inactive cycle. If the CSI-mask is setup by RRC, the reporting of CQI/PMI/RI/PTI and/or QCL on PUCCH shall not be disable when the DL BWP inactivity timer is not expired; else UE should send CQI/PMI/RI/PTI reporting for aperiodic CSI, SP-CSI and periodic-CSI reporting.

The gNB may set a SRS-mask for a UE when bwp-SRS-mask limits SRS transmission on the duration period of the UL BWP timer inactive cycle. If the SRS-mask is setup by RRC, UE should not transmit SRS while UL BWP time inactivity is not expired; else UE should transmit SRS for aperiodic SRS, SP-SRS and periodic-SRS.

Figure 40:
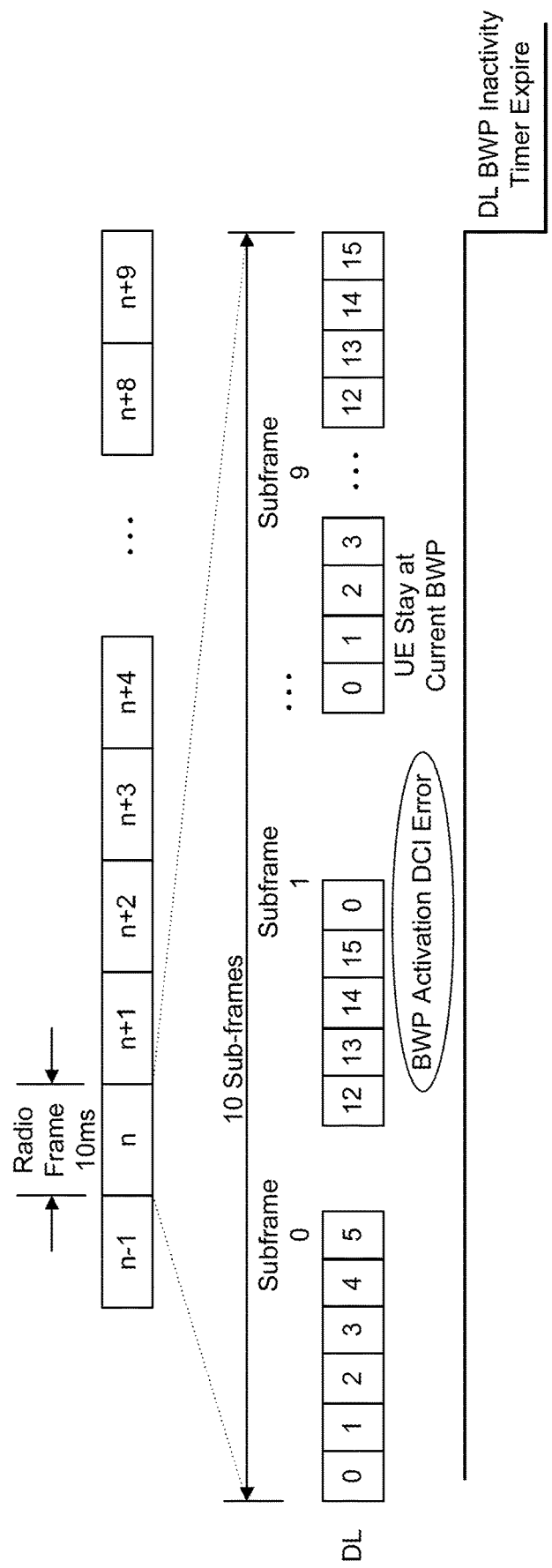
FIG. 40 illustrates an example of timing for BWP activation DCI error handling.

FIG. 40 illustrates an exemplary embodiment of timing for BWP activation DCI error handling. When a BWP activation DCI cannot successfully be decoded, e.g., when BWP activation has failed for a UE, the UE may respond in a number of ways. If a BWP activation DCI with or without carrying a DL data assignment or a UL grant is received, the UE may stay at the current DL or UL BWP until the DL or UL BWP inactivity timer expire and go back to the default BWP. Alternatively, if DL data is scheduled or there is a UL DCI grant it resets the BWP inactivity timer. The UE may keep monitoring DL DCI until the BWP inactivity timer expires, without flashing out the HARQ buffer. If there is any uplink transmission such as scheduled SRS (aperiodic, semi-persistent, or periodic) then the UE may still transmit the scheduled SRS. If there is any DL measurement such as scheduled CSI-RS (aperiodic, semi-persistent, or periodic) or SSB, then the UE still transmits the measurement for scheduled CSI-RS or SSB.

Figures 41A, 41B:
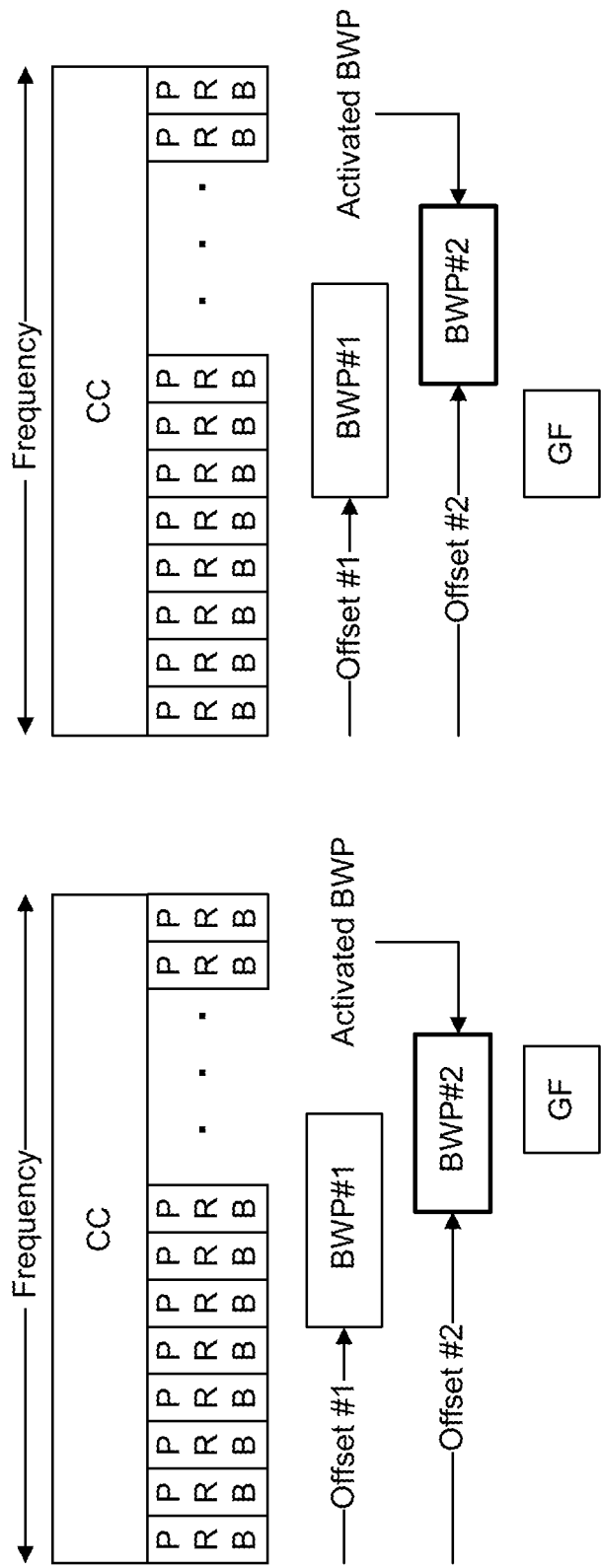
FIG. 41A illustrates an example of timing for grant free (GF) operations where a GF resource is an activated BWP.
FIG. 41B illustrates an example of timing for grant free (GF) operations where a GF resource is an activated BWP.

For grant free operations with BWP(s), a UE may use the GF resources configured by RRC, semi-statically scheduled or dynamically activated by PDCCH for grant-free transmission, as shown in FIG. 41A. If the GF resources are not allocated in the activated UL BWP as shown in FIG. 41B, then UE may not conduct grant-free transmission. For BWP switching, a UE may set the BWP inactivity timer according to the grant free transmission occasion or grant free resource allocation time interval configured by RRC, semi-statically indicated by MAC CE, or dynamically activated or indicated by PDCCH, or using the BWP inactivity timer value if explicitly indicated by RRC configuration, semi-statically indicated by MAC CE, or dynamically indicated by PDCCH. When the BWP inactivity timer expires, the UE may switch to another active BWP or its default BWP as indicated by RRC, MAC CE, or PDCCH. The UE may pause or reset the BWP inactivity timer for retransmission and resume the timer (if the timer is paused) when the retransmission is acknowledged (e.g., ACK) or the retransmission is timed out or has reached the maximum number of retransmissions. For grant free resources indicated or activated by L1 signaling, e.g., PDCCH, the BWP activation/deactivation DCI may be combined with the grant free resource activation/deactivation DCI for a UE to switch between active BWPs or between active and default BWP accordingly. If the current active BWP is deactivated, then the GF resources allocated in this BWP is deactivated also, either via BWP inactivity timer or MAC CE or deactivation DCI.

No PRB Allocation for BWP

According to yet another aspect of the application, a zero BWP can be defined as a zero resource assignment (RA) for a DL- or UL-BWP. When a DL- or UL-zero BWP is configured or signaled, the UE behaviors depend on the following scenarios discussed below.

In a first embodiment for an unpaired spectrum, there are zero PRB configurations. SCell BWP is deactivated. For the unpaired spectrum, i.e., TDD or self-contained subframe system, the DL and UL-BWPs are jointly configured. If DL-BWP(s) is/are configured with zero resource(s) for one or a group of secondary cells (SCells), when it is PCell-SCell co-scheduling or when directly configured via the SCell, then the UE is deactivated from the corresponding SCell BWP. Since a zero deactivated BWP does not support DL reception or UL transmission if there is a re-transmission, i.e., HARQ buffers are not emptied, the UE can be switched from the deactivated SCell DL- and UL-BWP to: (i) SCell default BWP, (ii) PCell active DL and UL-BWP with non-zero resource allocation; (iii) PCell default DL and UL-BWP; or (iv) PCell initial access DL and UL-BWP. This is based on the indication from gNB via the RRC configuration or DCI signaling (e.g., a flag with the zero BWP DCI). If there is no indication from gNB, then the default selection order may be as follows: (i) Scell default BWP if configured, (ii) PCell active DL and UL-BWP if no SCell default BWP, (iii) PCell default DL and UL-BWP if no PCell active DL and UL-BWP, and (iv) PCell initial access DL and UL-BWP if no PCell default DL and UL-BWP configured.

If the SCell DL- and UL-BWP are configured with an activated BWP timer, i.e., BWP-InactivityTimer and the BWP-InactivityTimer is not expired, then, the UE can switch to the SCell default BWP, PCell active BWP or PCell default BWP and stop the BWP timer. In this case, the zero BWP deactivates the SCell's active BWP and overrides the associated BWP timer.

A second embodiment of this aspect describes an unpaired spectrum with PCell BWP being deactivated. If PCell DL-BWP(s) is/are configured with zero resource(s) other than the default PCell DL-BWP, the UE can deactivate the DL- and UL-BWP and switch to the default DL and UL-BWP. This occurs when configured or the initial active DL- and UL-BWP if no default BWP at PCell is configured. The UE can monitor scheduling CORESET (e.g., group common DCI or DCI at common search space or fallback DCI) on its default DL BWP or initial access DL BWP. Alternatively, it can transmit a PRACH on its default UL BWP or initial access UL BWP at PCell. If the PCell DL- and UL-BWP are configured with an activated BWP timer, i.e., BWP-InactivityTimer and the BWP-InactivityTimer is not expired, then the UE can switch to the PCell default PWB or the initial active BWP if no default BWP is configured and stop the BWP timer.

Figure 42:
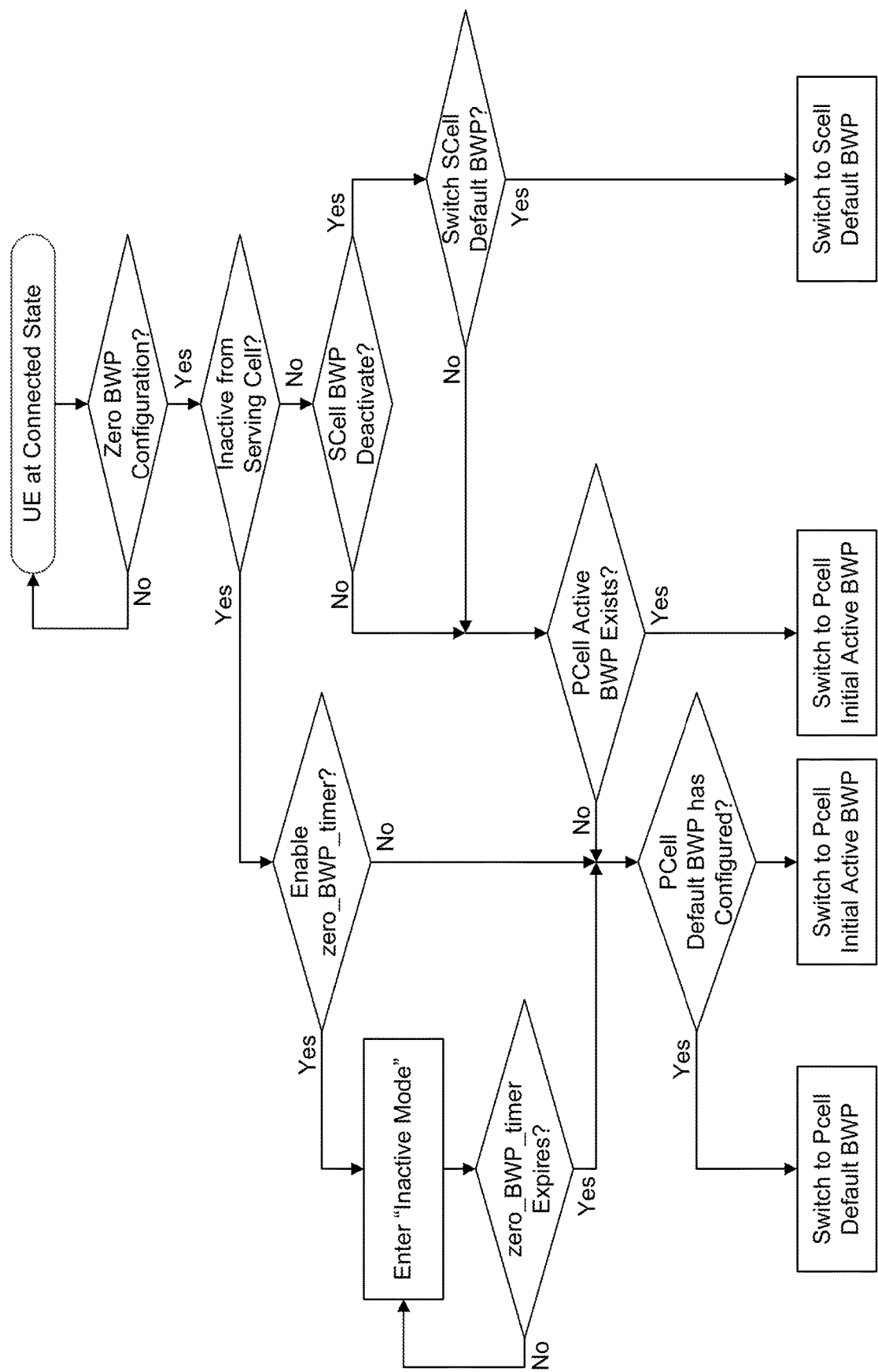
FIG. 42 illustrates an example of zero BWP handling for an unpaired spectrum.

A third embodiment of this aspect describes a zero BWP that is inactive from a serving cell. If zero BWP is configured or signaled from a serving cell, then a zero_BWP_timer may be configured for UE's Inactivity Duration, e.g., UE is in "inactive mode" or "micro-sleeping mode" and does not monitor or detect PDCCH in common or UE-specific searching space. At the expiration of the zero BWP timer, the UE can return to its default or active BWP. This depends on the configuration via RRC or DCI signaling with the zero BWP DCI, to monitor common or UE-specific search space. If no active BWP or default BWP is configured, the UE may use the initial access BWP after the expiration of the zero_BWP_timer. If a BWP is activated during the monitoring DCI period, the UE can switch to the reactivated BWP. The period of monitoring DCI can be configured via RRC signaling. To ensure the synchronization of UE-wakeup timing with network transmission timing, a TRS can be transmitted during the period of monitoring DCI. The zero BWP handling for unpaired spectrum in the first, second and third embodiments is illustrated in FIG. 42.

A fourth embodiment of this aspect describes a paired spectrum where the SCell DL/UL BWP is deactivated. For a paired spectrum (i.e., FDD system and the DL BWPs and UL BWPs are separately configured), DL-BWP(s) and UL-BWP(s) is/are configured with zero resource(s) for one or a group of secondary cells (SCells). If BWP(s), either when it is co-scheduling via PCell or it is directly configured via the SCell and not configured with any BWP timer, then the DL/UL SCell BWP(s) is deactivated. The UE can keep monitoring the DCI in the activated PCell BWP if available. Since a zero DL/UL BWP cannot support DL/UL data reception, the DL/UL (re)transmission can be switched to the PCell DL/UL BWP. If the DL/UL BWP has been set up with a BWP timer and the BWP timer is not expired, then the deactivation overrides the BWP timer.

A fifth embodiment of this aspect describes a paired spectrum where the PCell DL/UL BWP is deactivated without a SCell BWP. For a paired spectrum, if DL/UL BWP(s) is/are configured with zero resource(s) for PCell BWP(s) rather than the default BWP, then the UE may be switched to the PCell default DL/UL BWP if configured. If the DL/UL BWP has been set up with a BWP timer and the BWP timer is not expired, then the deactivation may override the BWP timer. UE can monitor group common DCI or DCI at common search space or fallback DCI on its DL default BWP if configured. Or it can monitor its DL initial access BWP if no default one is configured. Alternatively, it can monitor PRACH on its UL default BWP if configured or its UL initial access BWP if no default one configured at PCell if configured.

DCI Monitoring in Zero BWP Configuration Duration

According to even a further aspect of the application, when the UE is configured with zero BWP, it may behave in one of the following ways for monitoring:

(i) No monitoring in zero BWP configuration duration (ii) The UE stops monitoring PHY channels until the timer for the zero BWP configuration expires. This allows the UE to save power for the duration of the zero BWP timer.

(iii) On expiration of the zero BWP timer, the UE returns to its default or active BWP depending on the configuration. The configuration to return to default or active BWP may be done through RRC in a UE-specific manner or cell-specific manner.

In an embodiment, there is limited monitoring in zero BWP configuration duration. The UE stops monitoring data channels and certain control channels when configured for zero BWP. The UE may however continue to monitor the active BWP (the most recent BWP it monitored and on which it receives configuration for the BWP) or default BWP for certain control signals, for example configured CORESET(s) where it may receive group common DCI or DCI for common search space. Thus in zero BWP, the UE can continue to receive certain control information such as SFI, those relating to SI-RNTI but it does not receive DL and UL grants. The intention is to keep the monitoring periodicity for the monitored control signaling low enough that the UE can have power savings in this mode. This state may continue until the timer for the zero BWP configuration expires.

Alternatively, the UE may receive a BWP reconfiguration through the monitored DCI such as a group common PDCCH even when the zero BWP timer is still running and the UE switches according to the reconfiguration. On expiration of the zero BWP timer, the UE returns to its default or active BWP depending on the configuration. The configuration to return to default or active BWP may be done through RRC in a UE-specific manner or cell-specific manner.

DCI Format for Zero BWP Configuration

According to yet even a further aspect, the DCI for supporting zero BWP depends on RRC configuration. If a bandwidth path indicator field is configured in DCI format 1_1, the bandwidth path indicator field value indicates the active DL BWP, from the configured DL BWP set, for DL receptions. If a bandwidth path indicator field is configured in DCI format 0_1, the bandwidth path indicator field value indicates the active UL BWP, from the configured UL BWP set, for UL transmissions. In Table 6 below, a DCI format for both DL and UL grant to support zero BWP configuration is provided.

TABLE 6

| Field | Description |
|---|---|
| ... | ... |
| Resource Assignment (RA) BWP ID | when RA = 0, it indicator zero BWP if single BWP on carrier or it is unpaired spectrum then this field is not needed the field length (bits) is depend on number of BWPs are configured. For example, if RRC configures M = 4 BWPs then the length of BWP indicator field is equal to [log$_2$ M] = 2 bits |
| Inactivate from serving cell | Single bit, 1 = 'activate', otherwise is deactivate |
| ... | ... |

In Table 7 below, another DCI format for both DL and UL grant to support zero BWP configuration is given.

TABLE 7

| Field | Description |
|---|---|
| ... | ... |
| Resource Assignment (RA) BWP indicator | when RA = 0, it indicator zero BWP if single BWP on carrier or it is unpaired spectrum then this field is not needed the bitmap field length (bits) is depend on number of BWPs are configured. For example, if RRC configures M = 4 BWPs then the bitmap length of BWP indicator field is equal M bits |
| Inactivate from serving cell | Single bit, 1 = 'activate', otherwise is deactivate |
| ... | ... |

According to the present application, it is understood that any or all of the systems, methods and processes described herein may be embodied in the form of computer executable instructions, e.g., program code, stored on a computer-readable storage medium which instructions, when executed by a machine, such as a computer, server, M2M terminal device, M2M gateway device, transit device or the like, perform and/or implement the systems, methods and processes described herein. Specifically, any of the steps, operations or functions described above may be implemented in the form of such computer executable instructions. Computer readable storage media includes volatile and nonvolatile, removable and non-removable media implemented in any method or technology for storage of information, but such computer readable storage media do not includes signals. Computer readable storage media include, but are not limited to, RAM, ROM, EEPROM, flash memory or other memory technology, CD ROM, digital versatile disks (DVD) or other optical disk storage, magnetic cassettes, magnetic tape, magnetic disk storage or other magnetic storage devices, or any other physical medium which can be used to store the desired information and which can be accessed by a computer.

While the systems and methods have been described in terms of what are presently considered to be specific aspects, the application need not be limited to the disclosed aspects. It is intended to cover various modifications and similar arrangements included within the spirit and scope of the claims, the scope of which should be accorded the broadest interpretation so as to encompass all such modifications and similar structures. The present disclosure includes any and all aspects of the following claims.

What is claimed is:

1. A wireless transmit/receive unit (WTRU) comprising:
   a non-transitory memory including instructions stored thereon for re-establishing a remote radio control (RRC) connection with a base station; and
   a processor, operably coupled to the non-transitory memory, capable of executing the instructions of:
   determining, based upon a measurement in an active downlink bandwidth part (DL BWP), to initiate a random access channel (RACH) procedure;
   initiating the RACH procedure;
   determining whether one or more RACH resources is configured for an active uplink bandwidth part (UL BWP);
   after determining no RACH resources are configured for the active UL BWP, switching to a default UL BWP, wherein at least one RACH resource is configured for the default UL BWP;
   transmitting, to the base station, a random access (RA) preamble using one of the RACH resources configured for the default UL BWP;
   receiving a RA response from the base station; and
   switching from the default UL BWP to either the active UL BWP or another active UL BWP after re-establishing the RRC connection.

2. The WTRU of claim 1, wherein the processor is further configured to execute the instructions of receiving a request from the base station to initiate RA based upon expiration of an alignment timer.

3. The WTRU of claim 1, wherein the transmitted RA preamble occurs one symbol after reception of downlink control information (DCI).

4. The WTRU of claim 1, wherein the transmitted RA preamble is associated with a synchronization signal block (SSB).

5. The WTRU of claim 1, wherein the RACH procedure is initiated in view of a radio link failure between the WTRU and the base station.

6. The WTRU of claim 1, wherein the processor is further configured to execute the instructions of switching to the default UL BWP after expiration of an inactivity timer.

7. A method comprising:
   determining, based upon a measurement in an active downlink bandwidth part (DL BWP), to initiate a random access channel (RACH) procedure;
   initiating the RACH procedure;
   determining whether one or more RACH resources is configured for an active uplink bandwidth part (UL BWP);
   after determining no RACH resources are configured for the active UL BWP, switching to a default UL BWP, wherein at least one RACH resource is configured for the default UL BWP;
   transmitting, to a base station, a random access (RA) preamble using one of the RACH resources configured for the default UL BWP;
   receiving a RA response from the base station; and
   switching from the default UL BWP to either the active UL BWP or another active UL BWP after re-establishing a remote radio control (RRC) connection.

8. The method of claim 7, further comprising:
   receiving a request from the base station to initiate RA based upon expiration of an alignment timer.

9. The method of claim 7, wherein the transmitted RA preamble occurs one symbol after reception of downlink control information (DCI).

10. The method of claim 7, wherein the transmitted RA preamble is associated with a synchronization signal block (SSB).

11. The method of claim 7, wherein the RACH procedure is initiated in view of a radio link failure with the base station.

12. The method of claim 7, further comprising:
    switching to the default UL BWP after expiration of an inactivity timer.

* * * * *